US012309513B2

(12) United States Patent
Asakura

(10) Patent No.: US 12,309,513 B2
(45) Date of Patent: May 20, 2025

(54) SOLID-STATE IMAGING ELEMENT AND IMAGING DEVICE

(71) Applicant: Sony Semiconductor Solutions Corporation, Kanagawa (JP)

(72) Inventor: LuongHung Asakura, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 103 days.

(21) Appl. No.: 18/260,204

(22) PCT Filed: Jan. 13, 2022

(86) PCT No.: PCT/JP2022/000861
§ 371 (c)(1),
(2) Date: Jun. 30, 2023

(87) PCT Pub. No.: WO2022/181099
PCT Pub. Date: Sep. 1, 2022

(65) Prior Publication Data
US 2024/0073553 A1    Feb. 29, 2024

(30) Foreign Application Priority Data

Feb. 25, 2021   (JP) ................ 2021-028062

(51) Int. Cl.
*H04N 25/532* (2023.01)
*H04N 25/65* (2023.01)
(Continued)

(52) U.S. Cl.
CPC ......... *H04N 25/532* (2023.01); *H04N 25/778* (2023.01); *H04N 25/78* (2023.01); *H04N 25/65* (2023.01)

(58) Field of Classification Search
None
See application file for complete search history.

(56) References Cited

U.S. PATENT DOCUMENTS

| 7,002,628 B1* | 2/2006 | Panicacci | H03M 1/1023 |
| | | | 348/307 |
| 9,565,375 B1 | 2/2017 | Raynor | |
| 10,116,890 B2 | 10/2018 | Xu | |

FOREIGN PATENT DOCUMENTS

| JP | 2011078104 A | 4/2011 |
| JP | 2019057873 A | 4/2019 |
| JP | 2020057949 A | 4/2020 |

OTHER PUBLICATIONS

International Search Report (PCT/ISA/210), International Application No. PCT/JP2022/000861, dated Mar. 29, 2022.

(Continued)

*Primary Examiner* — Mark T Monk
(74) *Attorney, Agent, or Firm* — Michael Best & Friedrich LLP

(57) ABSTRACT

Image quality enhancement in a solid-state imaging element with simultaneous pixel exposure is disclosed. In one example, a solid-state imaging element includes a first pixel with a first selection transistor that opens and closes a path between a first capacitive element holding a predetermined reset level and a predetermined node, and a second selection transistor that opens and closes a path between a second capacitive element holding a signal level corresponding to an exposure amount and the node. It also includes a second pixel with a third selection transistor that opens and closes a path between a third capacitive element holding a predetermined reset level and a predetermined node, and a fourth selection transistor that opens and closes a path between a fourth capacitive element holding a signal level corresponding to the exposure amount.

18 Claims, 39 Drawing Sheets

(51) Int. Cl.
*H04N 25/778* (2023.01)
*H04N 25/78* (2023.01)

(56) References Cited

OTHER PUBLICATIONS

Geunsook Park, et al., "*A 2.2 µm Stacked Back Side Illuminated Voltage Domain Global Shutter CMOS Image Sensor*," IEDM19-379, Feb. 19, 2019.

* cited by examiner a b

FIG. 15

| REGION | NOISE | NOISE COUNTERMEASURE BY LAYOUT | AVERAGE VALUE (LSB) | STANDARD DEVIATION (LSBrms) |
|---|---|---|---|---|
| ref | NONE | NONE | REF | 30 |
| pls1 | PRESENCE | NONE | REF+18 | 30 |
| pls2 | PRESENCE | PRESENCE | REF | 35 |

FIG. 16

| RANDOM NOISE IN CASE OF NO PLS (a.u) | PLS | RANDOM NOISE IN CASE WHERE PLS OCCURS (a.u) | DETERIORATION OF RANDOM NOISE (%) |
|---|---|---|---|
| 1 | 0.1 | 1.005 | 0.5 |
| 1 | 0.2 | 1.020 | 2.0 |
| 1 | 0.3 | 1.044 | 4.4 |
| 1 | 0.4 | 1.077 | 7.7 |
| 1 | 0.5 | 1.118 | 11.8 | a b

SOLID-STATE IMAGING ELEMENT AND IMAGING DEVICE

TECHNICAL FIELD

The present technology relates to a solid-state imaging element. Specifically, the present technology relates to a solid-state imaging element and an imaging device that perform analog to digital (AD) conversion for each column.

BACKGROUND ART

In the related art, in a solid-state imaging element, for the purpose of miniaturizing pixels, a column analog to digital converter (ADC) method has been used in which an ADC is arranged for each column outside a pixel array unit and pixel signals are sequentially read row by row. In this column ADC method, in a case where exposure is performed by a rolling shutter method in which exposure is started row by row, there is a possibility that rolling shutter distortion occurs. Therefore, in order to realize a global shutter method in which exposure is simultaneously started in all pixels, a solid-state imaging element has been proposed in which a pair of capacitors is provided for each pixel and the capacitors hold a reset level and a signal level (for example, refer to Non-Patent Document 1). A pair of transistors is disposed between the pair of capacitors and a pre-stage circuit, and a reset level and a signal level are supplied to the capacitors via the transistors.

CITATION LIST

Non-Patent Document

Non-Patent Document 1: Geunsook Park, et al., A 2.2 μm Stacked Back Side Illuminated Voltage Domain Global Shutter CMOS Image Sensor, IEDM19-379.

SUMMARY OF THE INVENTION

Problems to be Solved by the Invention

In the above-described technology in the related art, the reset level and the signal level are held in the pair of capacitors for each pixel, and thereby the global shutter method is realized in the column ADC method. However, in the above-described technology in the related art, noise may occur due to stray light at the pn junction of each of the pair of transistors connected to the pair of capacitors. The amount of noise for each pixel does not necessarily match, and parasitic light sensitivity (PLS) may deteriorate due to the mismatch of the noise amount. The image quality of image data is degraded due to the deterioration of the PLS.

The present technology is achieved in view of such a situation, and an object thereof is to improve the image quality in the solid-state imaging element that performs exposure simultaneously in all pixels.

Solutions to Problems

The present technology is made to solve the problems described above, and a first aspect thereof is a solid-state imaging element including a first pixel in which a first selection transistor that opens and closes a path between a first capacitive element holding a predetermined reset level and a predetermined node is arranged at a specific relative position, and a second selection transistor that opens and closes a path between a second capacitive element holding a signal level corresponding to an exposure amount and the node is arranged at a relative position different from the specific relative position; and a second pixel in which a third selection transistor that opens and closes a path between a third capacitive element holding a predetermined reset level and a predetermined node is arranged at the specific relative position, and a fourth selection transistor that opens and closes a path between a fourth capacitive element holding a signal level corresponding to the exposure amount and the node is arranged at a relative position different from the specific relative position. Therefore, this configuration provides an effect that the image quality is improved.

Furthermore, in the first aspect, the second pixel may be adjacent to the first pixel. Therefore, this configuration provides an effect that the noise between adjacent pixels is made inconspicuous.

Furthermore, in the first aspect, pixels in a pixel array unit including the first pixel and the second pixel may be arranged in a Bayer array. Therefore, this configuration provides an effect that the image quality of a color image is improved.

Furthermore, in the first aspect, the pixel array unit may include a first area in which the four first pixels are arranged in 2 rows×2 columns, and a second area which is adjacent to the first area and in which the four second pixels are arranged in 2 rows×2 columns. Therefore, this configuration provides an effect that the image quality of the color image is improved.

Furthermore, in the first aspect, the pixel array unit may include a first area in which the first pixel and the three second pixels are arranged in 2 rows×2 columns, and a second area which is adjacent to the first area and in which the second pixel and the three first pixels are arranged in 2 rows×2 columns. Therefore, this configuration provides an effect that the image quality of the color image is improved.

Furthermore, in the first aspect, pixels in a pixel array unit including the first pixel and the second pixel may be arranged in a Quad Bayer array, and the pixel array unit may include a first area in which the first pixel and the three second pixels of the same color as the first pixel are arranged in 2 rows×2 columns, and a second area which is adjacent to the first area and in which the second pixel and the three first pixels of the same color as the second pixel are arranged in 2 rows×2 columns. Therefore, this configuration provides an effect that the image quality of the color image is improved.

Furthermore, in the first aspect, the node may be a post-stage node, and a pixel block in which the first pixel and the second pixel are arranged may include a first pre-stage circuit that sequentially generates a first reset level and a first signal level, and causes the first and second capacitive elements to hold the first reset level and the first signal level, a second pre-stage circuit sequentially generates a second reset level and a second signal level, and causes the third and fourth capacitive elements to hold the second reset level and the second signal level, the first, second, third, and fourth capacitive elements, a selection unit that includes a first selection circuit provided with the first and second selection transistors, and a second selection circuit provided with the third and fourth pre-stage selection transistors, and a post-stage circuit that sequentially reads each of the first and second reset levels and the first and second signal levels through the post-stage node. Therefore, this configuration provides an effect that the kTC noise is reduced.

Furthermore, in the first aspect, the first pre-stage circuit may include a first photoelectric conversion element, a first pre-stage transfer transistor that transfers a charge to a first floating diffusion layer from the first photoelectric conversion element, a first reset transistor that initializes the first floating diffusion layer, and a first pre-stage amplification transistor that amplifies a voltage of the first floating diffusion layer, and the second pre-stage circuit may include a second photoelectric conversion element, a second pre-stage transfer transistor that transfers a charge to a second floating diffusion layer from the second photoelectric conversion element, a second reset transistor that initializes the second floating diffusion layer, and a second pre-stage amplification transistor that amplifies a voltage of the second floating diffusion layer. Therefore, this configuration provides an effect that a level corresponding to the voltage of the floating diffusion layer is held.

Furthermore, in the first aspect, the first pre-stage circuit may further include a first current source transistor connected to a first pre-stage node, the second pre-stage circuit may further include a second current source transistor connected to a second pre-stage node, the first pre-stage amplification transistor may amplify the voltage of the first floating diffusion layer, and outputs the amplified voltage to the first pre-stage node, the second pre-stage amplification transistor may amplify the voltage of the second floating diffusion layer, and outputs the amplified voltage to the second pre-stage node, one end of each of the first and second capacitive elements may be commonly connected to the first pre-stage node, and the other end of each of the first and second capacitive elements may be connected to the first selection circuit, and one end of each of the third and fourth capacitive elements may be commonly connected to the second pre-stage node, and the other end of each of the third and fourth capacitive elements may be connected to the second selection circuit. Therefore, this configuration provides an effect that a constant current is supplied to each pixel.

Furthermore, in the first aspect, at a predetermined exposure start timing, the first and second pre-stage transfer transistors may transfer the charges to the first and second floating diffusion layers, and the first and second reset transistors may initialize the first and second floating diffusion layers and the first and second photoelectric conversion elements, and at a predetermined exposure end timing, the first and second pre-stage transfer transistors may transfer the charges to the first and second floating diffusion layers. Therefore, this configuration provides an effect that all the pixels are simultaneously exposed.

Furthermore, in the first aspect, the selection unit may sequentially perform control to connect one of the first and second capacitive elements to the post-stage node, control to connect the other of the first and second capacitive elements to the post-stage node, control to connect one of the third and fourth capacitive elements to the post-stage node, and control to connect the other of the third and fourth capacitive elements to the post-stage node. Therefore, this configuration provides an effect that the reset level and the signal level of each of the two pixels are sequentially read.

Furthermore, in the first aspect, in a predetermined addition mode, the selection unit may sequentially perform control to connect both one of the first and second capacitive elements and one of the third and fourth capacitive elements to the post-stage node and control to connect both the other of the first and second capacitive elements and the other of the third and fourth capacitive elements to the post-stage node. Therefore, this configuration provides an effect that the signal obtained by the pixel addition is read.

Furthermore, in the first aspect, the first pre-stage circuit may further include a first pre-stage selection transistor that outputs a voltage amplified by the first pre-stage amplification transistor to a predetermined pre-stage node in accordance with a predetermined first selection signal, the second pre-stage circuit may further include a second pre-stage selection transistor that outputs a voltage amplified by the second pre-stage amplification transistor to the pre-stage node in accordance with a predetermined second selection signal, and a current source transistor connected to the pre-stage node, one end of each of the first and second capacitive elements may be commonly connected to the pre-stage node, and the other end of each of the first and second capacitive elements may be connected to the first selection circuit, and one end of each of the third and fourth capacitive elements may be commonly connected to the pre-stage node, and the other end of each of the third and fourth capacitive elements may be connected to the second selection circuit. Therefore, this configuration provides an effect that the current source transistor is shared by two pixels.

Furthermore, in the first aspect, the first and second pre-stage selection transistors may sequentially shift to a closed state immediately before a predetermined exposure end timing and immediately after the exposure end timing, the first reset transistor may initialize the first floating diffusion layer in a case where the first pre-stage selection transistor is in the closed state, the second reset transistor may initialize the second floating diffusion layer in a case where the second pre-stage selection transistor is in the closed state, the first and second pre-stage selection transistors may sequentially shift to the closed state immediately after the exposure end timing, and the first and second pre-stage transfer transistors may transfer the charges at the predetermined exposure end timing. Therefore, this configuration provides an effect that all the pixels are simultaneously exposed in the configuration in which the current source transistor is shared by two pixels.

Furthermore, in the first aspect, the node may include first and second post-stage nodes, and a pixel block in which four pixels including the first pixel and the second pixel are arranged may include a short-circuit transistor that opens and closes a path between the first post-stage node and the second post-stage node, the first, second, third, and fourth capacitive elements, third, fourth, fifth, and sixth capacitive elements, and a selection unit that includes a first selection circuit provided with the first and second selection transistors, a second selection circuit provided with the third and fourth pre-stage selection transistors, a third selection circuit that connects any of the fifth and sixth capacitive elements to the second post-stage node, and a fourth selection circuit that connects any of the seventh and eighth capacitive elements to the second post-stage node. Therefore, this configuration provides an effect that the first post-stage node and the second post-stage node are short-circuited.

Furthermore, in the first aspect, in a predetermined non-addition mode, the short-circuit transistor may be in an open state, and in the non-addition mode, the selection unit may sequentially perform control to sequentially connect each of the first and second capacitive elements to the first post-stage node, control to sequentially connect each of the third and fourth capacitive elements to the first post-stage node, control to sequentially connect each of the fifth and sixth capacitive elements to the second post-stage node, and control to sequentially connect each of the seventh and eighth capacitive elements to the second post-stage node.

Therefore, this configuration provides an effect that the reset level and the signal level of each of the four pixels are sequentially read.

Furthermore, in the first aspect, in a predetermined addition mode, the short-circuit transistor may be in a closed state, and in the addition mode, the selection unit may sequentially perform control to connect one of the fifth and sixth capacitive elements and one of the seventh and eighth capacitive elements to the second post-stage node while connecting one of the first and second capacitive elements and one of the third and fourth capacitive elements to the first post-stage node, and control to connect the other of the fifth and sixth capacitive elements and the other of the seventh and eighth capacitive elements to the second post-stage node while connecting the other of the first and second capacitive elements and the other of the third and fourth capacitive elements to the first post-stage node. Therefore, this configuration provides an effect that four pixels are added in the pixel addition mode.

Furthermore, a second aspect of the present technology is an imaging device including a first pixel in which a first selection transistor that opens and closes a path between a first capacitive element holding a predetermined reset level and a predetermined node is arranged at a specific relative position, and a second selection transistor that opens and closes a path between a second capacitive element holding a signal level corresponding to an exposure amount and the node is arranged at a relative position different from the specific relative position; a second pixel in which a third selection transistor that opens and closes a path between a third capacitive element holding a predetermined reset level and a predetermined node is arranged at the specific relative position, and a fourth selection transistor that opens and closes a path between a fourth capacitive element holding a signal level corresponding to the exposure amount and the node is arranged at a relative position different from the specific relative position; and a signal processing circuit that sequentially converts the reset level and the signal level into a digital signal. Therefore, this configuration provides an effect that the image quality of the image captured by the imaging device is improved.

BRIEF DESCRIPTION OF DRAWINGS

FIG. 15 is a diagram illustrating an example of an average value and a standard deviation in an area in the first embodiment of the present technology.

FIG. 16 is a diagram for describing the influence of PLS in the first embodiment of the present technology.

MODE FOR CARRYING OUT THE INVENTION

Figure 1:
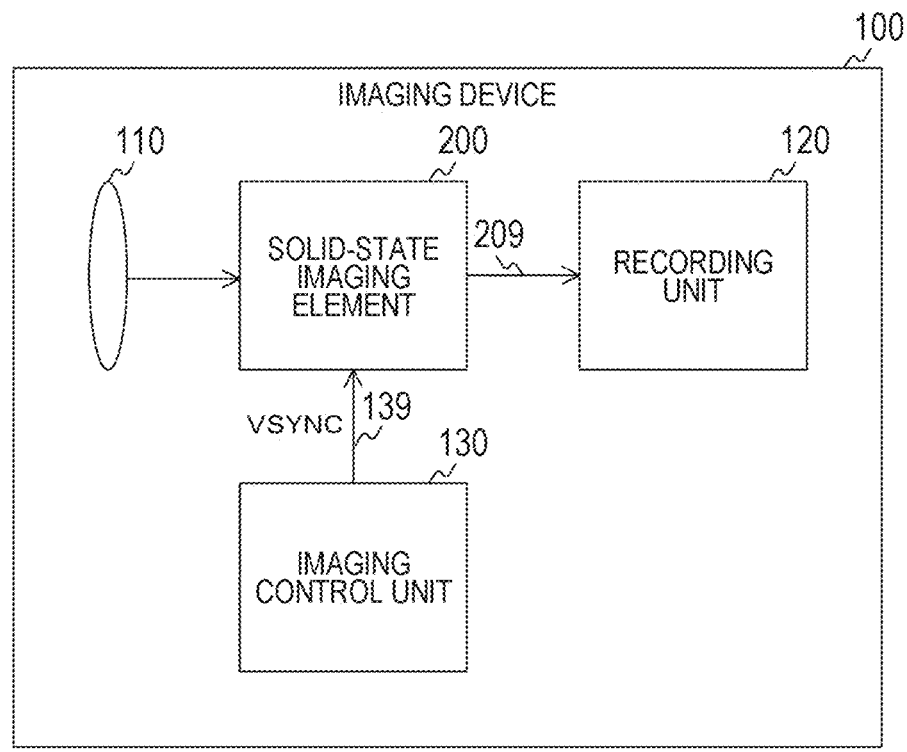
FIG. 1 is a block diagram illustrating a configuration example of an imaging device in a first embodiment of the present technology.

Hereinafter, modes for carrying out the present technology (hereinafter referred to as embodiments) will be described. The description will be given in the following order.
1. First Embodiment (Example of Exchanging Positions of Selection transistors in Two Adjacent Pixels)
2. Second Embodiment (Example of Causing Plurality of Capacitors to Hold Reset Level and Signal Level)
3. Third Embodiment (Example of Causing Plurality of Capacitors to Hold Reset Level and Signal Level and Short-circuiting Post-stage node)
4. Fourth Embodiment (Example of Causing Plurality of Capacitors to Hold Reset Level and Signal Level and Sharing Current Source)
5. Application Example to Mobile Object 1. First Embodiment Configuration Example of Imaging Device FIG. 1 is a block diagram illustrating a configuration example of an imaging device 100 in a first embodiment of the present technology. The imaging device 100 is a device that captures image data, and includes an imaging lens 110, a solid-state imaging element 200, a recording unit 120, and an imaging control unit 130. As the imaging device 100, a digital camera, and an electronic device (a smartphone, a personal computer, or the like) having an imaging function are assumed.

The solid-state imaging element 200 captures the image data under control of the imaging control unit 130. The solid-state imaging element 200 supplies the image data to the recording unit 120 via a signal line 209.

The imaging lens 110 condenses light and guides the light to the solid-state imaging element 200. The imaging control unit 130 controls the solid-state imaging element 200 to capture the image data. For example, the imaging control unit 130 supplies an imaging control signal including a vertical synchronization signal VSYNC to the solid-state imaging element 200 via a signal line 139. The recording unit 120 records the image data.

Here, the vertical synchronization signal VSYNC is a signal indicating imaging timing, and a periodic signal of a constant frequency (such as 60 hertz) is used as the vertical synchronization signal VSYNC.

Note that although the imaging device 100 records the image data, the image data may be transmitted to the outside of the imaging device 100. In this case, an external interface for transmitting image data is further provided. Alternatively, the imaging device 100 may further display the image data. In this case, a display section is further provided.

Configuration Example of Solid-State Imaging Element

Figure 2:
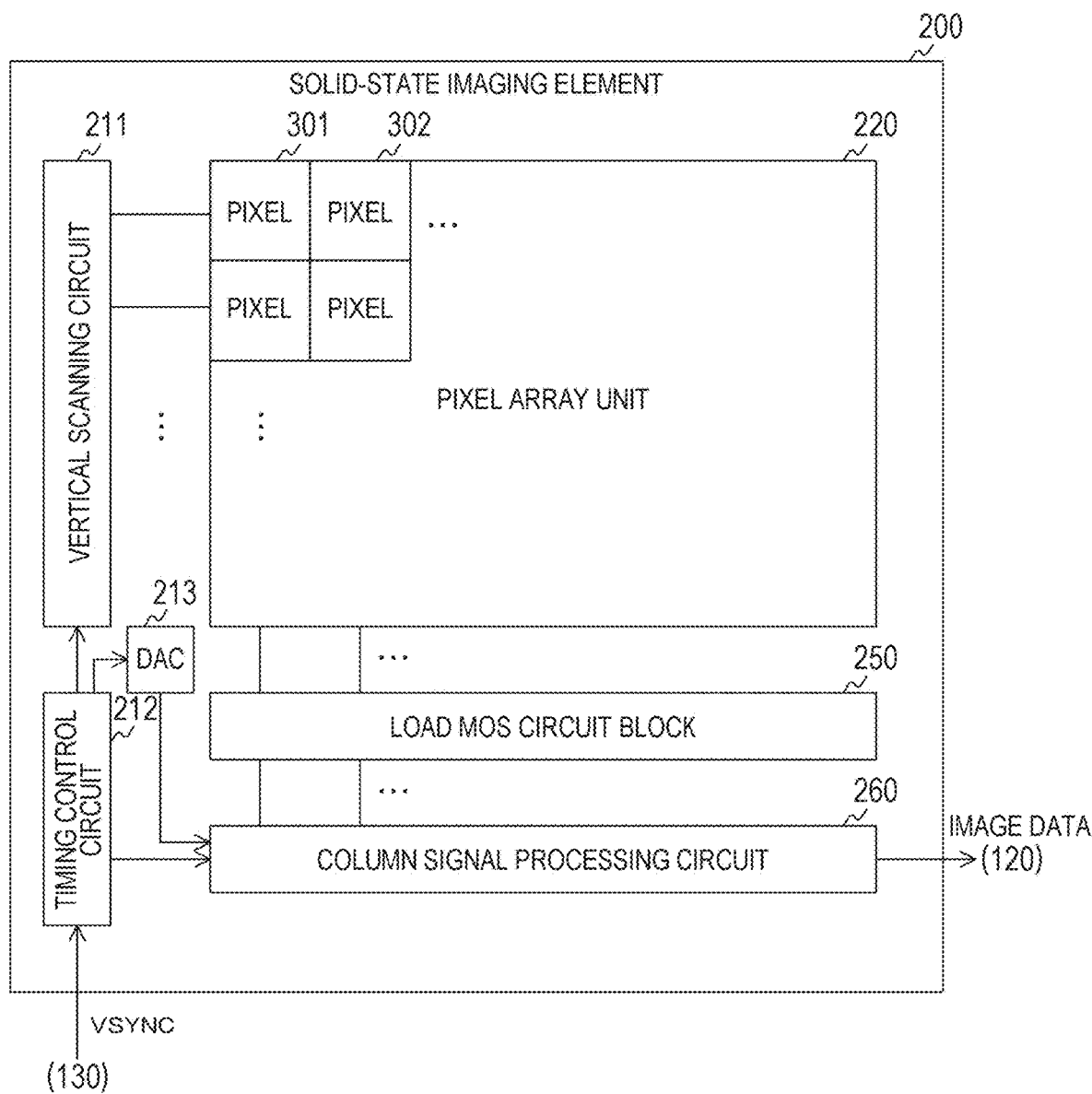
FIG. 2 is a block diagram illustrating a configuration example of a solid-state imaging element in the first embodiment of the present technology.

FIG. 2 is a block diagram illustrating a configuration example of the solid-state imaging element 200 in the first embodiment of the present technology. The solid-state imaging element 200 includes a vertical scanning circuit 211, a pixel array unit 220, a timing control circuit 212, a digital to analog converter (DAC) 213, a load MOS circuit block 250, and a column signal processing circuit 260. In the pixel array unit 220, a plurality of pixels such as pixels 301 and 302 is arranged in a two-dimensional lattice pattern. Furthermore, each circuit in the solid-state imaging element 200 is provided on, for example, a single semiconductor chip.

The timing control circuit 212 controls the operation timing of each of the vertical scanning circuit 211, the DAC 213, and the column signal processing circuit 260 in synchronization with the vertical synchronization signal VSYNC from the imaging control unit 130.

The DAC 213 generates a sawtooth wave-like ramp signal by digital-to-analog (DA) conversion. The DAC 213 supplies the generated ramp signal to the column signal processing circuit 260.

The vertical scanning circuit 211 sequentially selects and drives rows, and outputs analog pixel signals. The pixel photoelectrically converts the incident light, and generates an analog pixel signal. This pixel supplies the pixel signal to the column signal processing circuit 260 via the load MOS circuit block 250.

In the load MOS circuit block 250, a MOS transistor that supplies a constant current is provided for each column.

The column signal processing circuit 260 executes signal processing such as AD conversion processing and correlated double sampling (CDS) processing on the pixel signal for each column. The column signal processing circuit 260 supplies the image data including the processed signals to the recording unit 120. Note that the column signal processing circuit 260 is an example of a signal processing circuit described in the claims.

Configuration Example of Pixel

Figure 3:
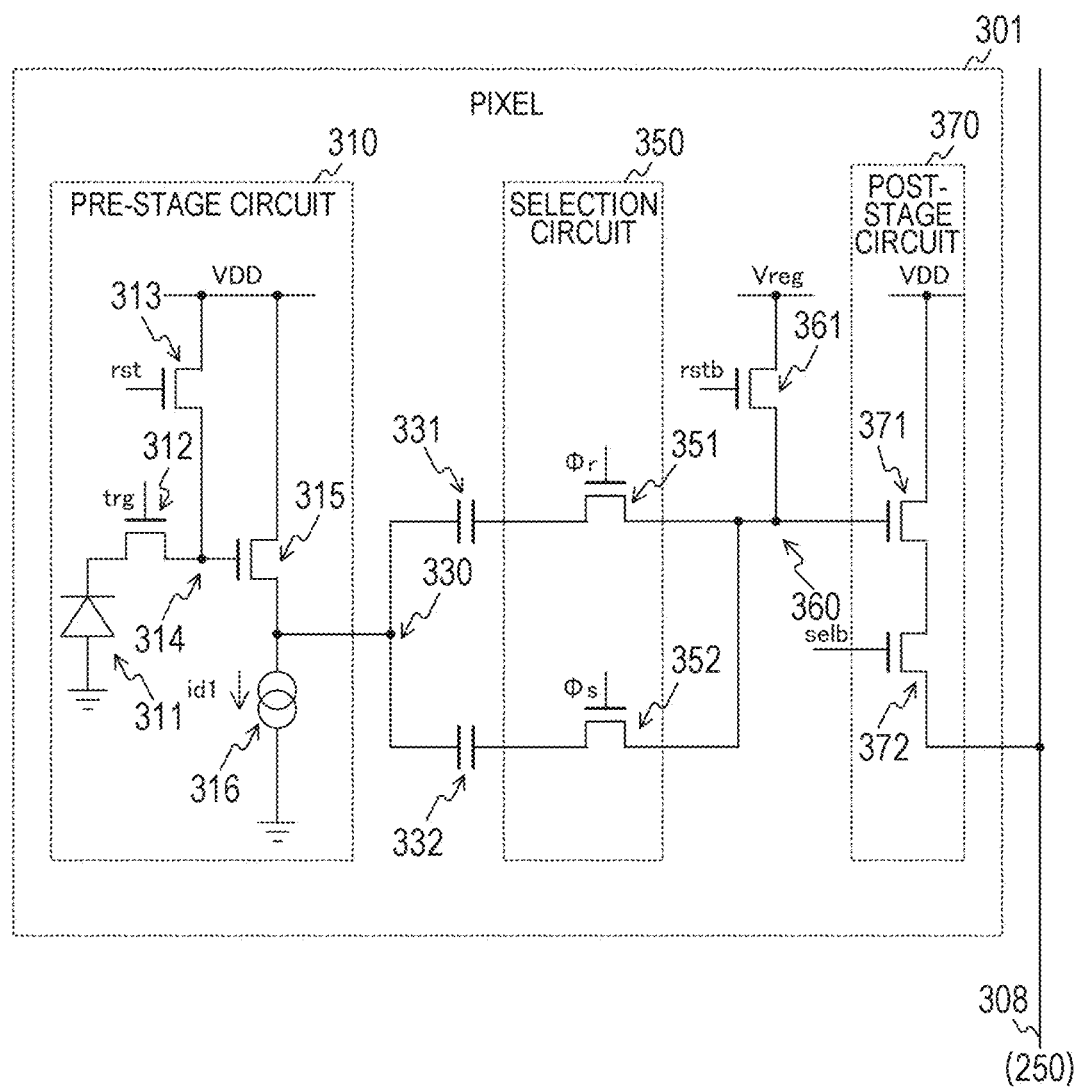
FIG. 3 is a circuit diagram illustrating a configuration example of a pixel in the first embodiment of the present technology.

FIG. 3 is a circuit diagram illustrating a configuration example of the pixel 301 in the first embodiment of the present technology. In the pixel 301, a pre-stage circuit 310, capacitive elements 331 and 332, a selection circuit 350, a post-stage reset transistor 361, and a post-stage circuit 370 are arranged. As the capacitive elements 331 and 332, for example, a capacitor having a metal-insulator-metal (MIM)

structure is used. Note that the capacitive elements 331 and 332 are examples of first and second capacitive elements described in the claims.

The pre-stage circuit 310 sequentially generates a reset level and a signal level, and causes the capacitive elements 331 and 332 to hold the reset level and the signal level. The pre-stage circuit 310 includes a photoelectric conversion element 311, a transfer transistor 312, a floating diffusion (FD) reset transistor 313, an FD 314, a pre-stage amplification transistor 315, and a current source transistor 316.

The photoelectric conversion element 311 generates charges by the photoelectric conversion. The transfer transistor 312 transfers charges from the photoelectric conversion element 311 to the FD 314 in accordance with a transfer signal trg from the vertical scanning circuit 211.

The FD reset transistor 313 extracts and initializes charges from the FD 314 in accordance with a FD reset signal rst from the vertical scanning circuit 211. The FD 314 accumulates charges, and generates a voltage corresponding to a charge amount.

The pre-stage amplification transistor 315 amplifies the level of the voltage of the FD 314, and outputs the amplified voltage to a pre-stage node 330.

The drain of each of the FD reset transistor 313 and the pre-stage amplification transistor 315 is connected to a power supply voltage VDD. The current source transistor 316 is connected to the source of the pre-stage amplification transistor 315. The current source transistor 316 supplies the current id1 under the control of the vertical scanning circuit 211.

One end of each of the capacitive elements 331 and 332 is commonly connected to the pre-stage node 330, and the other end of each of the capacitive elements 331 and 332 is connected to the selection circuit 350.

The selection circuit 350 includes selection transistors 351 and 352. The selection transistor 351 opens and closes a path between the capacitive element 331 and a post-stage node 360 in accordance with a selection signal Φr from the vertical scanning circuit 211. The selection transistor 352 opens and closes a path between the capacitive element 332 and the post-stage node 360 in accordance with a selection signal Φs from the vertical scanning circuit 211.

The post-stage reset transistor 361 initializes the level of the post-stage node 360 to a predetermined potential Vreg in accordance with a post-stage reset signal rstb from the vertical scanning circuit 211. A potential (for example, a potential lower than VDD) different from the power supply voltage VDD is set as the potential Vreg.

The post-stage circuit 370 includes a post-stage amplification transistor 371, and a post-stage selection transistor 372. The post-stage amplification transistor 371 amplifies the level of the post-stage node 360. The post-stage selection transistor 372 outputs a signal at a level amplified by the post-stage amplification transistor 371 to a vertical signal line 308 as a pixel signal in accordance with a post-stage selection signal selb from the vertical scanning circuit 211.

Note that, for example, n-channel metal oxide semiconductor (nMOS) transistors are used as various transistors (transfer transistor 312 and the like) in the pixel 301.

Figure 4:
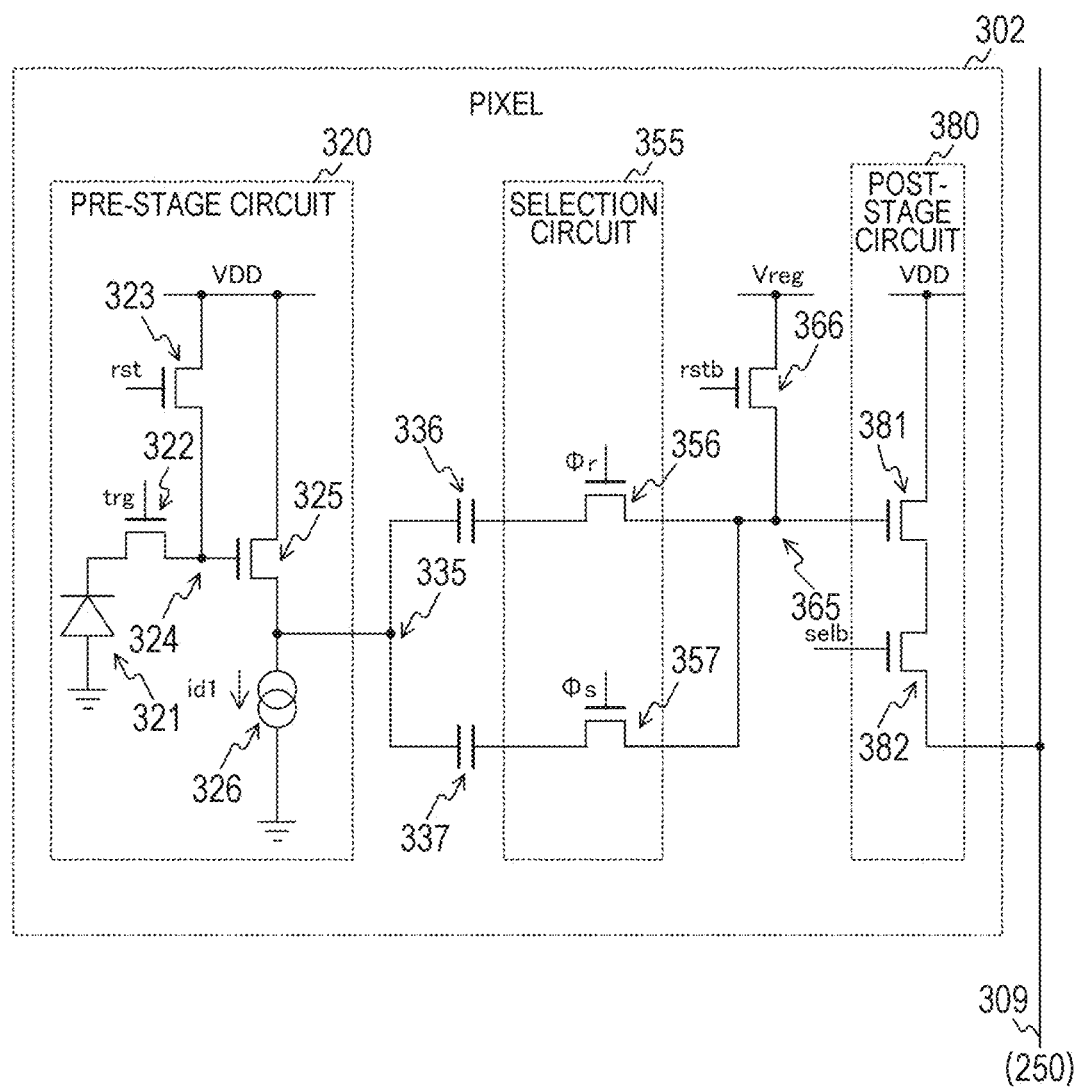
FIG. 4 is a circuit diagram illustrating a configuration example of a pixel adjacent to the pixel of FIG. 3 in the first embodiment of the present technology.

FIG. 4 is a circuit diagram illustrating a configuration example of the pixel 302 adjacent to the pixel 301 of FIG. 3 in the first embodiment of the present technology. In the pixel 302, a pre-stage circuit 320, capacitive elements 336 and 337, a selection circuit 355, a post-stage reset transistor 366, and a post-stage circuit 380 are arranged. As the capacitive elements 336 and 337, for example, a capacitor having a MIM structure is used. Note that the capacitive elements 336 and 337 are examples of third and fourth capacitive elements described in the claims.

The pre-stage circuit 320 sequentially generates a reset level and a signal level, and causes the capacitive elements 336 and 337 to hold the reset level and the signal level. The pre-stage circuit 320 includes a photoelectric conversion element 321, a transfer transistor 322, an FD reset transistor 323, an FD 324, a pre-stage amplification transistor 325, and a current source transistor 326. The circuit configuration of the pre-stage circuit 320 is similar to that of the pre-stage circuit 310.

One end of each of the capacitive elements 336 and 337 is commonly connected to a pre-stage node 335, and the other end of each of the capacitive elements 336 and 337 is connected to the selection circuit 355.

The selection circuit 355 includes selection transistors 356 and 357. The circuit configuration of the selection circuit 350 is similar to that of the selection circuit 350.

The post-stage reset transistor 366 initializes the level of a post-stage node 365 to a predetermined potential Vreg in accordance with the post-stage reset signal rstb from the vertical scanning circuit 211.

The post-stage circuit 380 includes a post-stage amplification transistor 381, and a post-stage selection transistor 382. The circuit configuration of the post-stage circuit 380 is similar to that of the post-stage circuit 370. The pixel signal of the pixel 302 is output to a vertical signal line 309.

The vertical scanning circuit 211 supplies the high-level FD reset signal rst and the high-level transfer signal trg to all rows at the start of exposure. Therefore, the photoelectric conversion element (311 or 321) is initialized. Hereinafter, this control is referred to as "PD reset".

Then, the vertical scanning circuit 211 supplies the high-level FD reset signal rst over the pulse period while setting the post-stage reset signal rstb and the selection signal Φr to the high level for all rows immediately before the end of the exposure. Therefore, the FDs 314 and 324 are initialized, and levels corresponding to the levels of the FDs 314 and 324 at that time are held in the capacitive elements 331 and 336. This control is hereinafter referred to as "FD reset".

The levels of the FDs 314 and 324 at the time of FD reset and levels (the holding level of the capacitive elements 331 and 336 and the level of the vertical signal line) corresponding to the levels are hereinafter collectively referred to as "P-phase" or "reset level".

At the end of the exposure, the vertical scanning circuit 211 supplies the high-level transfer signal trg over the pulse period while setting the post-stage reset signal rstb and the selection signal Φs to the high level for all rows. Therefore, signal charges corresponding to the exposure amount are transferred to the FDs 314 and 324, and levels corresponding to the levels of the FDs 314 and 324 at that time are held in the capacitive elements 332 and 337.

The levels of the FDs 314 and 324 at the time of signal charge transfer and levels (the holding level of the capacitive elements 332 and 337 and the level of the vertical signal line) corresponding to the levels are hereinafter collectively referred to as "D-phase" or "signal level".

The exposure control of simultaneously starting and ending the exposure for all the pixels in this manner is called a global shutter method. By this exposure control, the pre-stage circuits 310 and 320 of all the pixels sequentially generate the reset level and the signal level. The reset level is held in the capacitive elements 331 and 336, and the signal level is held in the capacitive elements 332 and 337.

After the end of the exposure, the vertical scanning circuit 211 sequentially selects a row, and sequentially outputs a reset level and a signal level of the row. In a case of outputting the reset level, the vertical scanning circuit 211 supplies a high-level selection signal Φr over a predetermined period while setting the FD reset signal rst and the post-stage selection signal selb of the selected row to the high level. Therefore, the capacitive elements 331 and 336 are connected to the post-stage nodes 360 and 365, and the reset level is read.

After reading the reset level, the vertical scanning circuit 211 supplies the high-level post-stage reset signal rstb over the pulse period while keeping the FD reset signal rst and the post-stage selection signal selb of the selected row at the high level. Therefore, the levels of the post-stage nodes 360 and 365 are initialized. At this time, the selection transistors 351, 352, 356, and 357 are in an open state, and the capacitive elements 331, 332, 336, and 337 are disconnected from the post-stage nodes 360 and 365.

After the initialization of the post-stage nodes 360 and 365, the vertical scanning circuit 211 supplies a high-level selection signal cs over a predetermined period while keeping the FD reset signal rst and the post-stage selection signal selb of the selected row at the high level. Therefore, the capacitive elements 332 and 337 are connected to the post-stage nodes 360 and 365, and the signal level is read.

By the above-described read control, the selection circuit 350 of the selected row sequentially performs control to connect the capacitive element 331 to the post-stage node 360, control to disconnect the capacitive elements 331 and 332 from the post-stage node 360, and control to connect the capacitive element 332 to the post-stage node 360.

Furthermore, the selection circuit 355 of the selected row sequentially performs control to connect the capacitive element 336 to the post-stage node 365, control to disconnect the capacitive elements 336 and 337 from the post-stage node 365, and control to connect the capacitive element 337 to the post-stage node 365.

Furthermore, in a case where the capacitive elements 331, 332, 336, and 337 are disconnected from the post-stage nodes 360 and 365, the post-stage reset transistor 361 of the selected row initializes the levels of the post-stage nodes 360 and 365. Furthermore, the post-stage circuits 370 and 380 of the selected row sequentially read the reset level and the signal level from the capacitive elements 331 and 332 (alternatively, the capacitive elements 336 and 337) via the post-stage nodes 360 and 365, and output the reset level and the signal level to the vertical signal line 309.

Note that the circuit configuration of each of the pixels 301 and 302 is not limited to that exemplified in FIGS. 3 and 4. As long as a pixel is provided with a pair of capacitive elements and a pair of selection transistors that opens and closes a path between the capacitive elements and a node, a pixel other than those in FIGS. 3 and 4 can also be used. For example, a pixel described in Non-Patent Document 1 can be used.

Figure 5:
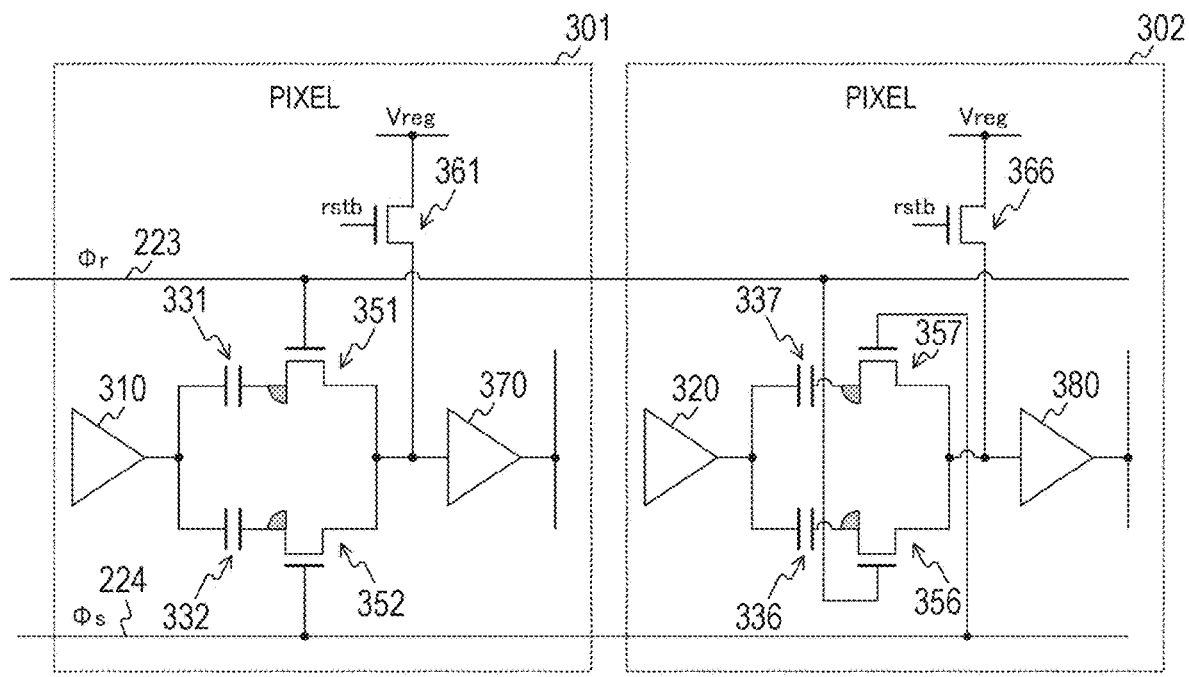
FIG. 5 is a circuit diagram illustrating an example of connection of elements of two adjacent pixels in the first embodiment of the present technology.

FIG. 5 is a circuit diagram illustrating an example of connection of elements of two adjacent pixels in the first embodiment of the present technology. In the pixel array unit 220, a plurality of signal lines for transmitting a control signal from the vertical scanning circuit 211 along the horizontal direction is wired. Six control signals including the transfer signal trg, the FD reset signal rst, the selection signal Φr, the selection signal Φs, the post-stage reset signal rstb, and the post-stage selection signal selb are transmitted row by row. Therefore, six signal lines are wired in the horizontal direction for each row. Among these, a signal line that transmits the selection signal Φr is a selection line 223, and a signal line that transmits the selection signal Φs is a selection line 224.

In the drawing, the roles of the selection transistors arranged on the upper side and the lower side in the pixel 301 are opposite to the roles of the selection transistors arranged on the upper side and the lower side in the pixel 302. Such a configuration can be easily realized by reversing the selection line of the connection destination of each of the selection transistors on the upper side and the lower side in the pixel 302 from that of the pixel 301.

For example, in the pixel 301, the selection transistor 351 arranged on the upper side is connected to the reset-side selection line 223, and the selection transistor 352 arranged on the lower side is connected to the signal-side selection line 224. On the other hand, in the pixel 302, the selection transistor 357 arranged on the upper side is connected to the signal-side selection line 224, and the selection transistor 356 arranged on the lower side is connected to the reset-side selection line 223.

Here, in a case where the column signal processing circuit 260 performs the reading row by row after exposure by the global shutter method, each of the pixels in the row needs to hold a charge over a period from the end of the exposure to the reading. In a case where the period during which the charge is held is long, there is a possibility that noise charges are generated at the pn junction of the selection transistors 351 and 352 due to photoelectric conversion of stray light which is light incident during the period. In the drawing, fan-shaped marks indicate pn junctions where noise charges are generated.

Noise charges generated in the selection transistors 351 and 352 in the pixel 301 are represented by p1 and p2, respectively, and the capacitance value of each of the capacitive elements 331 and 332 is represented by C. In this case, the noise amount Δ of the pixel 301 after the CDS processing is expressed by the following expression.

$$\Delta = (q1)/C - (q2)/C \qquad \text{Expression 1}$$

Furthermore, noise charges generated in the selection transistors 356 and 357 in the pixel 302 are represented by p1' and p2', respectively, and the capacitance value of each of the capacitive elements 337 and 338 is represented by c. In this case, the noise amount Δ' of the pixel 302 after the CDS processing is expressed by the following expression.

$$\Delta' = (q1')/C - (q2')/C \qquad \text{Expression 2}$$

q1 and q2 do not necessarily coincide with each other due to a difference in layout of the junction pn between the selection transistors 351 and 352 in the pixel or a difference in light amount of stray light at the pn junction. As exemplified in Equations 1 and 2, a residual component due to stray light remains even after the CDS processing. The residual component causes deterioration of PLS. The image quality of image data may be degraded due to the deterioration of the PLS.

Therefore, as described above, in the adjacent pixels 301 and 302, the positions of the reset-side selection transistors (351 and 356) and the signal-side selection transistors (352 and 357) are reversed. With this layout, a correlation expressed by the following expression is established for the noise charges of the pixels 301 and 302.

$$q1 \approx q2' \qquad \text{Expression 3}$$

$$q2 \approx q1' \qquad \text{Expression 4}$$

By substituting Expressions 3 and 4 into Expression 2, the following expression is obtained.

$$\Delta' \approx (q2)/C - (q1)/C = -\Delta \qquad \text{Expression 5}$$

As exemplified in Expression 5, the absolute values of the noise amounts due to stray light of the adjacent pixels 301 and 302 are substantially the same, and the signs thereof are reversed.

Figure 6:
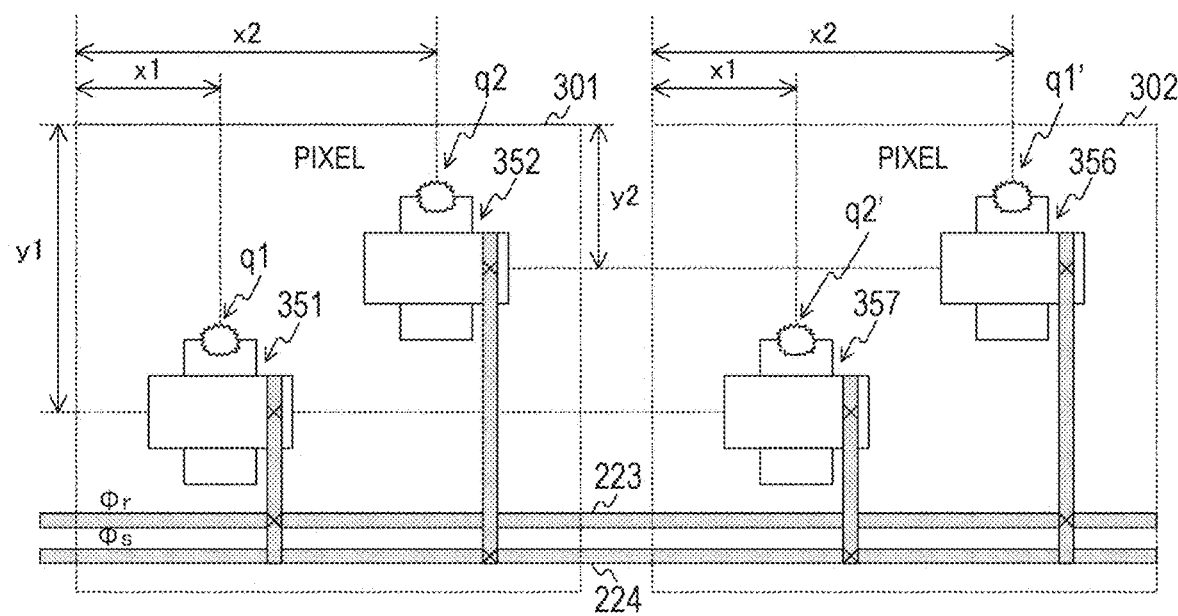
FIG. 6 is a diagram illustrating an example of a layout of a selection transistor in a pixel in the first embodiment of the present technology.

FIG. 6 is a diagram illustrating an example of a layout of the selection transistor in the pixel in the first embodiment of the present technology. It is assumed that in each pixel, the horizontal direction is an x direction, and the vertical direction is a y direction. Furthermore, the position of the transistor in the pixel is represented by a relative position from a predetermined reference position (for example, the upper left vertex) of the pixel.

Furthermore, gray portions in the drawing indicate metal wirings (selection lines 223 and 224 or the like). Cross marks indicate positions of vias that connect metal wirings to other metal wirings or transistors.

In the pixel 301, the selection transistor 351 connected to the reset-side selection line 223 is disposed at a relative position (x1, y1) that is x1 from the reference position in the horizontal direction and y1 from the reference position in the vertical direction. The selection transistor 352 connected to the signal-side selection line 224 is disposed at a relative position (x2, y2).

On the other hand, in the pixel 302, the selection transistor 356 connected to the reset-side selection line 223 is disposed at a relative position (x2, y2). The selection transistor connected to the signal-side selection line 224 is disposed at a relative position (x1, y1).

As exemplified in the drawing, in two adjacent pixels, the arrangement of the reset-side selection transistors (351 and 356) is opposite to the arrangement of the signal-side selection transistors (352 and 357). Therefore, the correlation of Expressions 3 and 4 is established for the noise charges q1, q2, q1', and q2'.

Note that the pixels 301 and 302 are examples of a first pixel and a second pixel described in the claims. The selection transistor 351 is an example of a first selection transistor described in the claims, and the selection transistor 351 is an example of a second selection transistor described in the claims. The selection transistor 356 is an example of a third selection transistor described in the claims, and the selection transistor 357 is an example of a fourth selection transistor described in the claims.

Figure 7:
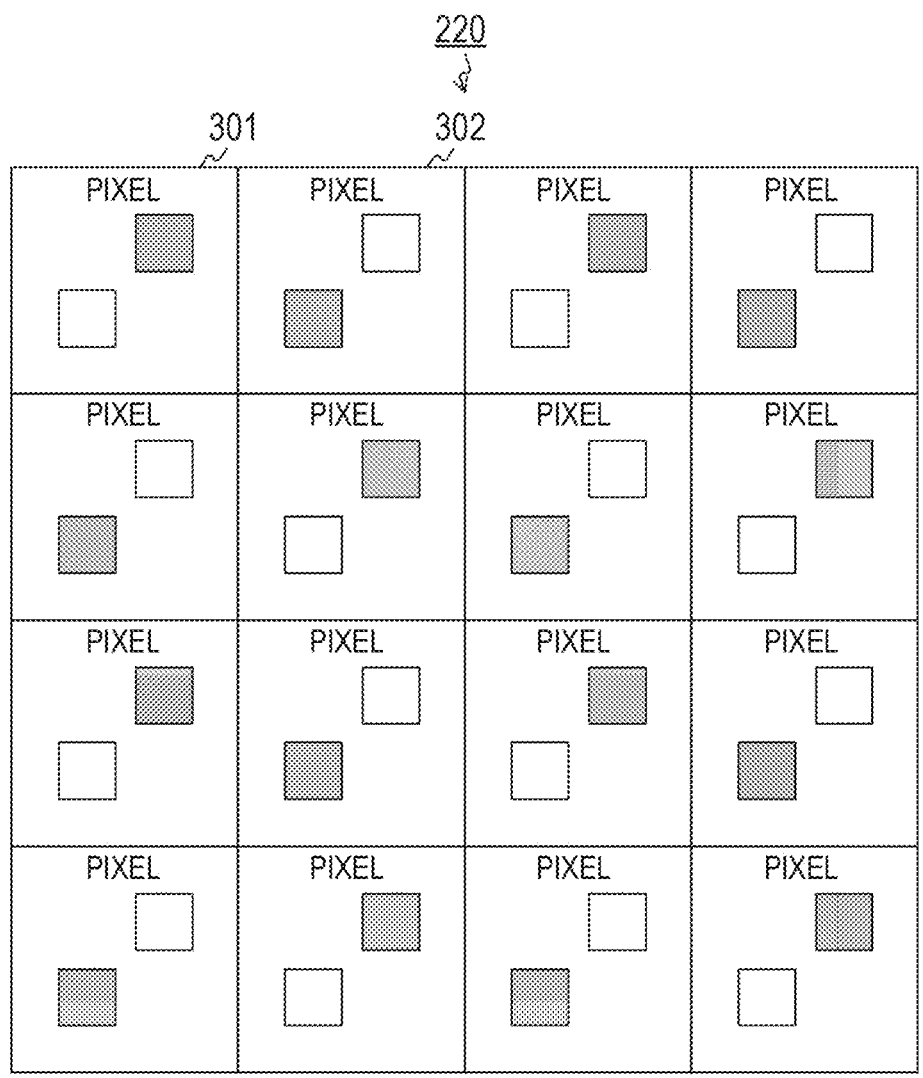
FIG. 7 is a diagram of an example of a pixel array unit in the first embodiment of the present technology.

FIG. 7 is a diagram of an example of the pixel array unit 220 in the first embodiment of the present technology. In the drawing, white squares indicate the positions of the reset-side selection transistors (351 and 356). Black squares indicate the positions of the signal-side selection transistors (352 and 357). Furthermore, it is assumed that a color filter is not provided in each of the pixels. Therefore, the image data is a monochrome image.

As exemplified in the drawing, the pixel 301 and the pixel 302 are arranged adjacent to each other in the row direction. Furthermore, in the row direction, pixels having a layout similar to that of the pixel 301 and pixels having a layout similar to that of the pixel 302 are alternately arranged. Also in the column direction, pixels having a layout similar to that of the pixel 301 and pixels having a layout similar to that of the pixel 302 are alternately arranged. With this arrangement, the signs of the generated noise can be reversed in any of two adjacent pixels. Therefore, in a case where the entire image data in which these pixels are arranged is observed, the noises of two adjacent pixels cancel each other, and the noise due to stray light becomes inconspicuous. Therefore, it is possible to suppress the degradation of the image quality due to deterioration in the PLS.

[Configuration Example of Column Signal Processing Circuit]

Figure 8:
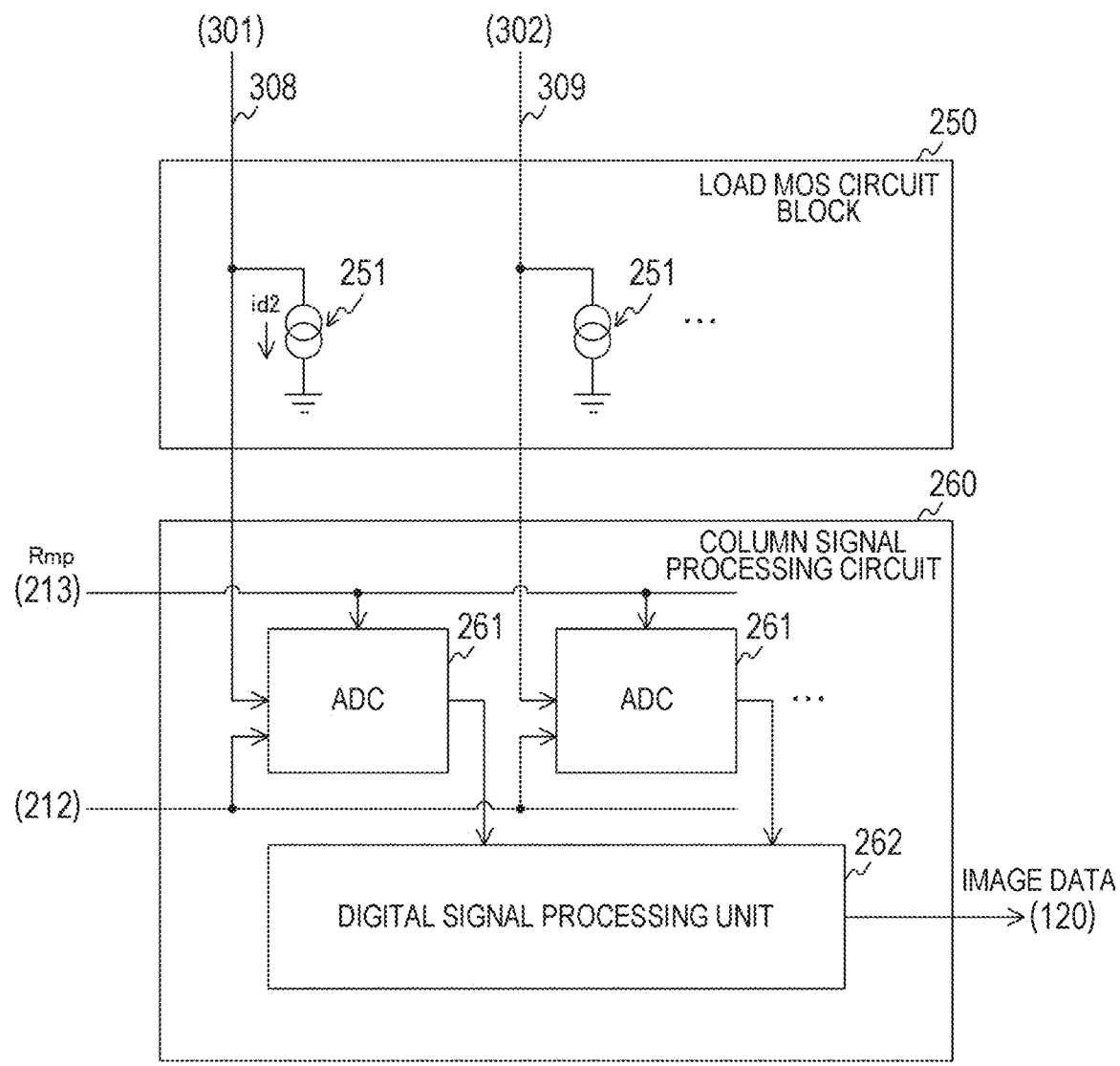
FIG. 8 is a block diagram illustrating a configuration example of a column signal processing circuit in the first embodiment of the present technology.

FIG. 8 is a block diagram illustrating a configuration example of the column signal processing circuit 260 in the first embodiment of the present technology.

In the load MOS circuit block 250, the vertical signal line 309 is wired for each column. In a case where the number of columns is I (I is an integer), I vertical signal lines 309 are wired. Furthermore, a load MOS transistor 251 that supplies a constant current id2 is connected to each of the vertical signal lines 309.

In the column signal processing circuit 260, a plurality of ADCs 261 and a digital signal processing unit 262 are arranged. The ADC 261 is arranged for each column. In a case where the number of columns is I, I ADCs 261 are arranged.

The ADC 261 converts an analog pixel signal from the corresponding column into a digital signal using a ramp signal Rmp from the DAC 213. The ADC 261 supplies the digital signal to the digital signal processing unit 262. For example, a single-slope ADC including a comparator and a counter is arranged as the ADC 261.

The digital signal processing unit 262 performs predetermined signal processing such as CDS processing on each of the digital signals for each column. The digital signal processing unit 262 supplies image data including the processed digital signal to the recording unit 120.

[Operation Example of Solid-State Imaging Element]

Figure 9:
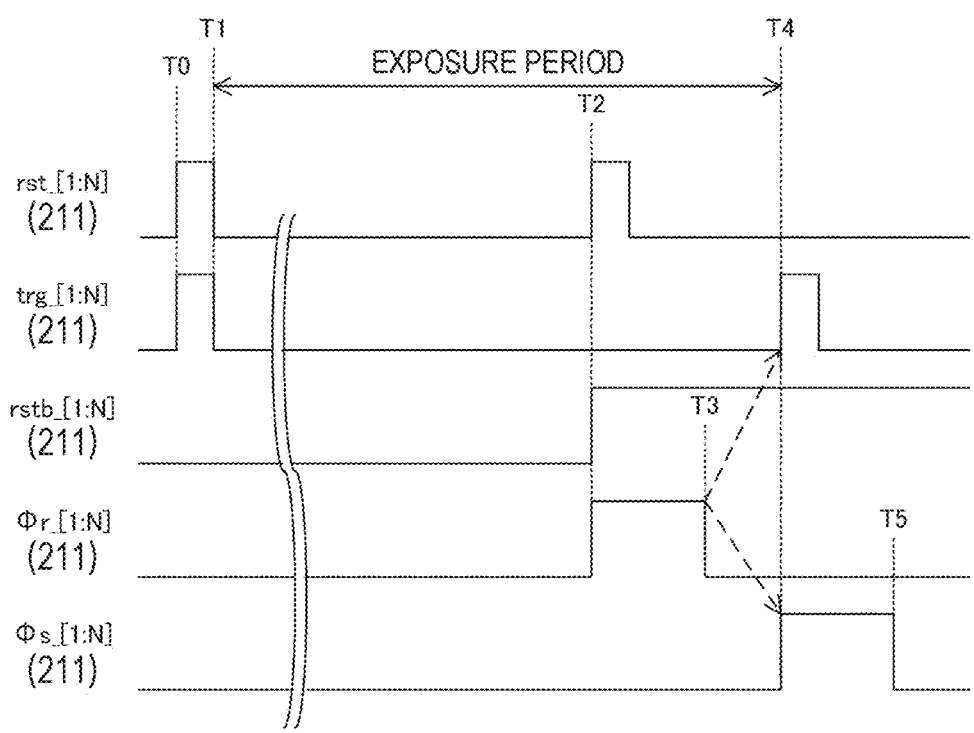
FIG. 9 is a timing chart illustrating an example of a global shutter operation in the first embodiment of the present technology.

FIG. 9 is a timing chart illustrating an example of a global shutter operation in the first embodiment of the present technology. The vertical scanning circuit 211 supplies the high-level FD reset signal rst and the high-level transfer signal trg to all the rows (in other words, all pixels) from timing T0 immediately before the start of the exposure to timing T1 after the pulse period elapses. Therefore, all the pixels are PD reset, and the exposure is simultaneously started in all the rows.

Here, rst_[n] and trg_[n] in the drawing indicate signals to pixels in the n-th row among the N rows. N is an integer indicating the total number of rows in which the pixel blocks 300 are arranged, and n is an integer from 1 to N.

At timing T2 immediately before the end of the exposure period, the vertical scanning circuit 211 supplies the high-level FD reset signal rst over the pulse period while setting the post-stage reset signal rstb and the selection signal Φr to the high level for all rows. Therefore, all the pixels are FD reset, and the reset level is sampled and held. Here, rstb_[n] and ψr_[n] in the drawing indicate signals to pixels in the n-th row.

At timing T3 after timing T2, the vertical scanning circuit 211 returns the selection signal ψr to the low level.

At timing T4 of the end of the exposure, the vertical scanning circuit 211 supplies the high-level transfer signal trg over the pulse period while setting the post-stage reset signal rstb and the selection signal Φs of all the rows to the high level. Therefore, the signal level is sampled and held. Furthermore, Φs_[n] in the drawing indicates signals to pixels in the n-th row.

At timing T5 after timing T4, the vertical scanning circuit 211 returns the selection signal Φs to the low level.

Figure 10:
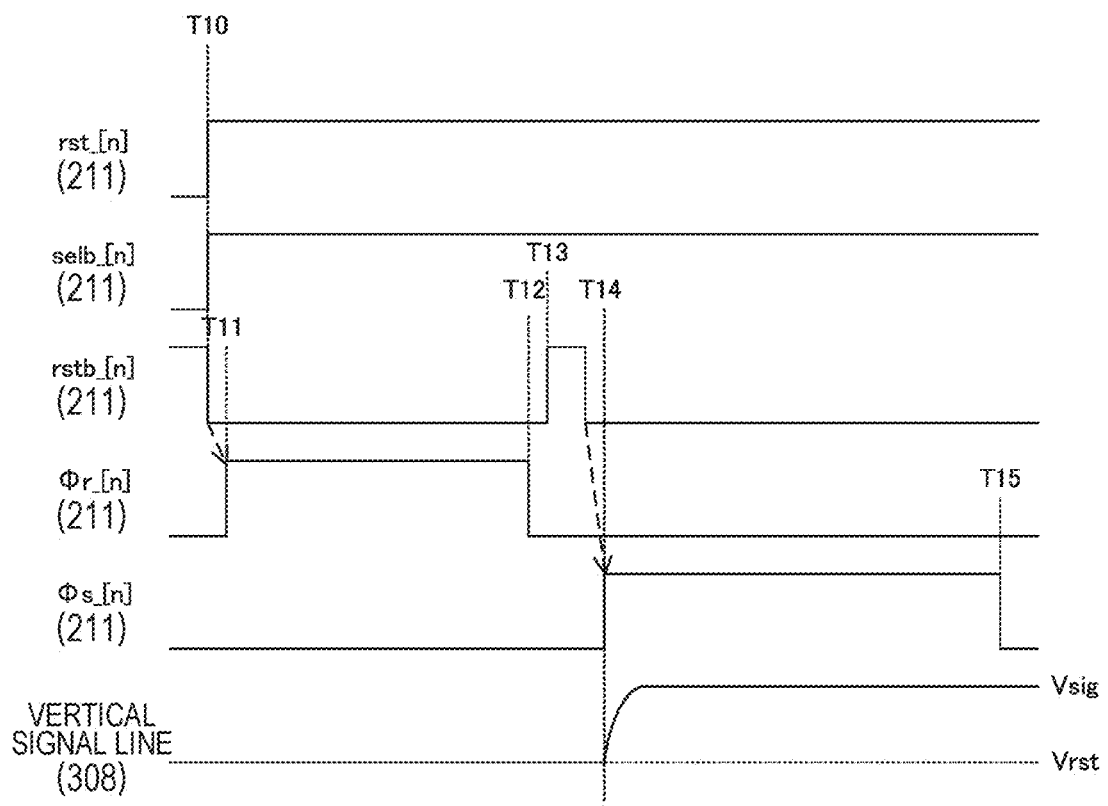
FIG. 10 is a timing chart illustrating an example of a read operation of the pixel in the first embodiment of the present technology.

FIG. 10 is a timing chart illustrating an example of a read operation of the pixel in the first embodiment of the present technology. In a read period of the n-th row after timing T10, the vertical scanning circuit 211 sets the FD reset signal rst and the post-stage selection signal selb of the n-th row to the high level. Furthermore, at timing T10, the post-stage reset signal rstb of all the rows are controlled to the low level. Here, selb_[n] in the drawing indicates signals to pixels in the n-th row.

The vertical scanning circuit 211 supplies the high-level selection signal Φr to the n-th row over a period from timing T11 immediately after timing T10 to timing T12. The potentials of the post-stage nodes 360 and 365 become the reset level Vrst. This reset level is AD-converted by the ADC 261.

The vertical scanning circuit 211 supplies the high-level post-stage reset signal rstb to the n-th row over the pulse period from timing T13 immediately after timing T12. Therefore, in a case where a parasitic capacitance exists in the post-stage node 360 or the like, the history of the previous signal held in the parasitic capacitance can be erased.

The vertical scanning circuit 211 supplies the high-level selection signal Φs to the n-th row over a period from timing T14 immediately after initialization of the post-stage node 360 and the like to timing T15. The potentials of the post-stage nodes 360 and 365 become the signal level Vsig. This signal level is AD-converted by the ADC 261. The difference between the reset level Vrst and the signal level Vsig corresponds to the net signal level from which the reset noise and the offset noise of the FD have been removed.

Note that the solid-state imaging element 200 reads the signal level after the reset level, but is not limited to this order. The solid-state imaging element 200 can also read the reset level after the signal level. In this case, the vertical scanning circuit 211 supplies the high-level selection signal Φr after the high-level selection signal Φs. Furthermore, in this case, it is necessary to reverse the slope of the slope of the ramp signal.

Figure 11:
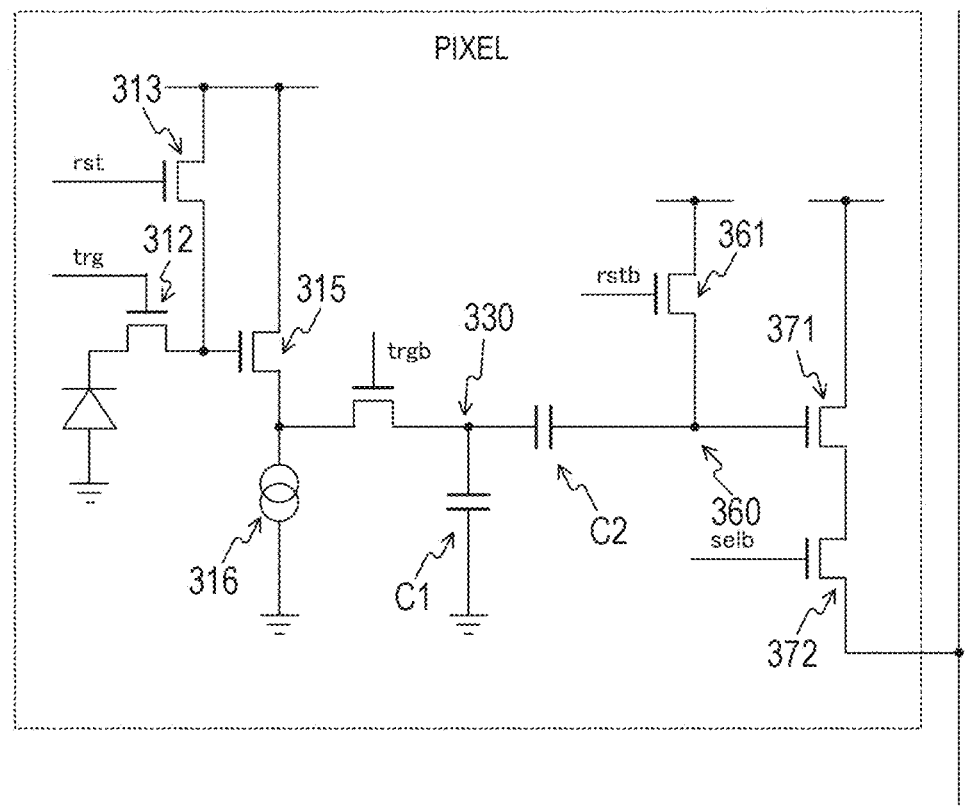
FIG. 11 is a circuit diagram illustrating a configuration example of a pixel in a comparative example.

FIG. 11 is a circuit diagram illustrating a configuration example of a pixel in a comparative example. In this comparative example, the selection circuit 350 is not provided, and the transfer transistor is inserted between the pre-stage node 330 and the pre-stage circuit. Furthermore, capacitors C1 and C2 are inserted instead of the capacitive elements 331 and 332. The capacitor C1 is inserted between the pre-stage node 330 and the ground terminal, and the capacitor C2 is inserted between the pre-stage node 330 and the post-stage node 360.

The exposure control and the read control of the pixel in this comparative example are described in FIG. 5.5.2 of "Jae-kyu Lee, et al., A 2.1e-Temporal Noise and −105 dB Parasitic Light Sensitivity Backside-Illuminated 2.3 µm-Pixel Voltage-Domain Global Shutter CMOS Image Sensor Using High-Capacity DRAM Capacitor Technology, ISSCC 2020", for example. In this comparative example, assuming that the capacitance value of each of the capacitors C1 and C2 is C, the level Vn of the kTC noise at the time of the exposure and the reading is expressed by the following expression.

$$Vn=(3*kT/C)^{1/2} \qquad \text{Expression 6}$$

In the above expression, k is a Boltzmann constant, and the unit is, for example, Joule per Kelvin (J/K). T is an absolute temperature, and the unit is, for example, Kelvin (K). Furthermore, the unit of Vn is, for example, volt (V), and the unit of C is, for example, farad (F).

Figure 12:
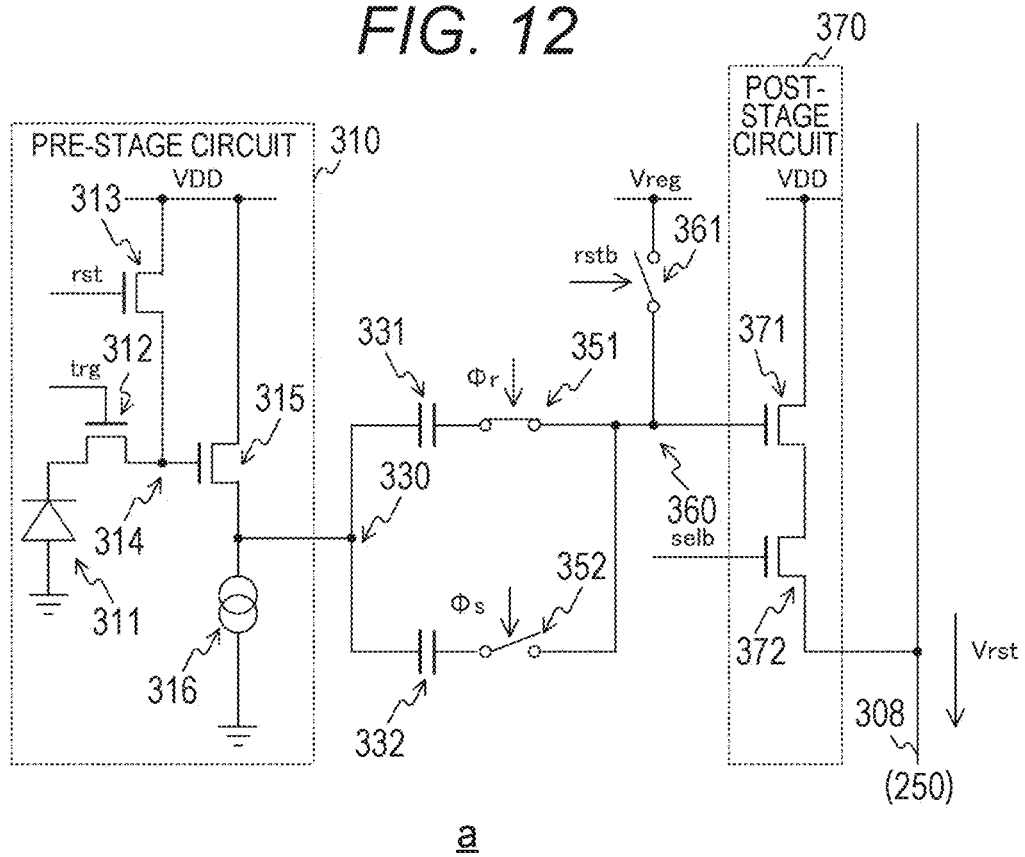
FIG. 12 is a diagram illustrating an example of states of a pixel at the time of reading the reset level and at the time of initialization of a post-stage node in the first embodiment of the present technology.
Figure 12:
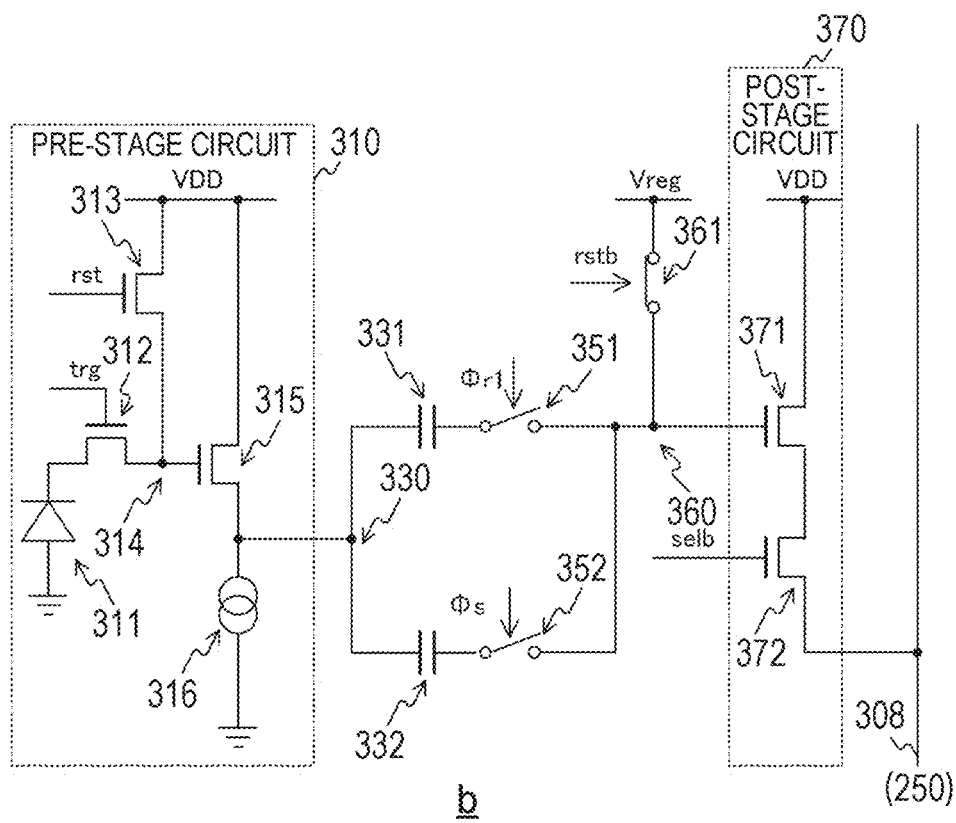

FIG. 12 is a diagram illustrating an example of states of the pixel 301 at the time of reading the reset level and at the time of initialization of the post-stage node in the first embodiment of the present technology. In the drawing, a indicates the state of the pixel 301 at the time of reading the reset level, and b in the drawing indicates the state of the pixel 301 at the time of initialization of the post-stage node 360. Furthermore, in the drawing, the selection transistor 351, the selection transistor 352, and the post-stage reset transistor 361 are represented by graphical symbols of switches for convenience of description.

As exemplified in a of the drawing, the vertical scanning circuit 211 closes the selection transistor 351, and opens the selection transistor 352 and the post-stage reset transistor 361. Therefore, the reset level of the first pixel is read through the post-stage circuit 370.

As exemplified in b of the drawing, after the reset level is read, the vertical scanning circuit 211 opens the selection transistor 351 and the selection transistor 352, and closes the post-stage reset transistor 361. Therefore, the capacitive elements 331 and 332 are disconnected from the post-stage node 360, and the level of the post-stage node 360 is initialized.

The capacitance value of the parasitic capacitance Cp of the post-stage node 360 disconnected from the capacitive elements 331 and 332 in this manner is assumed to be very small as compared with the capacitive elements 331 and 332. For example, assuming that the parasitic capacitance Cp is several femtofarads (fF), the capacitive elements 331 and 332 are on the order of several tens of femtofarads.

Figure 13:
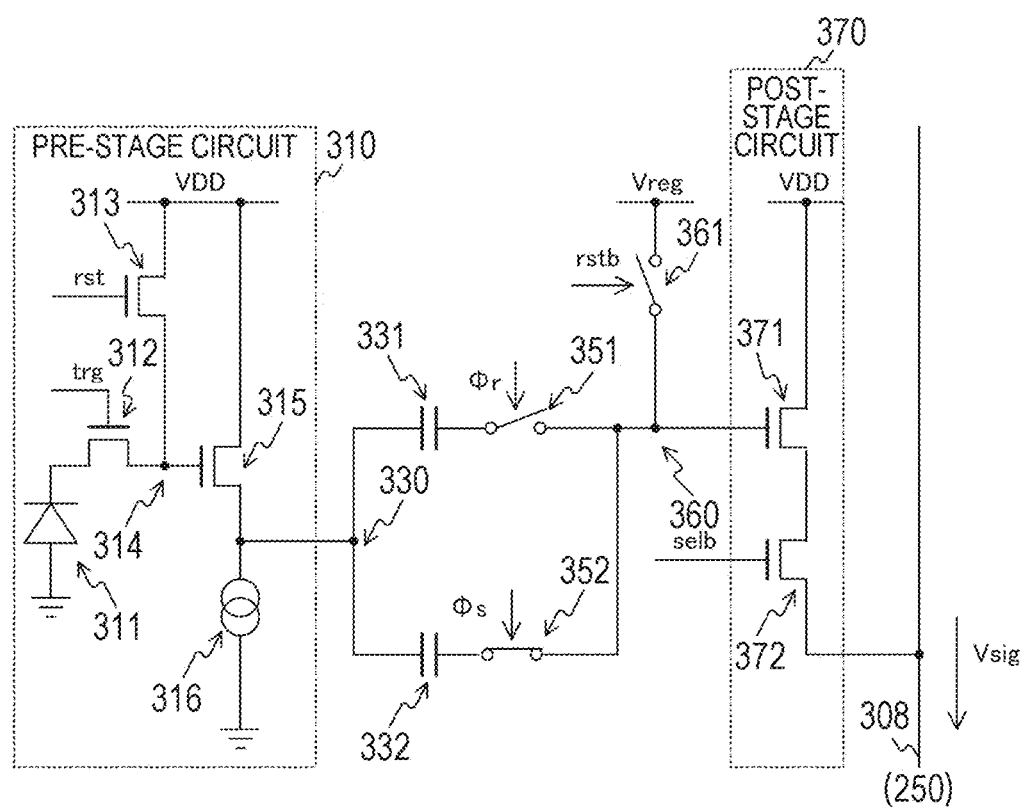
FIG. 13 is a diagram illustrating an example of a state of a pixel at the time of reading the signal level in the first embodiment of the present technology.

FIG. 13 is a diagram illustrating an example of a state of the pixel 301 at the time of reading the signal level in the first embodiment of the present technology.

After the initialization of the post-stage node 360, the vertical scanning circuit 211 closes the selection transistor 352, and opens the selection transistor 351 and the post-stage reset transistor 361. Therefore, the signal level of the first pixel is read through the post-stage circuit 370.

Here, kTC noise at the time of exposure of pixels is considered. At the time of exposure, kTC noise occurs in each of sampling of a reset level and sampling of a signal level immediately before the end of the exposure. Assuming that the capacitance value of each of the capacitive elements 331 and 332 is C, a level Vn of the kTC noise at the time of exposure is expressed by the following expression.

$$Vn=(2*kT/C)^{1/2} \qquad \text{Expression 7}$$

Furthermore, as exemplified in FIGS. 12 and 13, since the post-stage reset transistor 361 is driven at the time of reading, kTC noise occurs at that time. However, the capacitive elements 331 and 332 are disconnected at the time of driving the post-stage reset transistor 361, and the parasitic capacitance Cp at that time is small. Therefore, the kTC noise at the time of reading can be ignored as compared with the kTC noise at the time of exposure. Therefore, the kTC noise at the time of the exposure and the reading is expressed by Expression 7.

With Expressions 6 and 7, in the pixel block 300 in which the capacitor is disconnected at the time of reading, the kTC noise is smaller than that in the comparative example in which the capacitor cannot be disconnected at the time of reading. Therefore, the image quality of the image data can be improved.

Figure 14:
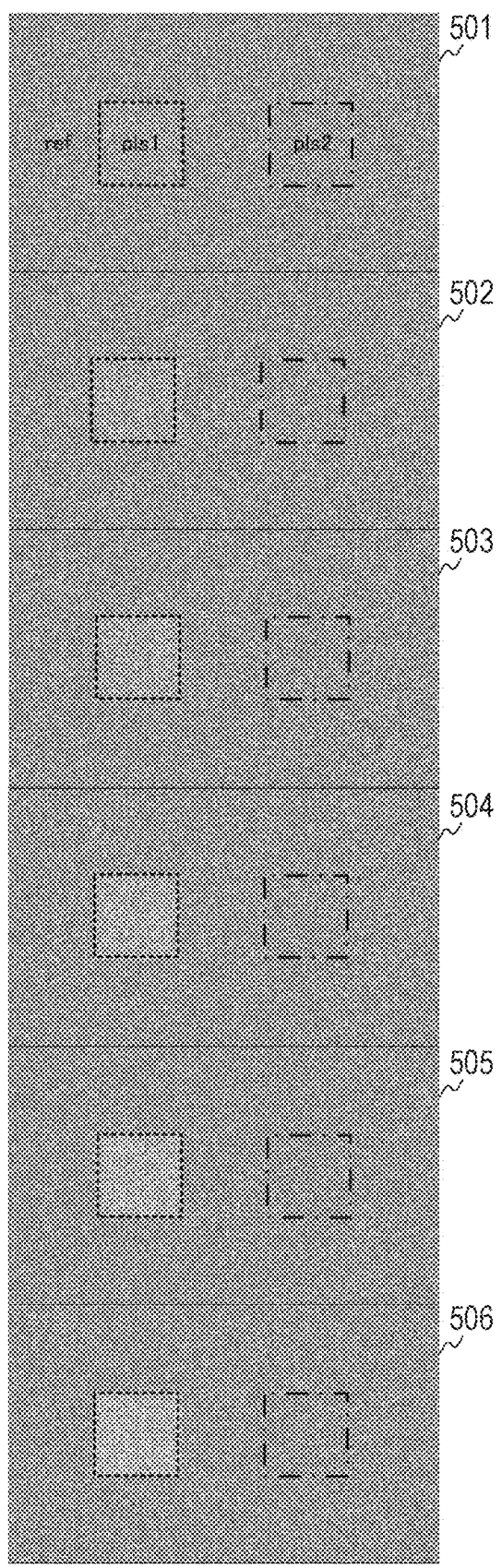
FIG. 14 is a diagram illustrating an example of image data in the first embodiment of the present technology.

FIG. 14 is a diagram illustrating an example of the image data in the first embodiment of the present technology. In the drawing, each of image data 501 to 506 includes an area pls1 surrounded by a one-dot chain line and an area pls2 surrounded by a dotted line. Furthermore, it is assumed that in the image data, an area other than the areas pls1 and pls2 is set as an area ref.

In each of the pixels in the area pls1, the arrangement of the reset-side selection transistor and the arrangement of the signal-side selection transistor are the same. Furthermore, it is assumed that noise is generated in the area pls1.

In the area pls2, in two adjacent pixels, the arrangement of the reset-side selection transistor is opposite to the arrangement of the signal-side selection transistor. In other words, noise countermeasures by layout are taken. Furthermore, it is assumed that noise similar to that in the area pls1 is also generated in the area pls2.

In each of the pixels in the area ref, the arrangement of the reset-side selection transistor and the arrangement of the signal-side selection transistor are the same. Furthermore, it is assumed that noise is not generated in the area ref.

Furthermore, it is assumed that in the image data 501 to 506, the amount RN of random noise in a case where PLS is zero is the same value. On the other hand, the image data 501 to 506 are different in PLS, and the value of PLS/RN of the image data 501 is 1/10. The values of PLS/RN of the remaining 502 to 506 are 2/10, 3/10, 4/10, 5/10, and 6/10, respectively.

Here, as the value of PLS, for example, a ratio σ/AVE of the standard deviation σ and the average value AVE of the output in the area in a case where uniform light of 50% of saturation is applied is used.

As exemplified in the drawing, in the image data 501 with the relatively small PLS, there is almost no difference between pls1 having no noise countermeasure and the area pls2 having the noise countermeasure, and the noise is inconspicuous.

However, in the image data 502 to 506, as PLS is increased, the noise of pls1 becomes more conspicuous, and the difference from pls2 becomes remarkable in the image data 506.

FIG. 15 is a diagram illustrating an example of the average value and the standard deviation in the area in the first embodiment of the present technology. As described above, no noise is generated in the area ref, and no noise countermeasure is taken. In the area pls1, noise is generated, and no noise countermeasure is taken. In the area pls2, noise is generated, and noise countermeasures by layout are taken.

It is assumed that the average value of the pixel signals in the area ref is REF in LSB conversion, and the standard deviation is 30. At this time, the average value of the pixel signals in the area pls1 is REF+18, and the standard deviation is 30. On the other hand, the average value of the pixel signals in the area pls2 is REF, and the standard deviation is 35.

FIG. 16 is a diagram for describing the influence of PLS in the first embodiment of the present technology. As described above, the random noise RN in a case where PLS of each of the image data 501 to 505 is zero has the same value. On the other hand, the image data 501 to 505 are different in PLS, and the values of PLS with respect to RN are "0.1", "0.2", "0.3", "0.4", and "0.5".

Here, the random noise RN' in a case where PLS occurs is obtained by the following expression.

$$RN'=(RN^2+PLS^2)^{1/2} \quad \text{Expression 8}$$

"1.0005", "1.020", "1.044", "1.077", and "1.118" are respectively calculated for the image data 501 to 505 by Expression 8.

The degree of deterioration of random noise due to deterioration in the PLS is expressed by the following expression.

$$r=(RN'-RN)\times 100 \quad \text{Expression 9}$$

With Expression 9, "0.5", "2.0", "4.4", "7.7", and "11.8" percent (%) are respectively calculated for the image data 501 to 505.

As described above, in a case where PLS/RN is about 0.2, an increase rate of the random noise is only about 2 percent (%) and can be ignored. On the other hand, in a case where PLS/RN is about 0.5, an increase rate of the random noise is increased up to 11.2 percent (?). However, as exemplified in FIG. 14, although the random noise is increased, the area pls2 in which noise countermeasures are taken is in a state where it is difficult to visually determine from the area ref having no noise.

As described above, according to the first embodiment of the present technology, in the adjacent pixels 301 and 302, since the arrangement of the two selection transistors is reversed, signs of the noise generated in the respective pixels are reversed. Therefore, the noise of the image data can be made inconspicuous, and the image quality can be improved.

First Modification Example

In the first embodiment described above, a color filter is not provided in the pixel, but a color filter may be provided for each pixel to capture a color image. The solid-state imaging element 200 in a first modification example of the first embodiment is different from that of the first embodiment in that pixels are arranged in a Bayer array.

Figure 17:
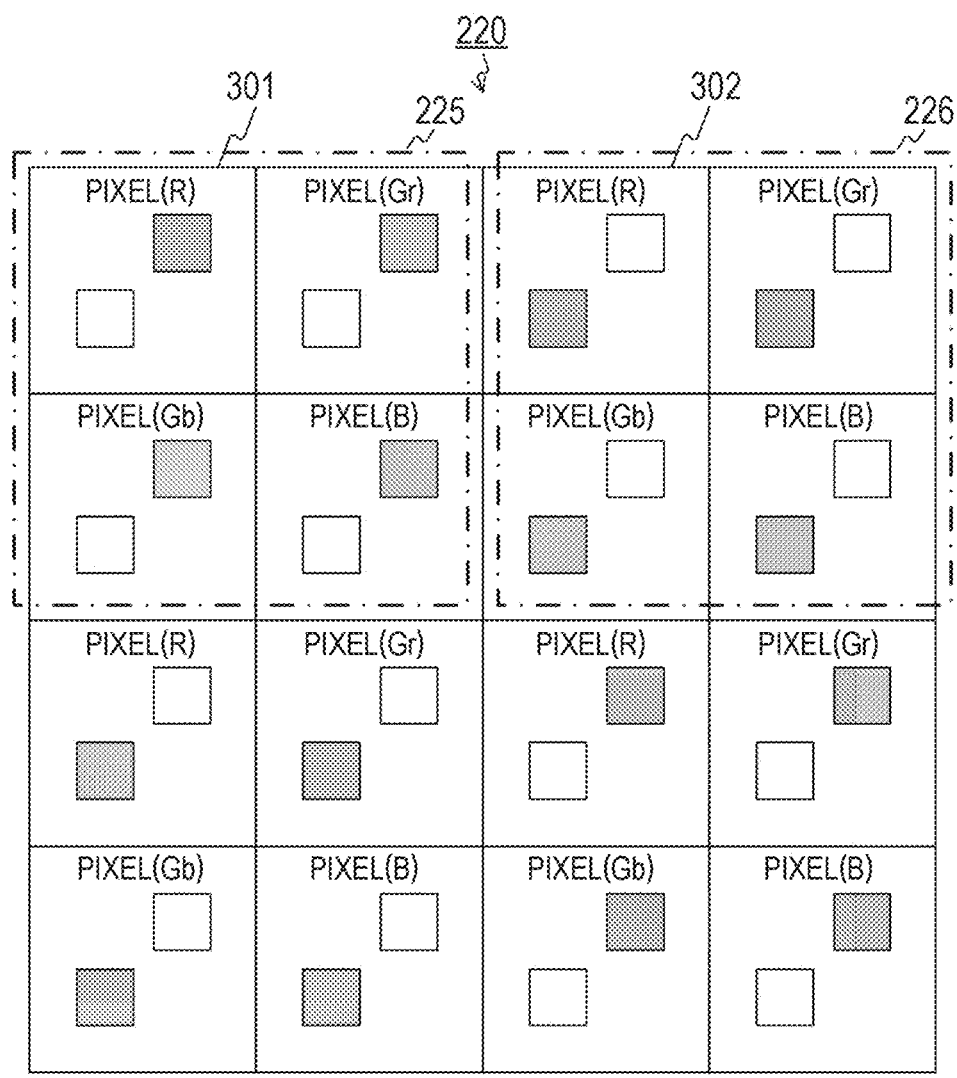
FIG. 17 is a diagram illustrating an example of a pixel array unit in a first modification example of the first embodiment of the present technology.

FIG. 17 is a diagram illustrating an example of the pixel array unit 220 in the first modification example of the first embodiment of the present technology. In the pixel array unit 220 of the first modification example of the first embodiment, a color filter is provided for each pixel. It is assumed that a pixel of a red color filter is an R pixel, a pixel of a green color filter is a Gr pixel or a Gb pixel, and a pixel of a blue color filter is a B pixel. These pixels are arranged in a Bayer array.

It is assumed that 2 rows×2 columns adjacent to a predetermined area 225 of 2 rows×2 columns are set as an area 226. In the area 225, four pixels having the similar layout as the pixel 301 are arranged. On the other hand, in the area 226, four pixels having the similar layout as the pixel 302 are arranged. The same applies to two adjacent areas other than the areas 225 and 226.

As exemplified in the drawing, by reversing the arrangements of the two selection transistors in two adjacent areas, the image quality of the color image can be improved.

Figure 18:
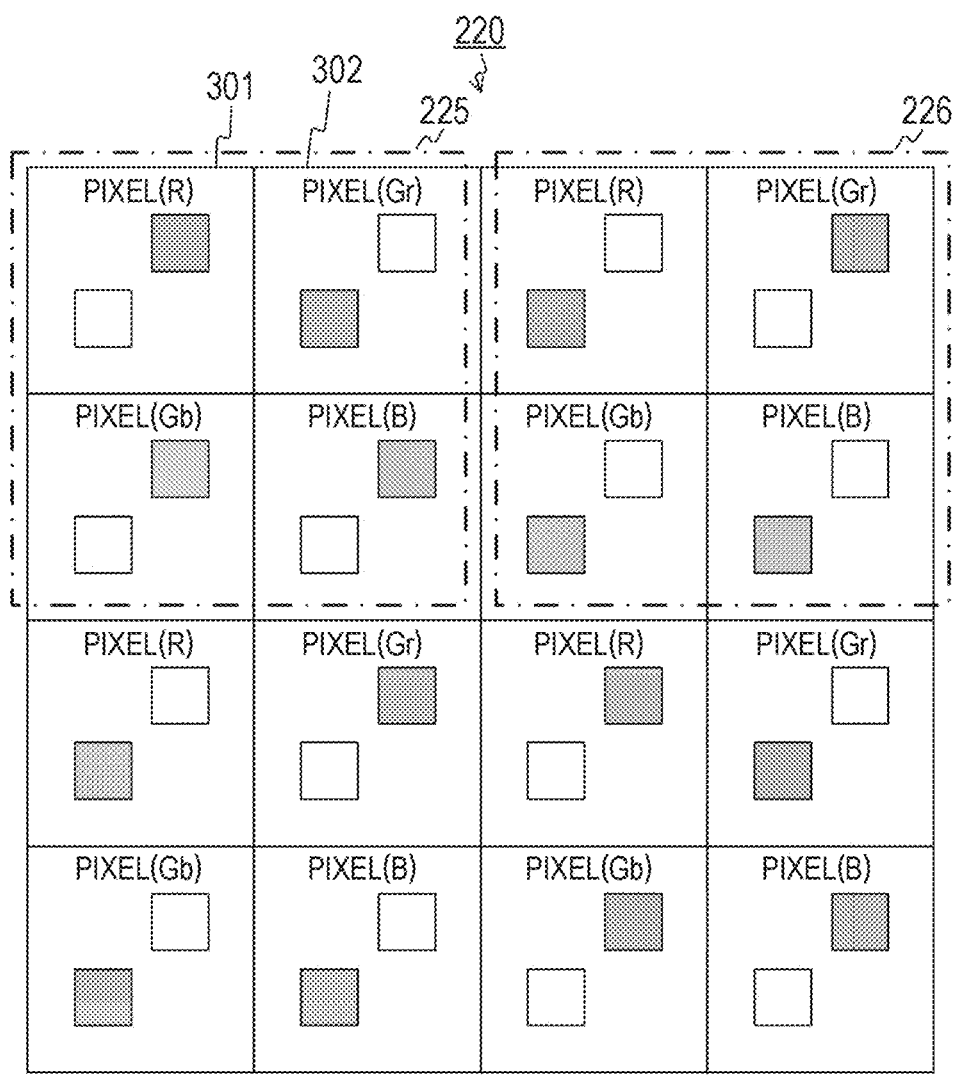
FIG. 18 is a diagram illustrating another example of a pixel array unit in the first modification example of the first embodiment of the present technology.

Note that, as exemplified in FIG. 18, any pixel (for example, Gr pixel) in the area 225 may have a layout similar to that of the pixel 302, and the remaining three pixels may have a layout similar to that of the pixel 301. In this case, in the adjacent area 226, the pixel having a layout similar to that of the pixel 301 is arranged as the Gr pixel, and the pixels having a layout similar to that of the pixel 302 are arranged as the remaining three pixels.

As described above, according to the first modification example of the first embodiment of the present technology, since the pixels having the similar layout as the pixels 301 and 302 are arranged in a Bayer array, the image quality of the color image can be improved.

Second Modification Example

In the first embodiment described above, a color filter is not provided in the pixel, but a color filter may be provided for each pixel to capture a color image. The solid-state imaging element 200 in a second modification example of the first embodiment is different from that of the first embodiment in that pixels are arranged in a Quad Bayer array.

Figure 19:
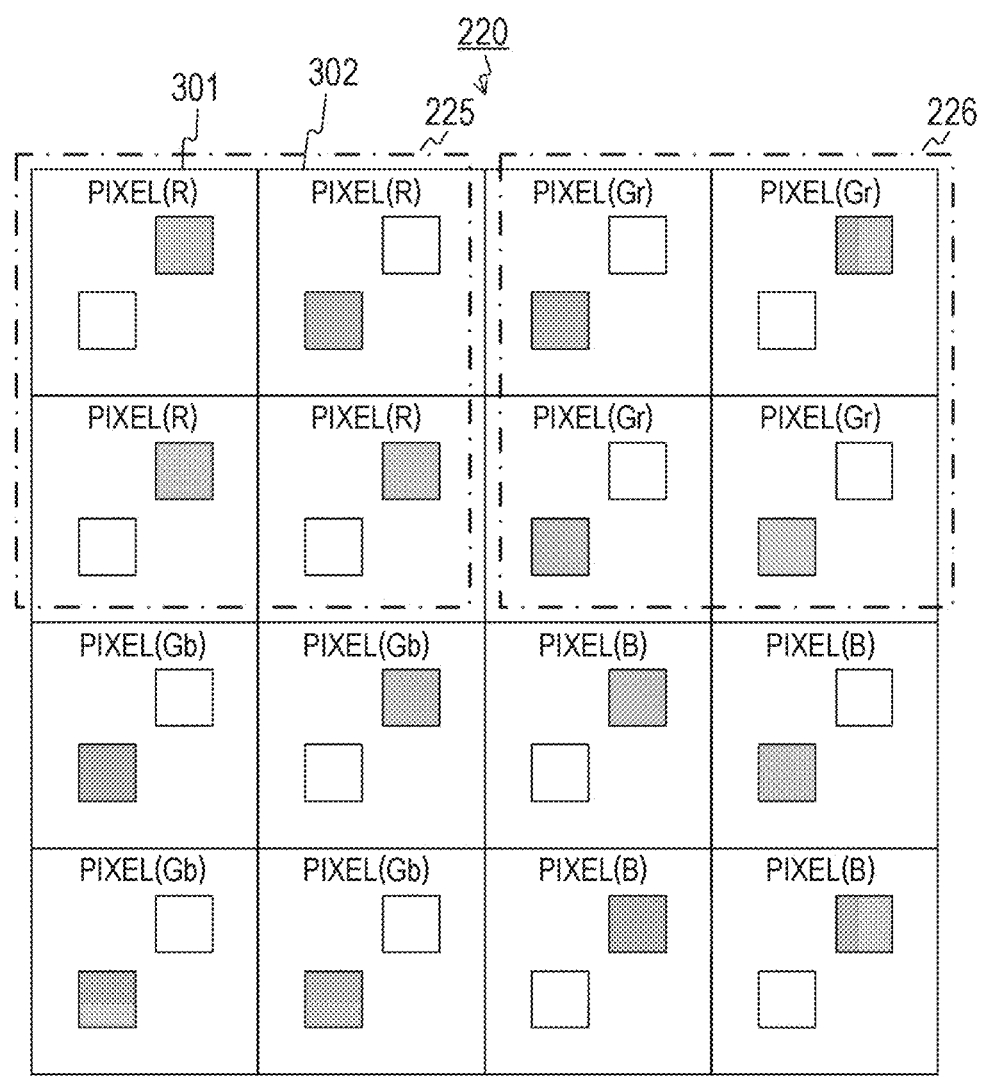
FIG. 19 is a diagram illustrating an example of a pixel array unit in a second modification example of the first embodiment of the present technology.

FIG. 19 is a diagram illustrating an example of the pixel array unit 220 in the second modification example of the first embodiment of the present technology. In the pixel array unit 220 of the second modification example of the first embodiment, R pixels, Gr pixels, Gb pixels, and B pixels are arranged in a Quad Bayer array. In the Quad Bayer array, four pixels of the same color are arranged in an area of 2 rows×2 columns.

It is assumed that 2 rows×2 columns of green adjacent to the area 225 of 2 rows×2 columns of red are set as the area 226. A pixel having a layout similar to that of the pixel 302 is arranged at any position (for example, upper right) in the area 225, and three pixels having a layout similar to that of the pixel 301 are arranged in the rest. On the other hand, in the adjacent area 226, a pixel having a layout similar to that of the pixel 301 is arranged in the upper right, and three pixels having a layout similar to that of the pixel 302 are arranged in the rest. The same applies to two adjacent areas other than the areas 225 and 226.

As described above, according to the second modification example of the first embodiment of the present technology, since the pixels having the similar layout as the pixels 301 and 302 are arranged in a Quad Bayer array, the image quality of the color image can be improved.

2. Second Embodiment

In the first embodiment described above, the post-stage reset transistor and the selection circuit are arranged for each pixel, but in this configuration, it is difficult to reduce the circuit scale. The solid-state imaging element 200 of the second embodiment is different from that of the first embodiment in that two adjacent pixels share a post-stage reset transistor and a selection circuit.

Figure 20:
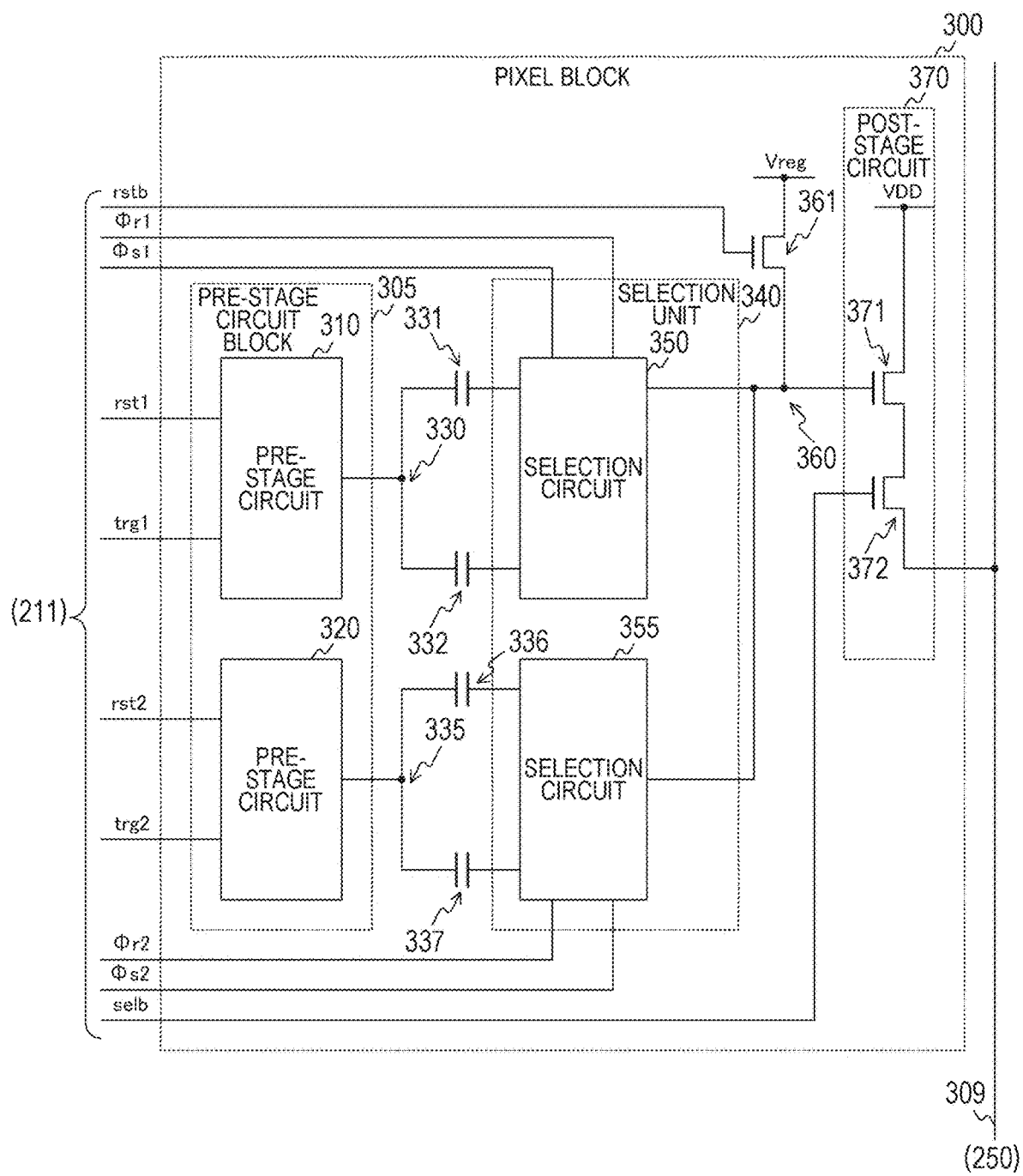
FIG. 20 is a circuit diagram illustrating a configuration example of a pixel block in a second embodiment of the present technology.

FIG. 20 is a circuit diagram illustrating a configuration example of the pixel block 300 in the second embodiment of the present technology. In the pixel array unit 220 of the second embodiment, a plurality of pixel blocks 300 is arranged. In each of the pixel blocks 300, the pixels 301 and 302 are arranged.

In the pixel block 300, a pre-stage circuit block 305, the capacitive elements 331, 332, 336, and 337, a selection unit 340, the post-stage reset transistor 361, and the post-stage circuit 370 are arranged.

Furthermore, the pre-stage circuits 310 and 320 are arranged in the pre-stage circuit block 305. In the selection unit 340, the selection circuits 350 and 355 are arranged. The post-stage circuit 370 includes the post-stage amplification transistor 371, and the post-stage selection transistor 372.

The selection circuit 350 connects one of the capacitive elements 331 and 332 to the post-stage node 360. The selection circuit 355 connects one of the capacitive elements 336 and 337 to the post-stage node 360. Note that the selection circuit 350 is an example of a first selection circuit described in the claims, and the selection circuit 355 is an example of a second selection circuit described in the claims.

Figure 21:
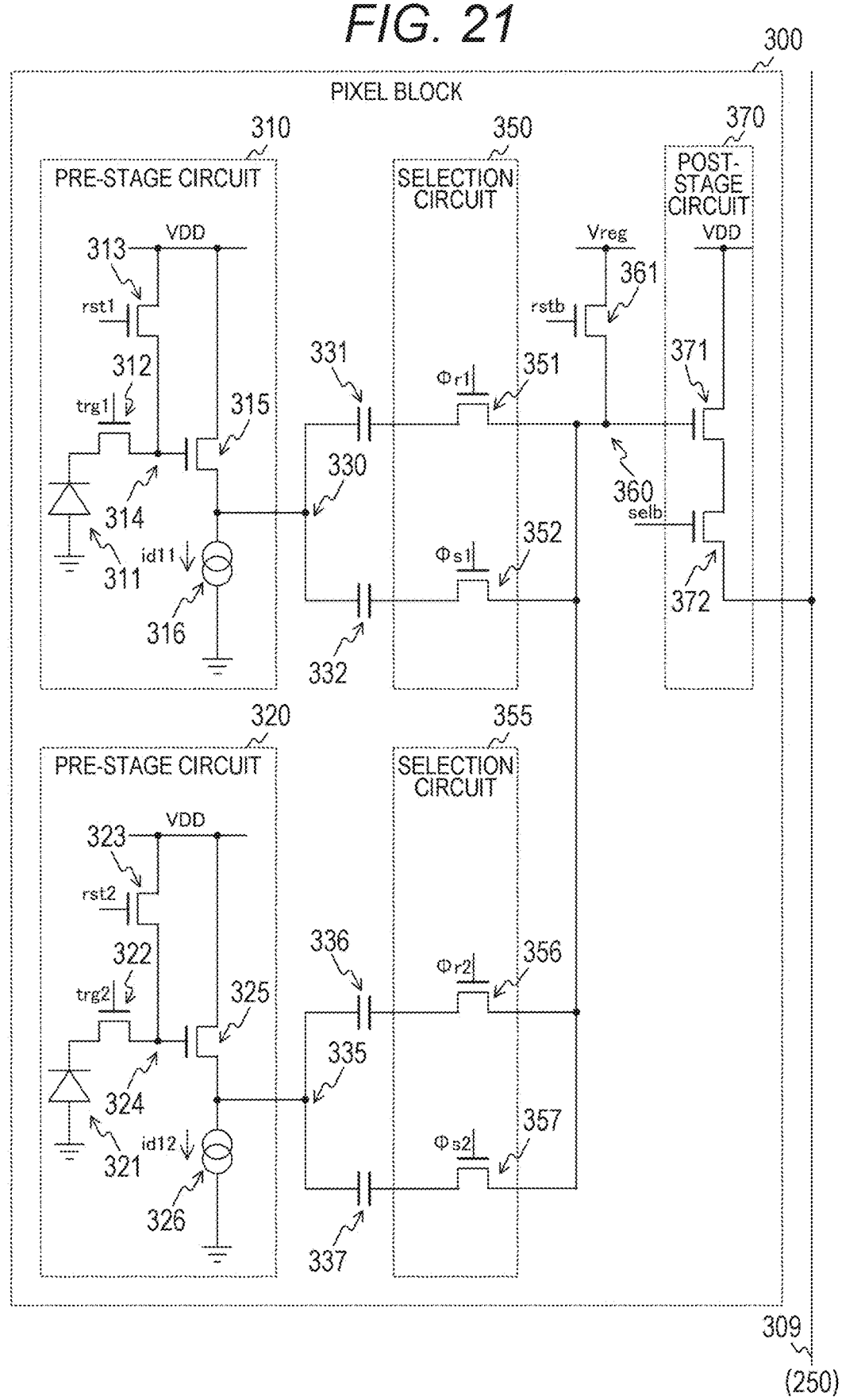
FIG. 21 is a circuit diagram illustrating a configuration example of pre-stage circuits and selection circuits in the second embodiment of the present technology.

FIG. 21 is a circuit diagram illustrating a configuration example of the pre-stage circuits 310 and 320 and the selection circuits 350 and 355 in the second embodiment of the present technology.

The pre-stage circuit 310 includes the photoelectric conversion element 311, the transfer transistor 312, the FD reset transistor 313, the FD 314, the pre-stage amplification transistor 315, and the current source transistor 316.

Furthermore, the pre-stage circuit 320 includes the photoelectric conversion element 321, the transfer transistor 322, the FD reset transistor 323, the FD 324, the pre-stage amplification transistor 325, and the current source transistor 326.

The photoelectric conversion elements 311 and 321 generate charges by the photoelectric conversion. The transfer transistor 312 transfers charges from the photoelectric conversion element 311 to the FD 314 in accordance with a transfer signal trg1 from the vertical scanning circuit 211. The transfer transistor 322 transfers charges from the photoelectric conversion element 321 to the FD 324 in accordance with a transfer signal trg2 from the vertical scanning circuit 211.

Note that the photoelectric conversion elements 311 and 321 are examples of first and second photoelectric conversion elements described in the claims. Note that the transfer transistors 312 and 322 are examples of first and second transfer transistors described in the claims.

The FD reset transistor 313 extracts and initializes charges from the FD 314 in accordance with a FD reset signal rst1 from the vertical scanning circuit 211. The FD reset transistor 323 extracts and initializes charges from the FD 324 in accordance with a FD reset signal rst2 from the vertical scanning circuit 211. The FDs 314 and 324 accumulate charges, and generate a voltage corresponding to a charge amount.

Note that the FD reset transistors 313 and 323 are examples of first and second reset transistors described in the claims. The FDs 314 and 324 are examples of first and second floating diffusion layers described in the claims.

The pre-stage amplification transistor 315 amplifies the level of the voltage of the FD 314, and outputs the amplified voltage to the pre-stage node 330. The pre-stage amplification transistor 325 amplifies the level of the voltage of the FD 324, and outputs the amplified voltage to the pre-stage node 335. Note that the pre-stage amplification transistors 315 and 325 are examples of first and second pre-stage amplification transistors described in the claims.

The drain of each of the FD reset transistors 313 and 323 and the pre-stage amplification transistors 315 and 325 is connected to the power supply voltage VDD. The current source transistor 316 is connected to the source of the pre-stage amplification transistor 315. The current source transistor 316 supplies the current id11 under the control of the vertical scanning circuit 211. The current source transistor 326 is connected to the source of the pre-stage amplification transistor 325. The current source transistor 326 supplies the current id12 under the control of the vertical scanning circuit 211.

Note that the current source transistors 316 and 326 are examples of first and second current source transistors described in the claims.

One end of each of the capacitive elements 331 and 332 is commonly connected to the pre-stage node 330, and the other end of each of the capacitive elements 331 and 332 is connected to the selection circuit 350. One end of each of the capacitive elements 336 and 337 is commonly connected to the pre-stage node 335, and the other end of each of the capacitive elements 336 and 337 is connected to the selection circuit 355.

The selection circuit 350 includes selection transistors 351 and 352. The selection transistor 351 opens and closes a path between the capacitive element 331 and a post-stage node 360 in accordance with a selection signal Φr1 from the vertical scanning circuit 211. The selection transistor 352 opens and closes a path between the capacitive element 332 and the post-stage node 360 in accordance with a selection signal Φs1 from the vertical scanning circuit 211.

The selection circuit 355 includes selection transistors 356 and 357. The selection transistor 356 opens and closes a path between the capacitive element 336 and the post-stage node 360 in accordance with the selection signal Φr2 from the vertical scanning circuit 211. The selection transistor 357 opens and closes a path between the capacitive element 337 and the post-stage node 360 in accordance with the selection signal Φs2 from the vertical scanning circuit 211.

Note that, for example, an nMOS transistor is used as various transistors (transfer transistor 312 and the like) in the pixel block 300.

The circuit including the pre-stage circuit 310, the capacitive elements 331 and 332, the selection circuit 350, the post-stage reset transistor 361, and the post-stage circuit 370 described above functions as one pixel. Furthermore, the circuit including the pre-stage circuit 320, the capacitive elements 336 and 337, the selection circuit 355, the post-stage reset transistor 361, and the post-stage circuit 370 described above also functions as one pixel. The post-stage reset transistor 361 and the post-stage circuit 370 are shared by these two pixels.

Furthermore, two pixels in the pixel block 300 are arranged in the column direction, for example. In other words, these two pixels are arranged in an odd row and an even row. Note that the positional relationship between the two pixels in the pixel block 300 is not limited to an odd row and an even row. For example, two pixels can be arranged in an odd column and an even column. Alternatively, one of the two pixels can be arranged diagonally above the other pixel.

Figure 22:
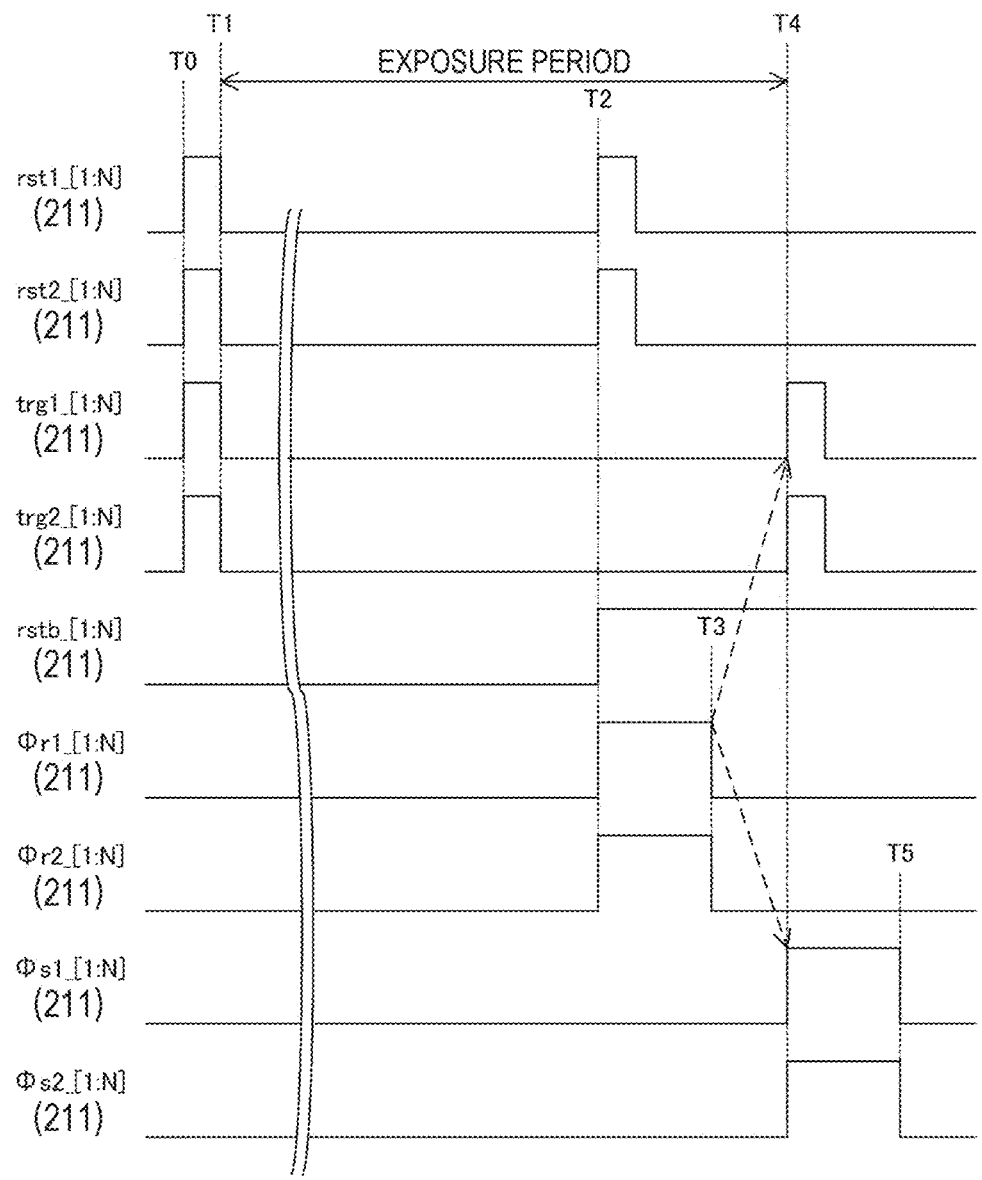
FIG. 22 is a timing chart illustrating an example of a global shutter operation in the second embodiment of the present technology.

FIG. 22 is a timing chart illustrating an example of the global shutter operation in the second embodiment of the present technology. The vertical scanning circuit 211 supplies the high-level FD reset signals rst1 and rst2 and the high-level transfer signals trg1 and trg2 to all the rows (in other words, all pixels) from timing T0 immediately before the start of the exposure to timing T1 after the pulse period elapses. Therefore, all the pixels are PD reset, and the exposure is simultaneously started in all the rows.

Here, rst1_[n], rst2_[n], trg1_[n], and trg2_[n] in the drawing indicate signals to pixels in the n-th row among the N rows. N is an integer indicating the total number of rows in which the pixel blocks 300 are arranged, and n is an integer from 1 to N. In a case where two pixels in the pixel block 300 are pixels in an even row and an odd row, the n-th row of the pixel block 300 includes two rows, an odd row and an even row.

At timing T2 immediately before the end of the exposure period, the vertical scanning circuit 211 supplies the high-level FD reset signals rst1 and rst2 over the pulse period while setting the post-stage reset signal rstb and the selection signals Φr1 and Φr2 of all the rows to the high level. Therefore, all the pixels are FD reset, and the reset level is sampled and held. Here, rstb_[n], Φ_r1_[n], and Φr2_[n] in the drawing indicate signals to pixels in the n-th row.

At timing T3 after timing T2, the vertical scanning circuit 211 returns the selection signals Φr1 and Φr2 to the low level.

At timing T4 of the end of the exposure, the vertical scanning circuit 211 supplies the high-level transfer signals trg1 and trg2 over the pulse period while setting the post-stage reset signal rstb and the selection signals Φs1 and Φs2 of all the rows to the high level. Therefore, the signal level is sampled and held. Furthermore, Φs1_[n] and Φs2_[n] in the drawing indicates signals to pixels in the n-th row.

At timing T5 after timing T4, the vertical scanning circuit 211 returns the selection signals Φs1 and Φs2 to the low level.

Figure 23:
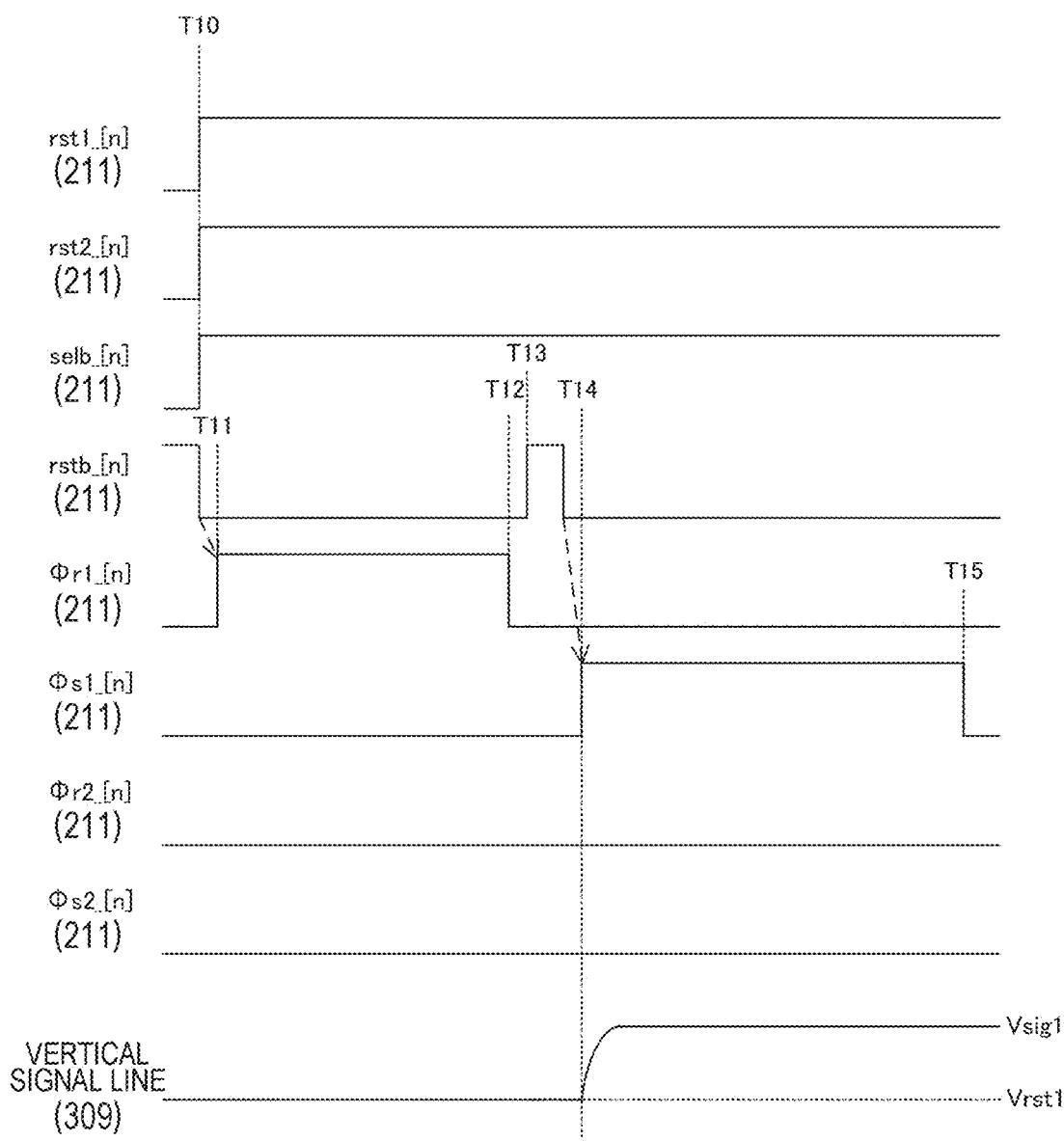
FIG. 23 is a timing chart illustrating an example of a read operation of a first pixel in the pixel block in the second embodiment of the present technology.

FIG. 23 is a timing chart illustrating an example of the read operation of the first pixel in the pixel block 300 in the second embodiment of the present technology. In the read period of the n-th row after timing T10, the vertical scanning circuit 211 sets the FD reset signals rst1 and rst2 and the post-stage selection signal selb of the n-th row to the high level. Furthermore, at timing T10, the post-stage reset signal rstb of all the rows are controlled to the low level. Here, selb_[n] in the drawing indicates signals to pixels in the n-th row.

The vertical scanning circuit 211 supplies the high-level selection signal Φr1 to the n-th row over a period from timing T11 immediately after timing T10 to timing T12. The potential of the post-stage node 360 becomes the reset level Vrst1. This reset level is AD-converted by the ADC 261.

The vertical scanning circuit 211 supplies the high-level post-stage reset signal rstb to the n-th row over the pulse period from timing T13 immediately after timing T12. Therefore, in a case where a parasitic capacitance exists in the post-stage node 360, the history of the previous signal held in the parasitic capacitance can be erased.

The vertical scanning circuit 211 supplies the high-level selection signal Φs1 to the n-th row over a period from timing T14 immediately after initialization of the post-stage node 360 to timing T15. The potential of the post-stage node 360 becomes the signal level Vsig1. This signal level is AD-converted by the ADC 261. The difference between the reset level Vrst1 and the signal level Vsig1 corresponds to the net signal level from which the reset noise and the offset noise of the FD have been removed.

Figure 24:
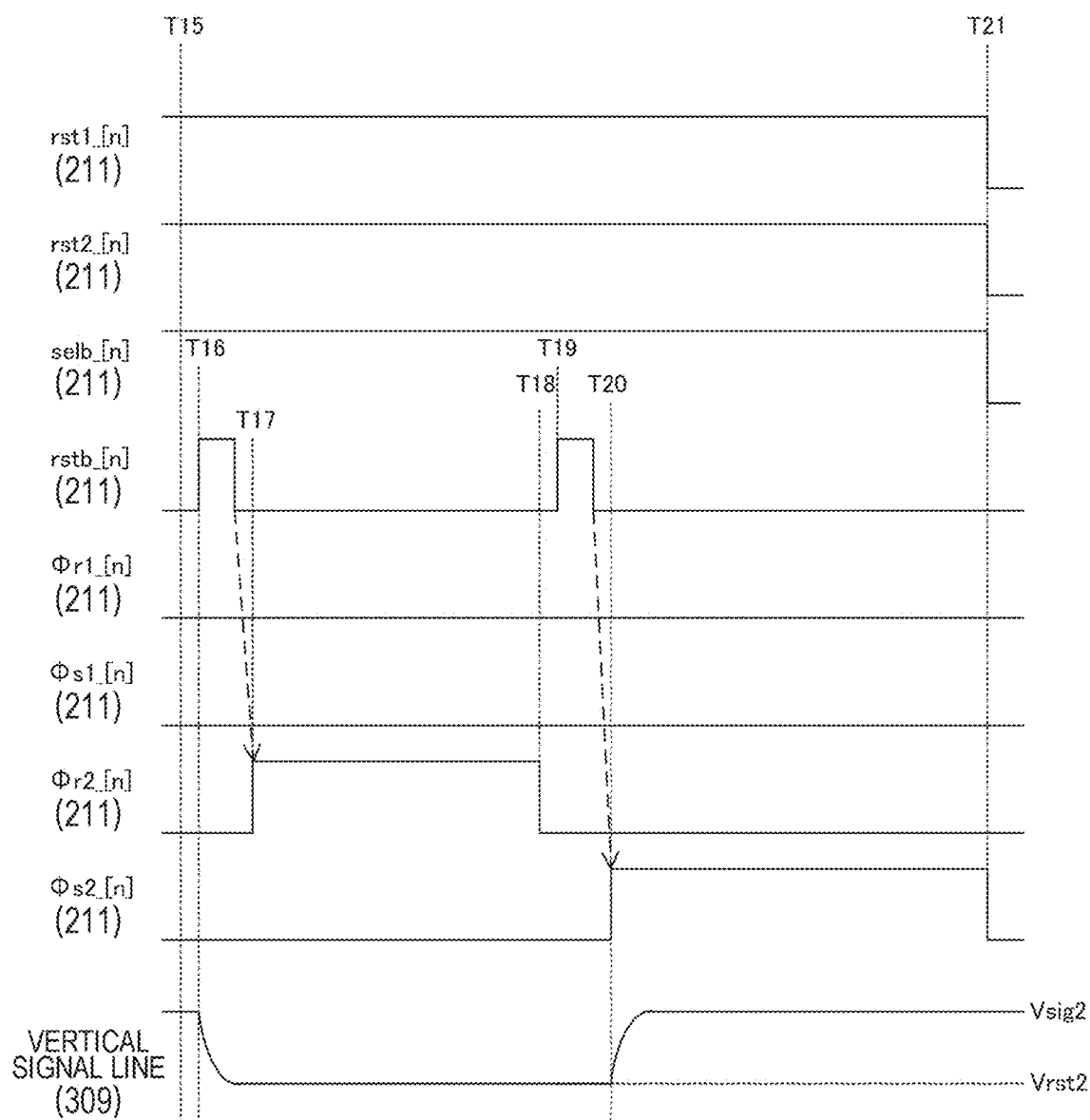
FIG. 24 is a timing chart illustrating an example of a read operation of a second pixel in the pixel block in the second embodiment of the present technology.

FIG. 24 is a timing chart illustrating an example of the read operation of the second pixel in the pixel block 300 in the second embodiment of the present technology.

The vertical scanning circuit 211 supplies the high-level post-stage reset signal rstb to the n-th row over the pulse period from timing T16 immediately after timing T15.

The vertical scanning circuit 211 supplies the high-level selection signal Φr2 to the n-th row over a period from timing T17 immediately after initialization of the post-stage node 360 to timing T18. The potential of the post-stage node 360 becomes the reset level Vrst2. This reset level is AD-converted by the ADC 261.

The vertical scanning circuit 211 supplies the high-level post-stage reset signal rstb to the n-th row over the pulse period from timing T19 immediately after timing T18.

The vertical scanning circuit 211 supplies the high-level selection signal Φs2 to the n-th row over a period from timing T20 immediately after initialization of the post-stage node 360 to timing T21. The potential of the post-stage node 360 becomes the signal level Vsig2. This signal level is AD-converted by the ADC 261.

Furthermore, at timing T21, the vertical scanning circuit 211 returns the FD reset signals rst1 and rst2 and the post-stage selection signal selb of the n-th row to the low level.

As exemplified in FIGS. 23 and 24, the high-level selection signals Φr1, Φs1, Φr2, and Φs2 are sequentially supplied. In accordance with these selection signals, the selection unit 340 sequentially connects the capacitive elements 331, 332, 336, and 337 to the post-stage node 360. Then, the reset level Vrst1 and the signal level Vsig1 of the first pixel and the reset level Vrst2 and the signal level Vsig2 of the second pixel in the pixel block 300 are read sequentially.

Figure 25:
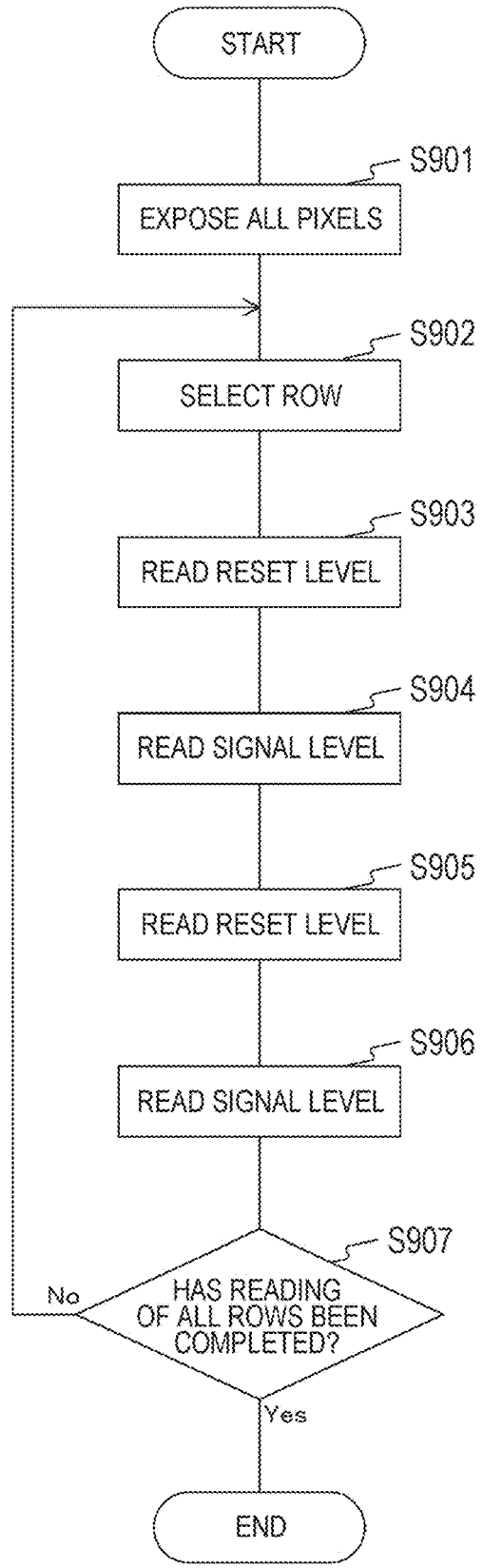
FIG. 25 is a flowchart illustrating an example of an operation of a solid-state imaging element in the second embodiment of the present technology.

FIG. 25 is a flowchart illustrating an example of the operation of the solid-state imaging element 200 in the second embodiment of the present technology. The operation is started, for example, in a case where a predetermined application for capturing image data is executed.

The vertical scanning circuit 211 exposes all the pixels (step S901). Then, the vertical scanning circuit 211 selects a row of the pixel block 300 to be read (step S902). The column signal processing circuit 260 reads the reset level of the first pixel in the pixel block 300 of the row (step S903), and then reads the signal level of the pixel (step S904). Subsequently, the column signal processing circuit 260 reads the reset level of the second pixel (step S905), and then reads the signal level of the pixel (step S906).

The solid-state imaging element 200 determines whether or not reading of all rows has been completed (step S907). In a case where the reading of all rows has not been completed (step S907: No), the solid-state imaging element 200 repeatedly executes step S902 and subsequent steps. On the other hand, in a case where the reading of all rows has been completed (step S907: Yes), the solid-state imaging element 200 executes CDS processing or the like, and ends the operation for imaging. In a case where a plurality of pieces of image data is continuously captured, steps S901 to S907 are repeatedly executed in synchronization with the vertical synchronization signal.

Note that, the first and second modification examples of the first embodiment may also be applied to the second embodiment.

As described above, according to the second embodiment of the present technology, since two pixels share the post-stage reset transistor 361 and the post-stage circuit 370, the circuit scale of the pixel array unit 220 can be reduced as compared with the case where two pixels do not share the post-stage reset transistor 361 and the post-stage circuit 370.

First Modification Example

In the second embodiment described above, the solid-state imaging element 200 sequentially reads the pixel signals of each of the two pixels in the pixel block 300, but in this configuration, the reading speed may be insufficient. The solid-state imaging element 200 of the first modification example of the second embodiment is different from that of the second embodiment in that pixel addition is performed.

Figure 26:
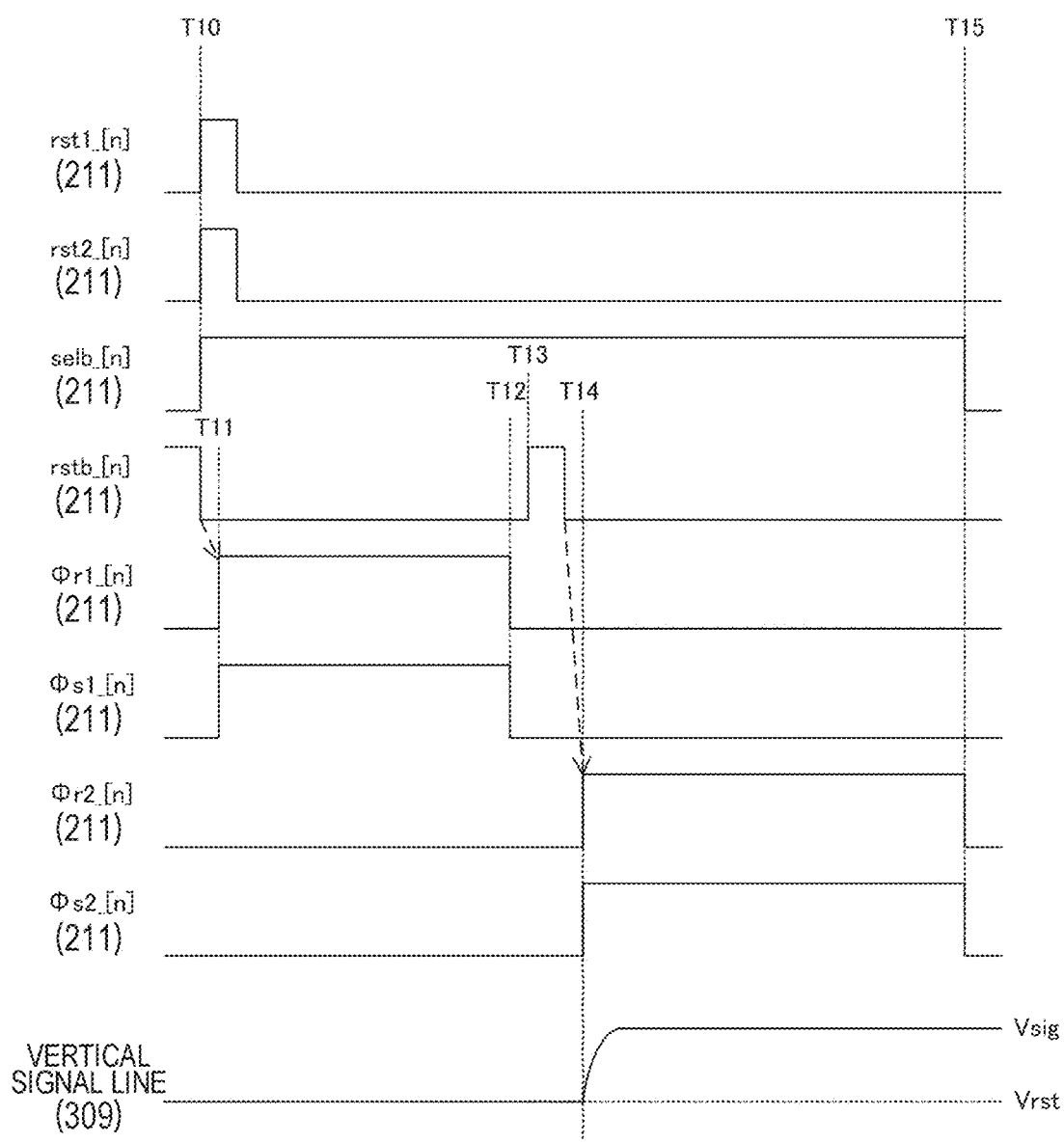
FIG. 26 is a timing chart illustrating an example of a read operation of a reset level and a signal level in a first modification example of the second embodiment of the present technology.

FIG. 26 is a timing chart illustrating an example of a read operation of the reset level and the signal level in the first modification example of the second embodiment of the present technology. Any of a plurality of modes including a non-addition mode in which pixel addition is not performed and an addition mode in which pixel addition is performed is set in the solid-state imaging element 200 in the first modification example of the second embodiment. The global shutter operation and the read operation in the non-addition mode are similar to those in the second embodiment. The global shutter operation in the addition mode is similar to that in the non-addition mode.

In a case where reading is performed in the addition mode, as exemplified in the drawing, the vertical scanning circuit 211 supplies the high-level FD reset signals rst1 and rst2 over the pulse period at timing T10 of the start of the reading of the n-th row. Furthermore, during the read period from timing T10 to timing T15, the vertical scanning circuit 211 sets the post-stage selection signal selb to the high level.

The vertical scanning circuit 211 supplies the high-level selection signals Φr1 and Φs2 to the n-th row over a period from timing T1*l* immediately after timing T10 to timing T12. Therefore, the potential of the post-stage node 360 becomes the reset level Vrst. The reset level Vrst is a value obtained by adding the reset levels of the two pixels in the pixel block 300.

The vertical scanning circuit 211 supplies the high-level post-stage reset signal rstb to the n-th row over the pulse period from timing T13 immediately after timing T12.

The vertical scanning circuit 211 supplies the high-level selection signals Φr2 and Φs2 to the n-th row over a period from timing T14 immediately after initialization of the post-stage node 360 to timing T15. Therefore, the potential of the post-stage node 360 becomes the signal level Vsig. The signal level Vsig is a value obtained by adding the signal levels of the two pixels in the pixel block 300.

As exemplified in the drawing, the high-level selection signals Φr1 and Φs1 are supplied, and the selection unit 340 connects the capacitive elements 331 and 336 to the post-stage node 360 in accordance with these selection signals. In other words, the capacitive element 331 and the capacitive element 336 are short-circuited. Therefore, the reset levels of the two pixels are added. Furthermore, the high-level selection signals Φr2 and Φs2 are supplied, and the selection unit 340 connects the capacitive elements 332 and 337 to the post-stage node 360 in accordance with these selection signals. In other words, the capacitive element 332 and the capacitive element 337 are short-circuited. Therefore, the signal levels of the two pixels are added. By the pixel addition, the sensitivity and the reading speed can be improved as compared with a case where addition is not performed. Furthermore, since the number of rows to be read by pixel addition is reduced, power consumption can be reduced.

Note that the solid-state imaging element 200 reads the signal level after the reset level, but is not limited to this order, and can read the reset level after the signal level.

Note that, the first and second modification examples of the first embodiment may also be applied to the first modification example of the second embodiment.

As described above, according to the first modification example of the second embodiment of the present technology, since the selection unit 340 connects the capacitive elements 331 and 336 to the post-stage node 360 and connects the capacitive elements 332 and 337 to the post-stage node 360, it is possible to add the respective pixel signals of the two pixels. Therefore, as compared with the case where the addition is not performed, the sensitivity and the reading speed can be improved and the power consumption can be reduced.

Second Modification Example

In the second embodiment described above, the circuit in the solid-state imaging element 200 is provided on a single semiconductor chip, but in this configuration, there is a possibility that the element does not fit in the semiconductor chip in a case where the pixel is miniaturized. The solid-state imaging element 200 of the second modification example of the second embodiment is different from the second embodiment in that circuits in the solid-state imaging element 200 are dispersedly arranged on two semiconductor chips.

Figure 27:
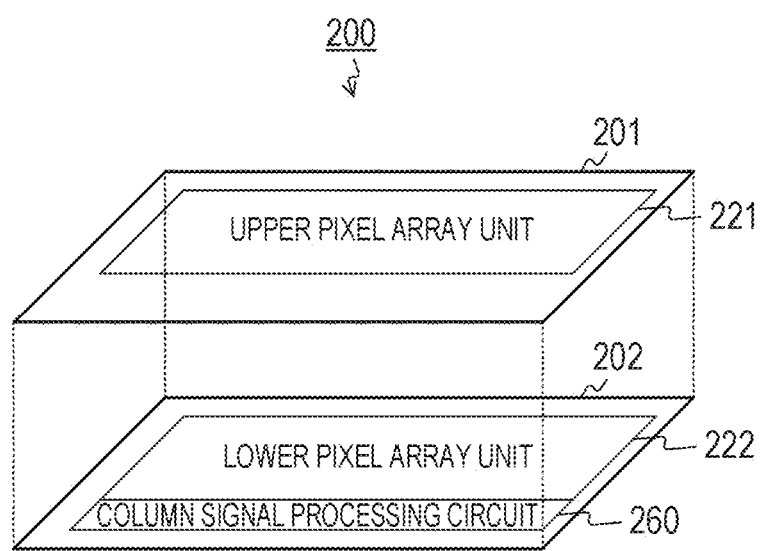
FIG. 27 is a diagram illustrating an example of a laminated structure of a solid-state imaging element in a second modification example of the second embodiment of the present technology.

FIG. 27 is a diagram illustrating an example of a laminated structure of the solid-state imaging element 200 in the second modification example of the second embodiment of the present technology. The solid-state imaging element 200 of the second modification example of the second embodiment includes a lower pixel chip 202 and an upper pixel chip 201 stacked on the lower pixel chip 202. These chips are electrically connected by, for example, Cu—Cu bonding. Note that, in addition to the Cu—Cu bonding, connection can be made by a via or a bump.

An upper pixel array unit 221 is arranged in the upper pixel chip 201. A lower pixel array unit 222 and the column signal processing circuit 260 are arranged in the lower pixel chip 202. For each pixel in the pixel array unit 220, a part thereof is arranged in the upper pixel array unit 221, and the rest is arranged in the lower pixel array unit 222.

Furthermore, in the lower pixel chip 202, the vertical scanning circuit 211, the timing control circuit 212, the DAC 213, and the load MOS circuit block 250 are also arranged. These circuits are omitted in the drawing.

Furthermore, the upper pixel chip 201 is manufactured, for example, by a pixel-dedicated process, and the lower pixel chip 202 is manufactured, for example, by a complementary MOS (CMOS) process. Note that the upper pixel chip 201 is an example of a first chip described in the claims, and the lower pixel chip 202 is an example of a second chip described in the claims.

Figure 28:
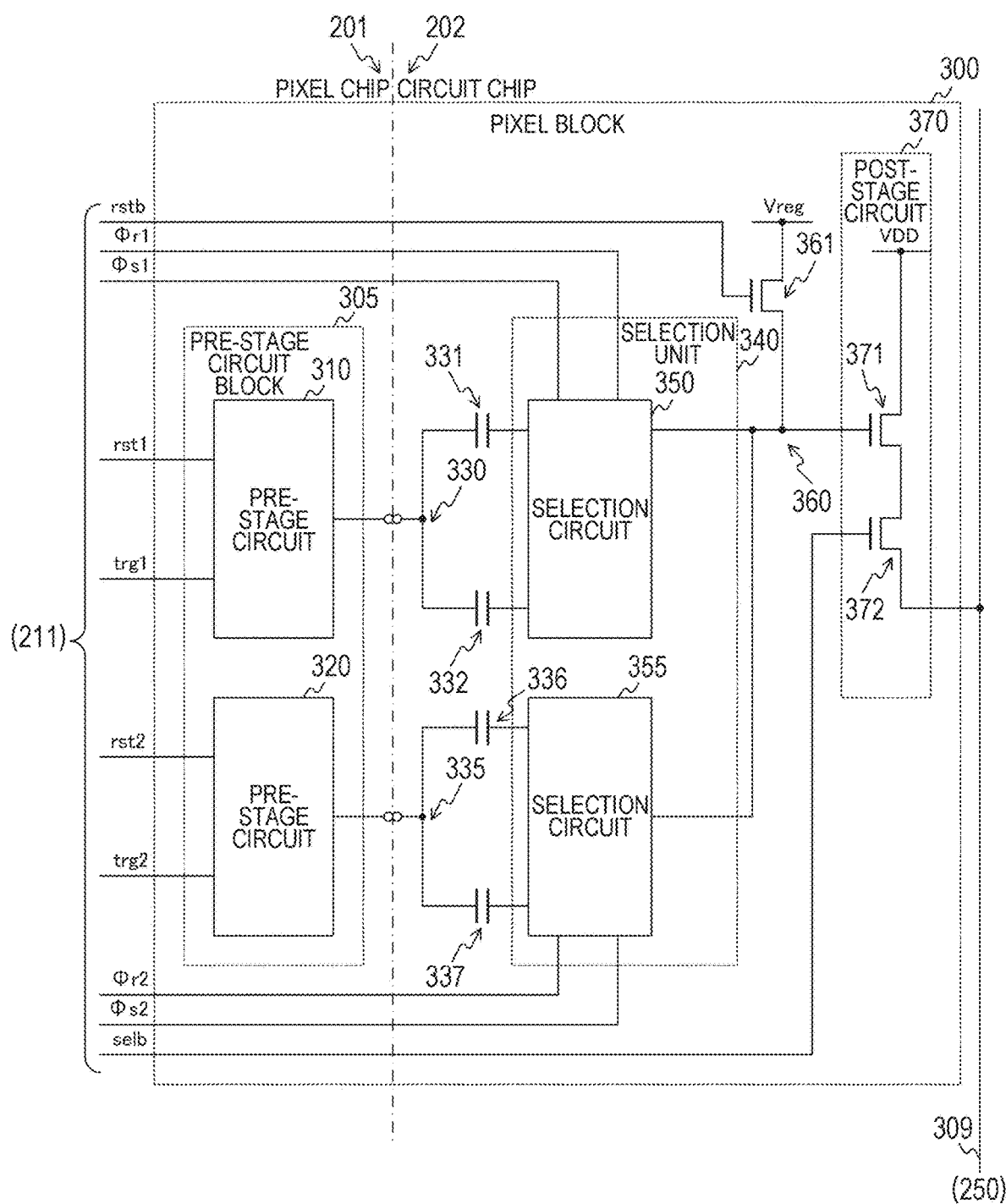
FIG. 28 is a circuit diagram illustrating a configuration example of a pixel block in the second modification example of the second embodiment of the present technology.

FIG. 28 is a circuit diagram illustrating a configuration example of the pixel block 300 in the second modification example of the second embodiment of the present technology. In the pixel block 300, the pre-stage circuit block 305 is arranged on the upper pixel chip 201, and other circuits and elements (such as the capacitive elements 331 and 332) are arranged on the lower pixel chip 202. Note that the current source transistors 316 and 326 can be further arranged in the lower pixel chip 202. As exemplified in the drawing, by dispersedly arranging the elements in the pixel block 300 on the stacked upper pixel chip 201 and lower pixel chip 202, the area of the pixel can be reduced, and miniaturization of the pixel is facilitated.

Note that, the first and second modification examples of the first embodiment may also be applied to the second modification example of the second embodiment.

As described above, according to the second modification example of the second embodiment of the present technology, since the circuits and elements in the pixel block 300 are dispersedly arranged on the two semiconductor chips, miniaturization of the pixels is facilitated.

Third Modification Example

In the second modification example of the second embodiment described above, a part of the pixel block 300 and the peripheral circuit (such as the column signal processing circuit 260) are provided in the lower pixel chip 202 on the lower side. However, in this configuration, the arrangement area of the circuits and elements on the lower pixel chip 202 side is larger than that of the upper pixel chip 201 by the peripheral circuit, and there is a possibility that an unnecessary space without circuits and elements is generated in the upper pixel chip 201. The solid-state imaging element 200 of the third modification example of the second embodiment is different from the second modification example of the second embodiment in that circuits in the solid-state imaging element 200 are dispersedly arranged on three semiconductor chips.

Figure 29:
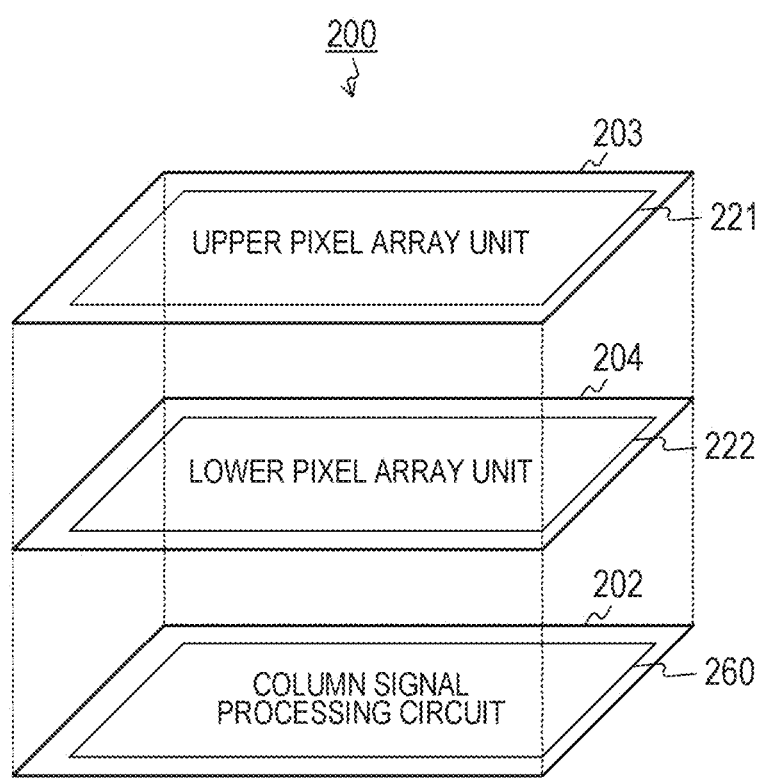
FIG. 29 is a diagram illustrating an example of a laminated structure of solid-state imaging elements in a third modification example of the second embodiment of the present technology.

FIG. 29 is a diagram illustrating an example of a laminated structure of the solid-state imaging element 200 in the third modification example of the second embodiment of the present technology. The solid-state imaging element 200 of the third modification example of the second embodiment includes the upper pixel chip 201, the lower pixel chip 202, and a circuit chip 203. These chips are stacked, and are electrically connected by, for example, Cu—Cu bonding. Note that, in addition to the Cu—Cu bonding, connection can be made by a via or a bump.

The upper pixel array unit 221 is arranged in the upper pixel chip 201. The lower pixel array unit 222 is arranged in the lower pixel chip 202. For each pixel in the pixel array unit 220, a part thereof is arranged in the upper pixel array unit 221, and the rest is arranged in the lower pixel array unit 222.

Furthermore, in the circuit chip 203, the column signal processing circuit 260, the vertical scanning circuit 211, the timing control circuit 212, the DAC 213, and the load MOS circuit block 250 are arranged. Circuits other than the column signal processing circuit 260 are omitted in the drawing.

Note that the upper pixel chip 201 is an example of a first chip described in the claims, and the lower pixel chip 202 is an example of a second chip described in the claims. The circuit chip 202 is an example of a third chip described in the claims.

By adopting the three-layer configuration as exemplified in the drawing, it is possible to reduce unnecessary space and further miniaturize the pixel as compared with the two-layer configuration. Furthermore, a second-layer lower pixel chip 204 can be manufactured by a dedicated process for the capacitor and switch.

Note that, the first and second modification examples of the first embodiment may also be applied to the third modification example of the second embodiment.

As described above, in the third modification example of the second embodiment of the present technology, since the circuits in the solid-state imaging element 200 are dispersedly arranged on the three semiconductor chips, the pixels can be further miniaturized as compared with a case where the circuits are dispersedly arranged on the two semiconductor chips.

3. Third Embodiment

In the second embodiment described above, the solid-state imaging element 200 sequentially reads the pixel signals of each of the two pixels in the pixel block 300, but in this configuration, the reading speed may be insufficient. The solid-state imaging element 200 of the third embodiment is different from that of the second embodiment in that pixel addition is performed.

Figure 30:
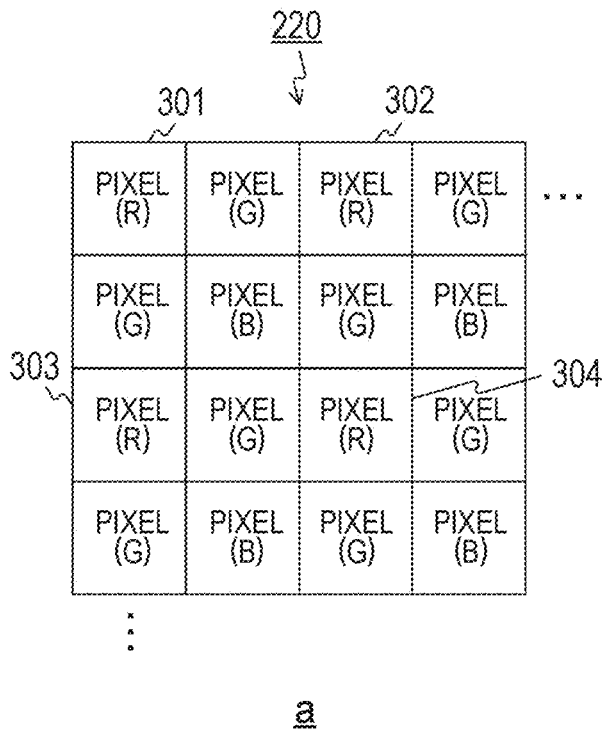
FIG. 30 is a plan view illustrating a configuration example of a pixel array unit in a third embodiment of the present technology.
Figure 30:
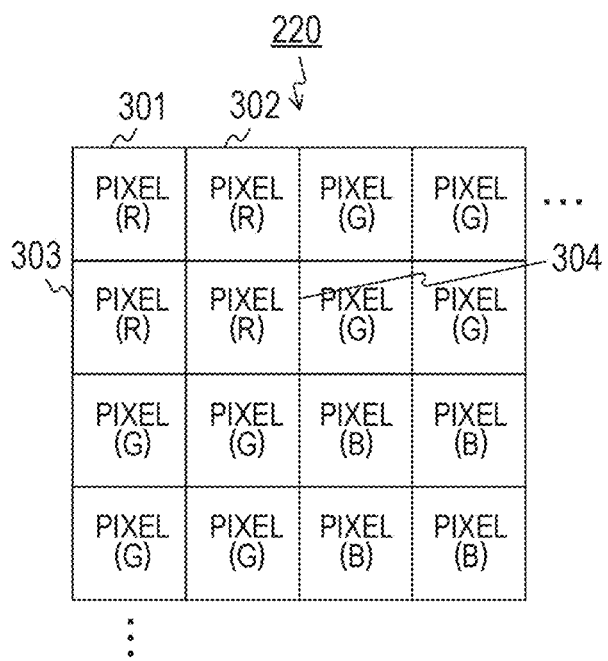

FIG. 30 is a plan view illustrating a configuration example of the pixel array unit 220 in the third embodiment of the present technology. In the drawing, a is a plan view illustrating an example of the pixel array unit 220 in the Bayer array. In the drawing, b is a plan view illustrating an example of the pixel array unit 220 in the Quad Bayer array. In the pixel array unit 220 in the drawing, for example, the layouts of the first and second modification examples of the first embodiment are applied.

As exemplified in a of the drawing, in the pixel array unit 220 of the second embodiment, red (R), green (G), and blue (B) pixels are arranged in the Bayer array. Among these pixels, the solid-state imaging element 200 can add the respective pixel signals of the R pixel 301 and the R pixels 302 to 304 in the vicinity thereof. Similarly, for the G pixel and the B pixel, the solid-state imaging element 200 can add the pixel signals of the four neighboring pixels.

Note that, instead of the Bayer array, pixels can be arranged in the Quad Bayer array as exemplified in b of the drawing. In the Quad Bayer array, four pixels of the same color are arranged adjacent to each other in 2 rows×2 columns. Then, focusing on the four R pixels, the four B pixels are arranged at the lower right of the four R pixels, and the four G pixels are arranged at the right side and at the lower side. Among these pixels, the solid-state imaging element 200 can add the pixel signals of adjacent four pixels (pixels 301 to 304 and the like) of the same color.

Note that the arrangement of the pixels is not limited to the Bayer array or the Quad Bayer array. For example, R, G, B, and W (white) pixels can be arranged.

Figure 31:
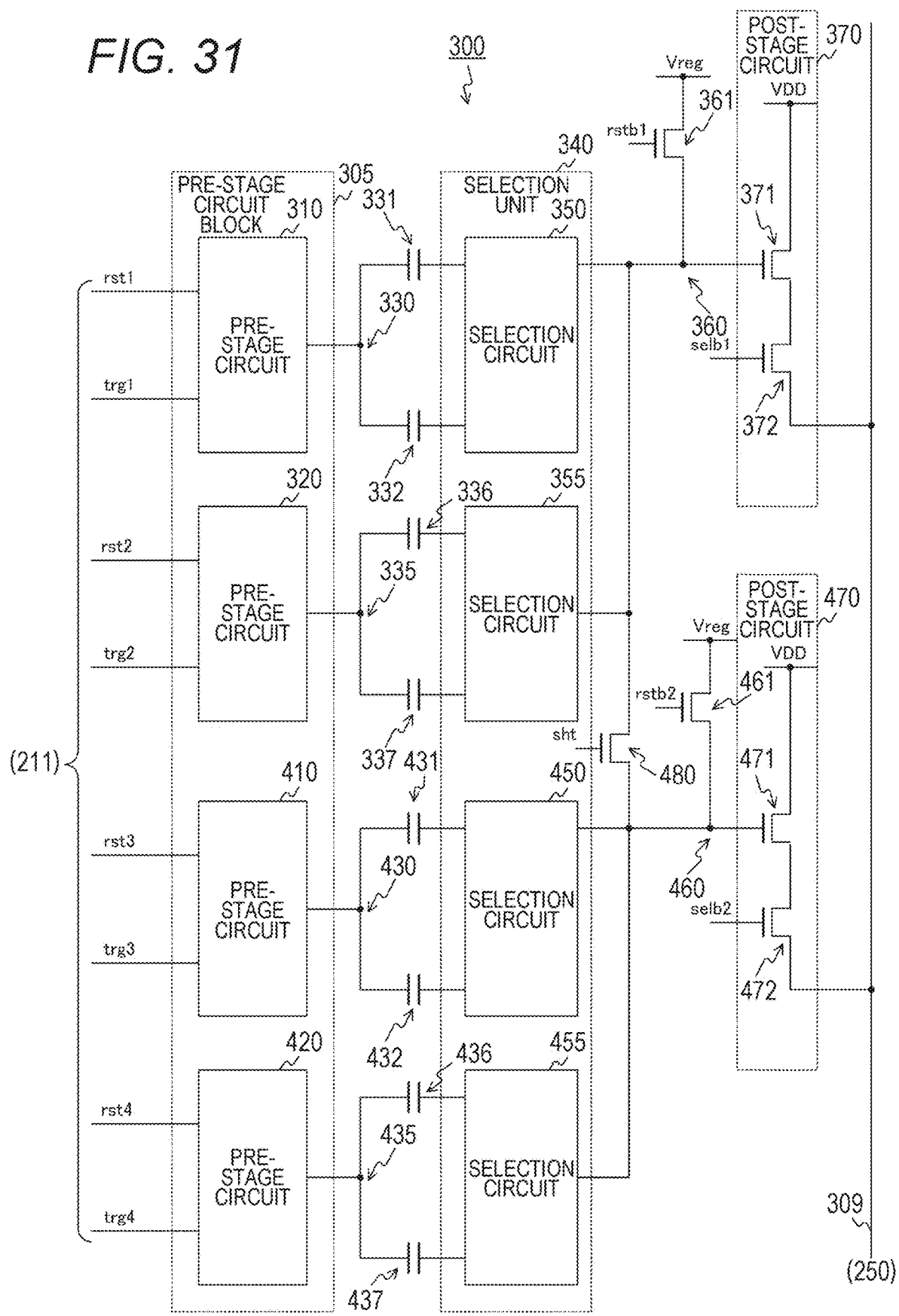
FIG. 31 is a circuit diagram illustrating a configuration example of a pixel block in the third embodiment of the present technology.

FIG. 31 is a circuit diagram illustrating a configuration example of the pixel block 300 in the third embodiment of the present technology. In the pixel block 300 of the third embodiment, four pixels to be added in a case where addition is performed are arranged. For example, the pixels 301 to 304 in FIG. 30 are arranged in the pixel block 300.

The pixel block 300 of the third embodiment is further provided with capacitive elements 431, 432, 436, and 437, a short-circuit transistor 480, a post-stage reset transistor 461, and a post-stage circuit 470. Furthermore, in the third embodiment, pre-stage circuits 410 and 420 are further arranged in the pre-stage circuit block 305, and selection circuits 450 and 455 are further arranged in the selection unit 340. The vertical scanning circuit 211 supplies a post-stage reset signal rstb1 to the post-stage reset transistor 361, and supplies a post-stage reset signal rstb2 to the post-stage reset transistor 461.

A post-stage amplification transistor 471 and a post-stage selection transistor 472 are arranged in the post-stage circuit 470. As these transistors, for example, nMOS transistors are used. Furthermore, the circuit configurations of the post-stage reset transistor 461 and the post-stage circuit 470 are similar to those of the post-stage reset transistor 361 and the post-stage circuit 370. The post-stage circuits 370 and 470 are connected to the same vertical signal line 309. The vertical scanning circuit 211 supplies a post-stage selection signal selb1 to the post-stage selection transistor 372, and supplies a post-stage selection signal selb2 to the post-stage selection transistor 472.

The pre-stage circuit 410 sequentially generates a reset level and a signal level, and causes the capacitive elements 431 and 432 to hold the reset level and the signal level. The pre-stage circuit 420 sequentially generates a reset level and a signal level, and causes the capacitive elements 436 and 437 to hold the reset level and the signal level. Note that the capacitive elements 431 and 432 are examples of fifth and sixth capacitive elements described in the claims, and the capacitive elements 436 and 437 are examples of seventh and eighth capacitive elements described in the claims.

Furthermore, the selection circuit 450 connects one of the capacitive elements 431 and 432 to a post-stage node 460, and the selection circuit 455 connects one of the capacitive elements 436 and 437 to the post-stage node 460. Note that the selection circuit 450 is an example of a third selection circuit described in the claims, and the selection circuit 455 is an example of a fourth selection circuit described in the claims. Furthermore, the post-stage node 360 is an example of a first post-stage node described in the claims, and the post-stage node 460 is an example of a second post-stage node described in the claims.

The short-circuit transistor 480 opens and closes a path between the post-stage node 360 and the post-stage node 460 in accordance with a short-circuit signal sht from the vertical scanning circuit 211. As the short-circuit transistor 480, for example, an nMOS transistors is used.

Figure 32:
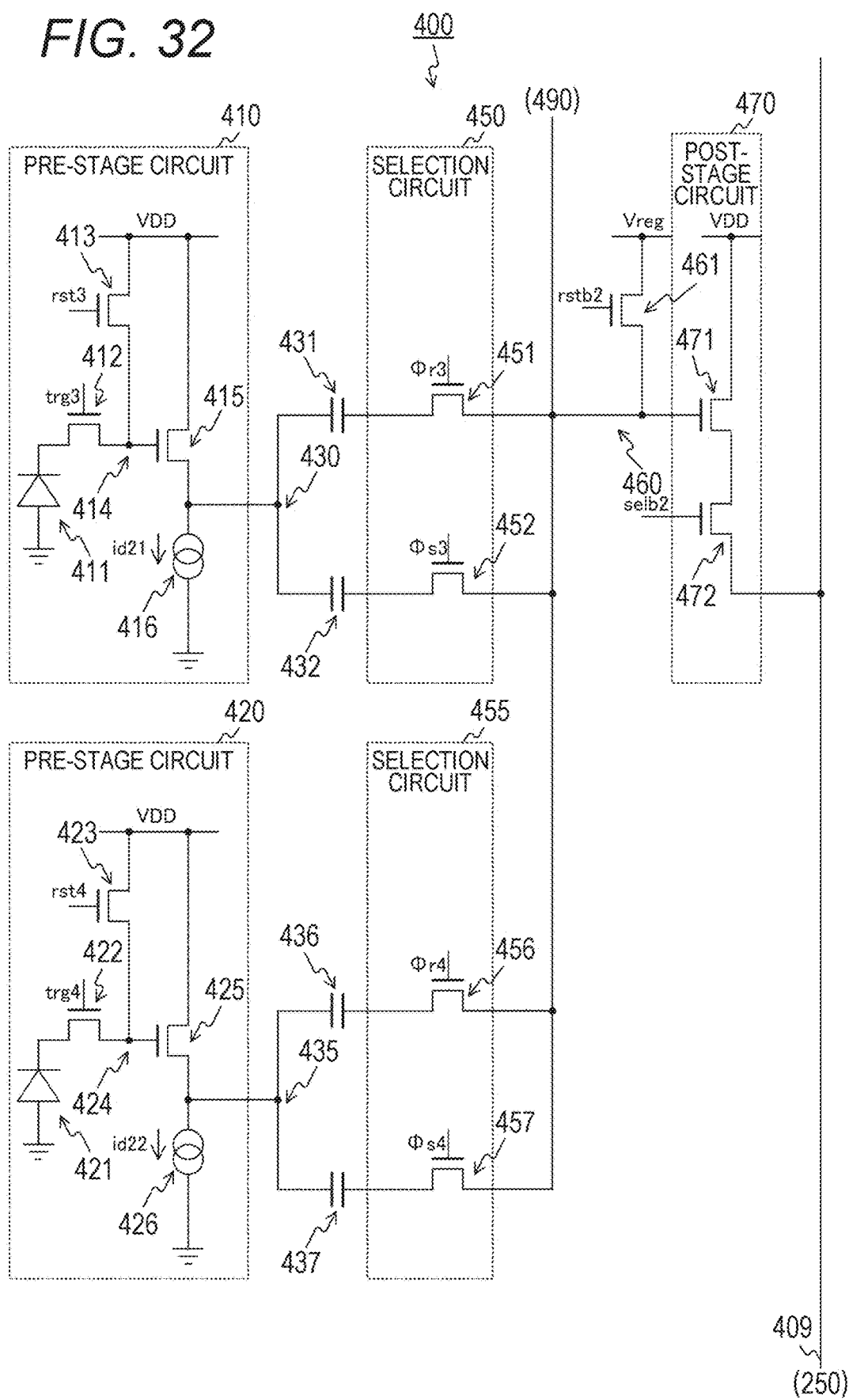
FIG. 32 is a circuit diagram illustrating a configuration example of a pre-stage circuit and a selection circuit in the third embodiment of the present technology.

FIG. 32 is a circuit diagram illustrating a configuration example of the pre-stage circuits 410 and 420 and the selection circuits 450 and 455 in the third embodiment of the present technology.

The pre-stage circuit 410 includes a photoelectric conversion element 411, a transfer transistor 412, an FD reset transistor 413, an FD 414, a pre-stage amplification transistor 415, and a current source transistor 416. The vertical scanning circuit 211 supplies a transfer signal trg3 and an FD reset signal rst3 to the transfer transistor 412 and the FD reset transistor 413.

Furthermore, the pre-stage circuit 420 includes a photoelectric conversion element 421, a transfer transistor 422, an FD reset transistor 423, an FD 424, a pre-stage amplification transistor 425, and a current source transistor 426. The vertical scanning circuit 211 supplies a transfer signal trg4 and an FD reset signal rst4 to the transfer transistor 422 and the FD reset transistor 423.

The selection circuit 450 includes selection transistors 451 and 452, and the selection circuit 455 includes selection transistors 456 and 457. The vertical scanning circuit 211 supplies selection signals Φr3 and Φs3 to the selection transistors 451 and 452, and supplies selection signals Φr4 and Φs4 to the selection transistors 456 and 457.

The circuit configurations of the pre-stage circuits 410 and 420 are similar to those of the pre-stage circuits 310 and 320. Furthermore, the circuit configurations of the selection circuits 450 and 455 are similar to those of the selection circuits 350 and 355.

Figure 33:
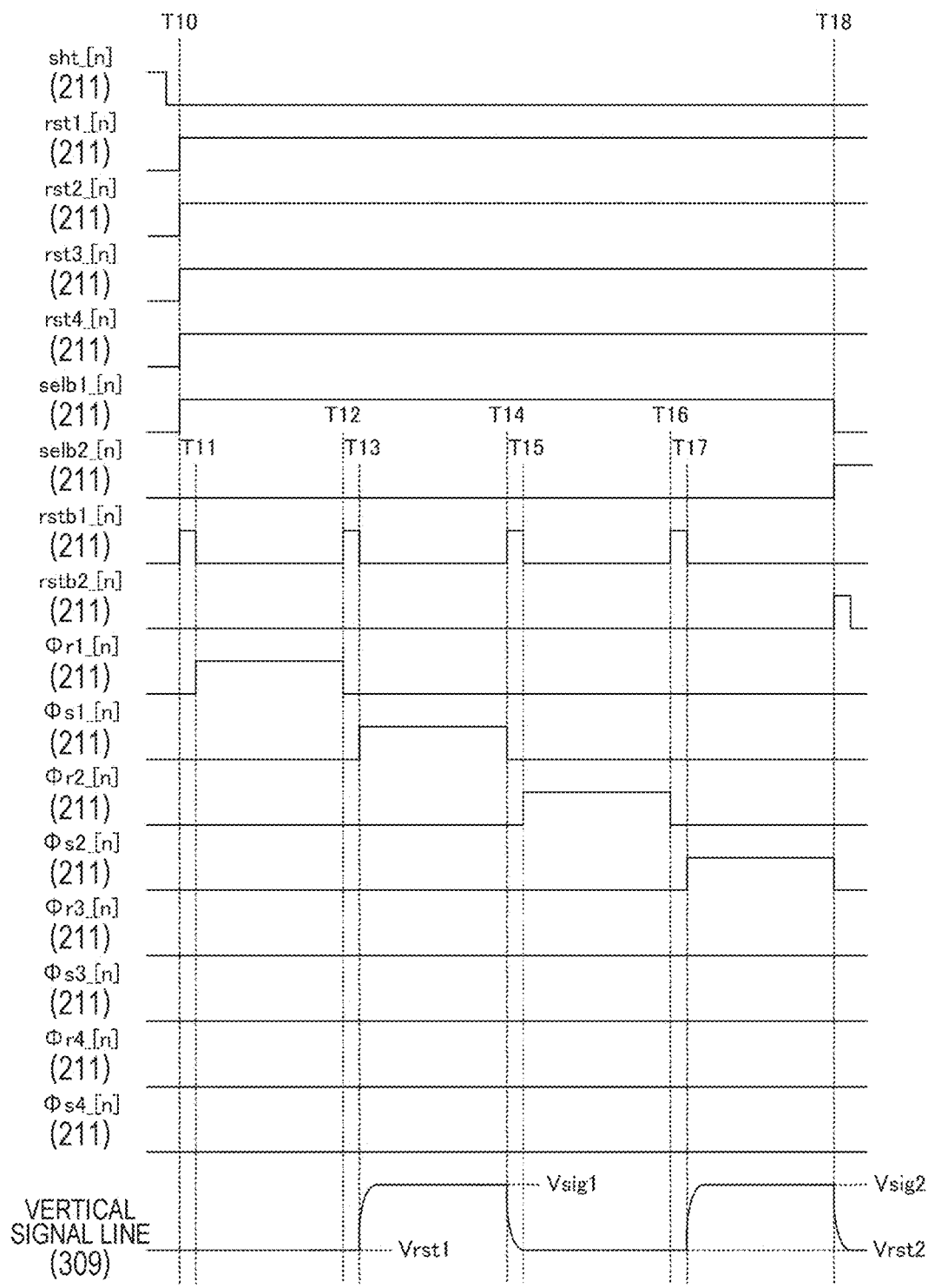
FIG. 33 is a timing chart illustrating an example of a read operation of first and second pixels in the pixel block in the third embodiment of the present technology.

FIG. 33 is a timing chart illustrating an example of a read operation of first and second pixels in the pixel block 300 in the third embodiment of the present technology. Any of a plurality of modes including a non-addition mode in which pixel addition is not performed and an addition mode in which pixel addition is performed is set in the solid-state imaging element 200 in the third embodiment. The global shutter operation and the read operation in the non-addition mode are similar to those in the second embodiment. The global shutter operation in the addition mode is similar to that in the non-addition mode.

In the non-addition mode, the vertical scanning circuit 211 sets the short-circuit signal sht to the low level. Furthermore, at timing T10 of the start of the reading of the n-th row of the pixel block 300, the vertical scanning circuit 211 sets the FD reset signals rst1 to rst4 to the high level. Furthermore, during the period from timing T10 to timing T18, the vertical scanning circuit 211 sets the post-stage selection signal selb1 to the high level, and sets the post-stage selection signal selb2 to the low level.

Furthermore, the vertical scanning circuit 211 supplies the high-level post-stage reset signal rstb1 in the pulse period from timing T10 to timing T11, and supplies the high-level selection signal Φr1 in the period from timing T11 to timing T12. During this period, the reset level Vrst1 of the first pixel is read out through the vertical signal line 309.

The vertical scanning circuit 211 supplies the high-level post-stage reset signal rstb1 in the pulse period from timing T12 to timing T13, and supplies the high-level selection signal Φs1 in the period from timing T13 to timing T14. During this period, the signal level Vsig1 of the first pixel is read out through the vertical signal line 309.

Subsequently, the vertical scanning circuit 211 supplies the high-level post-stage reset signal rstb1 in the pulse period from timing T14 to timing T15, and supplies the high-level selection signal Φr2 in the period from timing T15 to timing T16. During this period, the reset level Vrst2 of the second pixel is read out through the vertical signal line 309.

The vertical scanning circuit 211 supplies the high-level post-stage reset signal rstb1 in the pulse period from timing T16 to timing T17, and supplies the high-level selection signal Φs2 in the period from timing T17 to timing T18. During this period, the signal level Vsig2 of the second pixel is read out through the vertical signal line 309.

Figure 34:
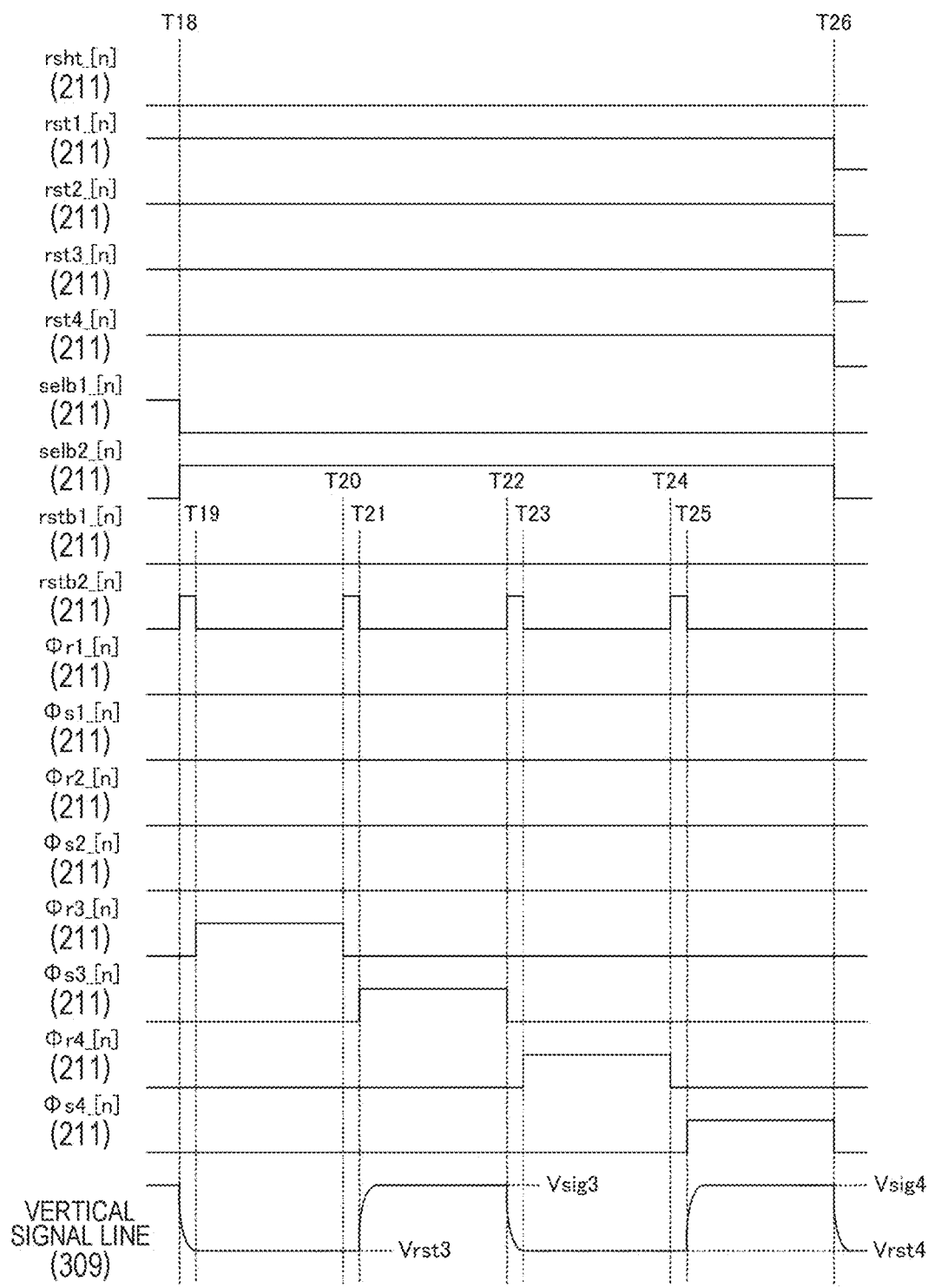
FIG. 34 is a timing chart illustrating an example of a read operation of third and fourth pixels in the pixel block in the third embodiment of the present technology.

FIG. 34 is a timing chart illustrating an example of a read operation of third and fourth pixels in the pixel block 300 in the third embodiment of the present technology.

During the period from timing T18 to timing T26, the vertical scanning circuit 211 sets the post-stage selection signal selb1 to the low level, and sets the post-stage selection signal selb2 to the high level.

Furthermore, the vertical scanning circuit 211 supplies the high-level post-stage reset signal rstb2 in the pulse period from timing T18 to timing T19, and supplies the high-level selection signal Φr3 in the period from timing T19 to timing T20. During this period, the reset level Vrst3 of the third pixel is read out through the vertical signal line 309.

The vertical scanning circuit 211 supplies the high-level post-stage reset signal rstb2 in the pulse period from timing T20 to timing T21, and supplies the high-level selection signal Φs3 in the period from timing T21 to timing T22. During this period, the signal level Vsig3 of the third pixel is read out through the vertical signal line 309.

Subsequently, the vertical scanning circuit 211 supplies the high-level post-stage reset signal rstb2 in the pulse period from timing T22 to timing T23, and supplies the high-level selection signal Φr4 in the period from timing T23 to timing T24. During this period, the reset level Vrst4 of the fourth pixel is read out through the vertical signal line 309.

The vertical scanning circuit 211 supplies the high-level post-stage reset signal rstb2 in the pulse period from timing T24 to timing T25, and supplies the high-level selection signal 45s4 in the period from timing T25 to timing T26. During this period, the signal level Vsig4 of the fourth pixel is read out through the vertical signal line 309.

Furthermore, at timing T26 of the end of the reading of the n-th row, the vertical scanning circuit 211 sets the FD reset signals rst1 to rst4 to the low level.

As exemplified in FIGS. 33 and 34, in the non-addition mode, the short-circuit transistor 480 is controlled to the open state. Furthermore, the capacitive elements 331 and 332 are sequentially connected to the post-stage node 360, and the reset level and the signal level of the first pixel are sequentially read. The capacitive elements 336 and 337 are sequentially connected to the post-stage node 360, and the reset level and the signal level of the second pixel are sequentially read. Subsequently, the capacitive elements 431 and 432 are sequentially connected to the post-stage node 460, and the reset level and the signal level of the third pixel are sequentially read. The capacitive elements 436 and 437 are sequentially connected to the post-stage node 460, and the reset level and the signal level of the fourth pixel are sequentially read. In this manner, the reset level and the signal level of each of the four pixels in the pixel block 300 are sequentially read.

Figure 35:
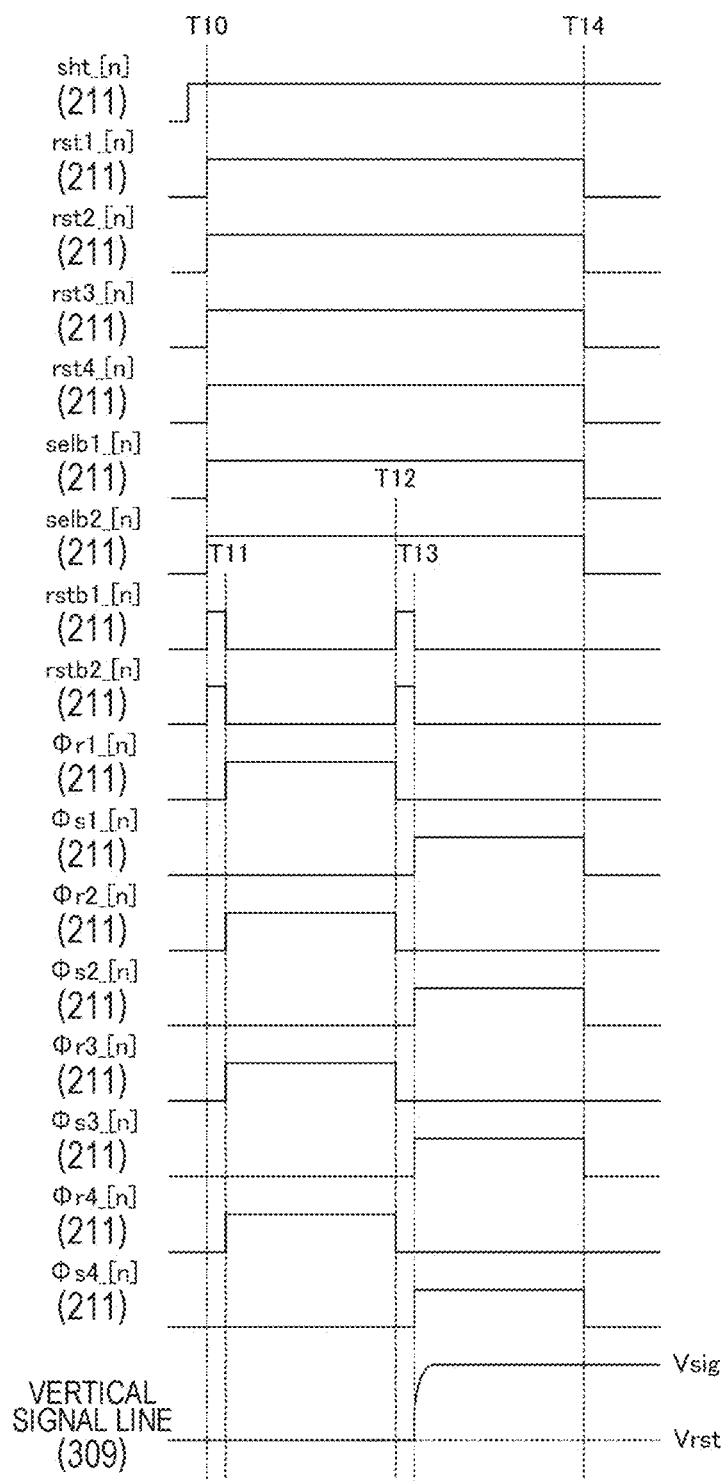
FIG. 35 is a timing chart illustrating an example of a read operation in an addition mode in the third embodiment of the present technology.

FIG. 35 is a timing chart illustrating an example of a read operation in the addition mode in the third embodiment of the present technology. In the addition mode, the vertical scanning circuit 211 sets the short-circuit signal sht to the high level. From timing T10 to timing T14 as the read period of the n-th row of the pixel block 300, the vertical scanning circuit 211 sets the FD reset signals rst1 to rst4 and the post-stage selection signals selb1 and selb2 to the high level.

Furthermore, the vertical scanning circuit 211 supplies the high-level post-stage reset signals rstb1 and rstb2 in the pulse period from timing T10 to timing T11, and supplies the high-level selection signals Φr1 to ψr4 in the period from timing T11 to timing T12. During this period, the reset level Vrst is read out through the vertical signal line 309. The reset level Vrst is a value obtained by adding the reset levels of the four pixels in the pixel block 300.

Furthermore, the vertical scanning circuit 211 supplies the high-level post-stage reset signals rstb1 and rstb2 in the pulse period from timing T12 to timing T13, and supplies the high-level selection signals Φs1 to Φs4 in the period from timing T13 to timing T14. During this period, the signal level Vsig is read out through the vertical signal line 309. The signal level Vsig is a value obtained by adding the signal levels of the four pixels in the pixel block 300.

Here, in the pixel block 300 of the second embodiment, four pixels can be added by increasing the number of pixels sharing the post-stage circuit 370 to four. However, an increase in the number of pixels sharing the post-stage circuit 370 causes adverse effects. In a case where the number of pixels sharing the post-stage circuit 370 is four, the wiring of the post-stage node 360 extends over four pixels, and the parasitic capacitance of the post-stage node 360 is increased. Due to the increase in the parasitic capacitance, the gain of the signal in a case where pixel addition is not performed is decreased. This is because the voltage held in the capacitive element 331 or 332 is reduced by the parasitic capacitance in a case where the capacitive element 331 or 332 is connected to the post-stage node 360. This decrease in gain causes a decrease in signal-noise (SN) ratio.

On the other hand, in the third embodiment in which the short-circuit transistor 480 is provided, by setting the short-circuit transistor 480 in the open state in the non-addition mode, the number of pixels sharing each of the post-stage circuits 370 and 470 can be two. Therefore, it is possible to suppress an increase in the parasitic capacitance of the post-stage node as compared with a case where four pixels share the post-stage circuit 370. With such a configuration, it is possible to suppress a decrease in the SN ratio in the non-addition mode while realizing addition of more than two pixels.

Note that, in the pixel block 300 exemplified in FIG. 31, one vertical signal line 309 is shared by the post-stage circuits 370 and 470, but the present technology is not limited to this configuration. Vertical signal lines 309-1 and 309-2 can be wired, the post-stage circuit 370 can be connected to the vertical signal line 309-1, and the post-stage circuit 470 can be connected to the vertical signal line 309-2. In this case, it is necessary to double the number of load MOS transistors 251 and the number of ADCs 261 in the post stage together with the number of wirings of the vertical signal lines. Instead, in the non-addition mode, one of two pixels sharing the post-stage circuit 370 and one of two pixels sharing the post-stage circuit 470 can be simultaneously read, and therefore, the reading speed can be improved. Furthermore, in the addition mode, only one of the vertical signal lines 309-1 and 309-2 is used, and the load MOS transistor 251 corresponding to the other of the vertical signal lines 309-1 and 309-2 is controlled to the off state.

Note that, the first to third modification examples of the second embodiment may also be applied to the third embodiment.

As described above, according to the third embodiment of the present technology, since the short-circuit transistor 480 short-circuits the post-stage node 360 and the post-stage node 460, the pixel block 300 can add the respective pixel signals of the four pixels. Therefore, as compared with the case where the addition is not performed, the sensitivity and the reading speed can be improved and the power consumption can be reduced.

4. Fourth Embodiment

In the first embodiment described above, the current source transistor (316 or 326) is arranged for each pixel, but with this configuration, there is a possibility that miniaturization of the pixel becomes difficult. The solid-state imaging element 200 of the fourth embodiment is different from that of the first embodiment in that the current source transistor is shared by a plurality of pixels.

Figure 36:
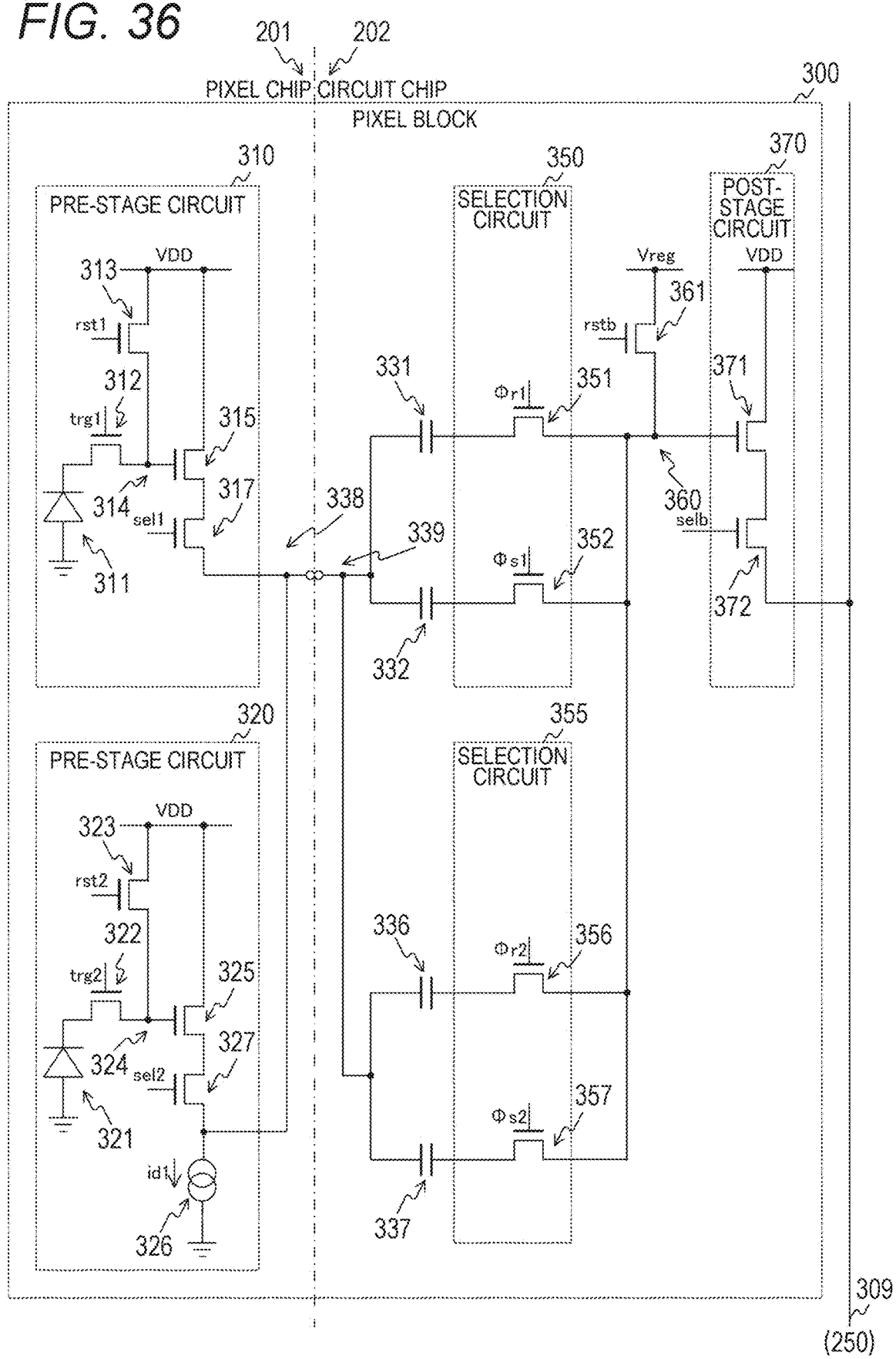
FIG. 36 is a circuit diagram illustrating a configuration example of a pixel block in a fourth embodiment of the present technology.

FIG. 36 is a circuit diagram illustrating a configuration example of the pixel block 300 in the fourth embodiment of the present technology. The pixel block 300 of the fourth embodiment is different from that of the second embodiment in that pre-stage selection transistors 317 and 327 are further included, and the current source transistor 316 is not provided.

The pre-stage selection transistor 317 outputs a voltage amplified by the pre-stage amplification transistor 315 to a pre-stage node 338 in accordance with a pre-stage selection signal sel1 from the vertical scanning circuit 211. The pre-stage selection transistor 327 outputs a voltage amplified by the pre-stage amplification transistor 325 to the pre-stage node 338 in accordance with a pre-stage selection signal sel2 from the vertical scanning circuit 211. Furthermore, the current source transistor 326 is connected to the pre-stage node 338.

Furthermore, one end of each of the capacitive elements 331, 332, 336, and 337 is commonly connected to a pre-stage node 339, and the other end of each of the capacitive elements 331, 332, 336, and 337 is connected to the selection circuits 350 and 355. The pre-stage node 339 is connected to the pre-stage node 338.

Furthermore, circuits and elements in the solid-state imaging element 200 are dispersedly arranged on the upper pixel chip 201 and the lower pixel chip 202. For example, the pre-stage circuits 310 and 320 are arranged on the upper pixel chip 201, and circuits in the post stages thereof are arranged on the circuit chip 202. Then, the pre-stage node 338 and the pre-stage node 339 are connected by Cu—Cu connection or the like.

In the second embodiment in which the current source transistor is arranged for each pixel, it is necessary to perform Cu—Cu connection for each pixel as exemplified in FIG. 28 in the case of using a laminated structure. In particular, in a case where the capacitive element 331 having the MIM structure or the like is disposed on the circuit chip 202, the thickness of the chip is increased, it becomes difficult to flatten the surfaces connecting the upper and lower chips, and the pitch of the Cu—Cu connection is restricted. For example, while the size of the fine pixel of the image sensor for mobile use is micrometers (μm) or less, the pitch of the Cu—Cu connection is several micrometers (μm). Therefore, in the configuration in which the current source transistor is arranged for each pixel, miniaturization is difficult.

On the other hand, in the configuration of FIG. 36 in which the current source transistor 326 is shared by two pixels, the number of Cu—Cu connections can be reduced. Therefore, miniaturization of the pixel is facilitated. Furthermore, the current at the time of the global shutter operation can be reduced. Furthermore, the current source transistor 326 generally has a cascade configuration in order to suppress current fluctuation due to a channel length modulation effect of the transistor. By sharing the current source transistor 326 having a relatively large size, the area of the transistor can be reduced.

Note that, although the current source transistor 326 is shared by two pixels, the number of pixels sharing the current source transistor is not limited to two, and may be three or more.

Figure 37:
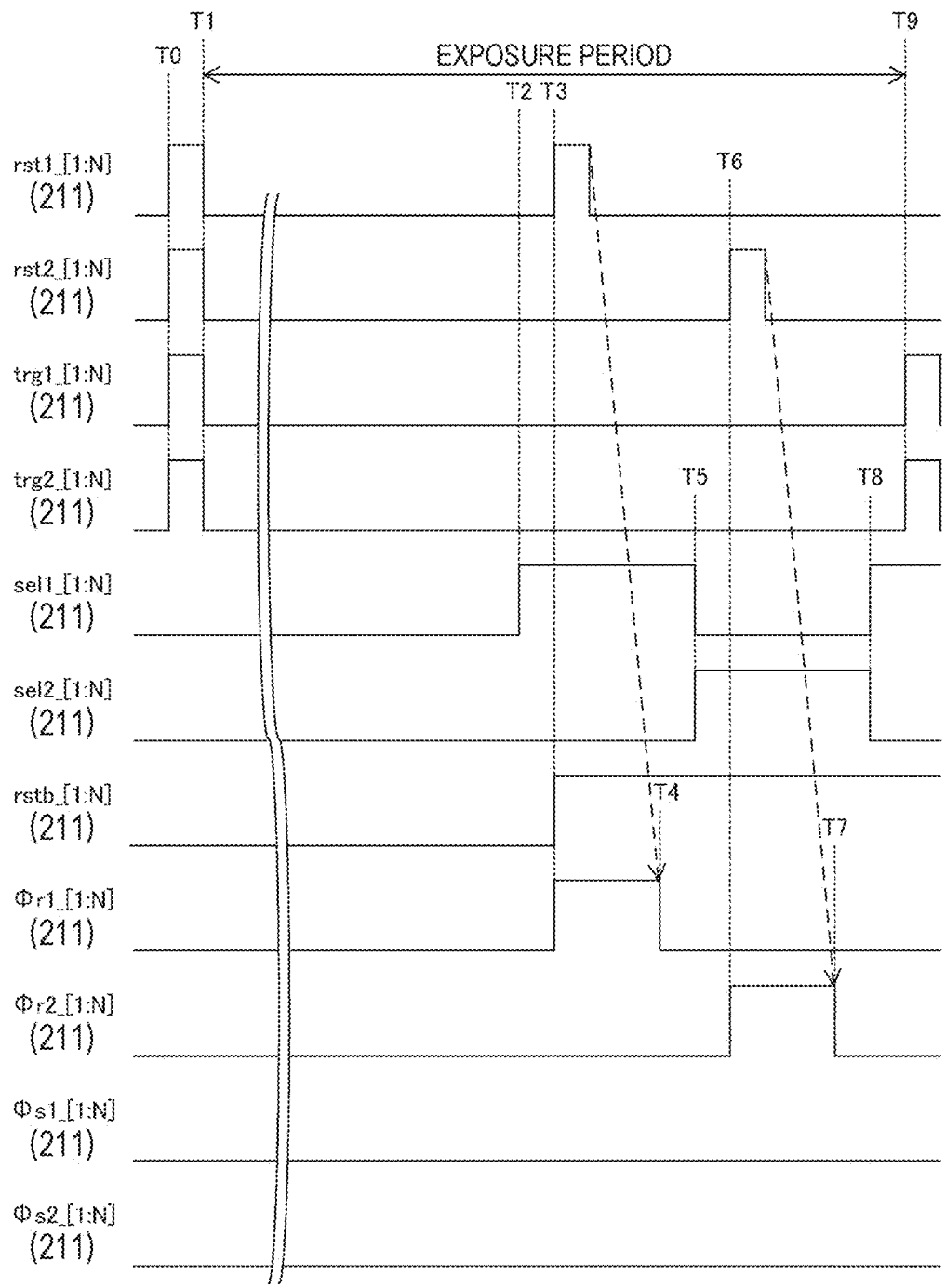
FIG. 37 is a timing chart illustrating an example of a global shutter operation in the fourth embodiment of the present technology.

FIG. 37 is a timing chart illustrating an example of the global shutter operation in the fourth embodiment of the present technology. The vertical scanning circuit 211 supplies the high-level FD reset signals rst1 and rst2 and the high-level transfer signals trg1 and trg2 to all the rows from timing T0 immediately before the start of the exposure to timing T1 after the pulse period elapses. Therefore, all the pixels are PD reset, and the exposure is simultaneously started in all the rows.

During the period from timing T2 immediately after the end of the exposure to timing T5, the vertical scanning circuit 211 sets the pre-stage selection signal sel1 of all the rows to the high level. At timing T3 in the period, the vertical scanning circuit 211 supplies the high-level FD reset signal rst1 over the pulse period while setting the post-stage reset signal rstb and the selection signal Φr1 of all the rows to the high level. Therefore, the first pixel in the pixel block 300 is FD reset, and the reset level is sampled and held.

At timing T4, the vertical scanning circuit 211 returns the selection signal Φr1 to the low level. Furthermore, during the period from timing T5 to timing T8, the vertical scanning circuit 211 sets the pre-stage selection signal sel1 of all the rows to the low level, and sets the pre-stage selection signal sel2 to the high level. At timing T6 in the period, the vertical scanning circuit 211 supplies the high-level FD reset signal rst2 over the pulse period while setting the post-stage reset signal rstb and the selection signal Φr2 of all the rows to the high level. Therefore, the second pixel in the pixel block 300 is FD reset, and the reset level is sampled and held.

Then, the vertical scanning circuit 211 returns the selection signal Φr2 of all the rows to the low level at timing T7, and sets the pre-stage selection signal sel2 to the low level and sets the pre-stage selection signal sel1 to the high level at timing T8.

Here, sel1_[n] and sel2_[n] in the drawing indicates signals to pixels in the n-th row.

As exemplified in the drawing, the vertical scanning circuit 211 sequentially closes the pre-stage selection transistors 317 and 327 immediately before the end of the exposure. Then, in a case where the pre-stage selection transistor 317 is in the closed state, the FD reset transistor 313 performs the FD reset, and in a case where the pre-stage selection transistor 327 is in the closed state, the FD reset transistor 323 performs the FD reset.

Figure 38:
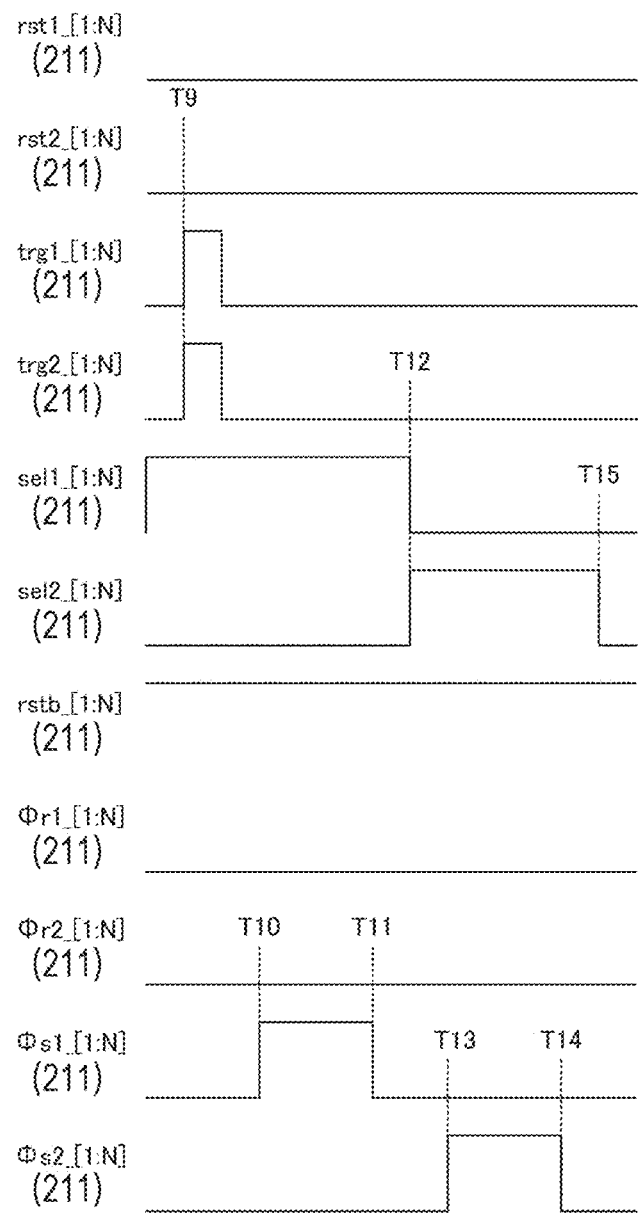
FIG. 38 is a timing chart illustrating an example of control immediately after the end of exposure in the fourth embodiment of the present technology.

FIG. 38 is a timing chart illustrating an example of control immediately after the end of the exposure in the fourth embodiment of the present technology. At timing T9 of the end of the exposure, the vertical scanning circuit 211 supplies the high-level transfer signals trg1 and trg2 over the pulse period for all the rows.

Then, the vertical scanning circuit 211 sets the selection signal Φs1 to the high level in all the rows during the period from timing T10 to timing T11. Therefore, the signal level of the first pixel in the pixel block 300 is sampled and held.

At timing T12, the vertical scanning circuit 211 sets the pre-stage selection signal sel1 of all the rows to the low level, and sets the pre-stage selection signal sel2 to the high level.

Then, the vertical scanning circuit 211 sets the selection signal Φs2 to the high level in all the rows during the period from timing T13 to timing T14. Therefore, the signal level of the second pixel in the pixel block 300 is sampled and held.

The vertical scanning circuit 211 returns the pre-stage selection signal sel2 of all the rows to the low level at timing T15.

As exemplified in the drawing, the vertical scanning circuit 211 sequentially closes the pre-stage selection transistors 317 and 327 at the end of the exposure. Then, the vertical scanning circuit 211 causes the transfer transistors 312 and 322 to transfer charges at the end of the exposure, and then sequentially closes the pre-stage selection transistors 317 and 327.

Note that the first and second modification examples of the first embodiment, the first and third modification examples of the second embodiment, and the third embodiment can be applied to the fourth embodiment.

As described above, according to the fourth embodiment of the present technology, since the current source transistor 326 is shared by two pixels, the number of Cu—Cu connections between chips can be reduced. Therefore, miniaturization of the pixel is facilitated.

5. Application Example to Mobile Object

The technology according to the present disclosure (the present technology) can be applied to various products. For example, the technology according to the present disclosure may be implemented as a device to be mounted on any type of mobile objects such as vehicles, electric vehicles, hybrid electric vehicles, motorcycles, bicycles, personal mobilities, airplanes, drones, ships, and robots.

Figure 39:
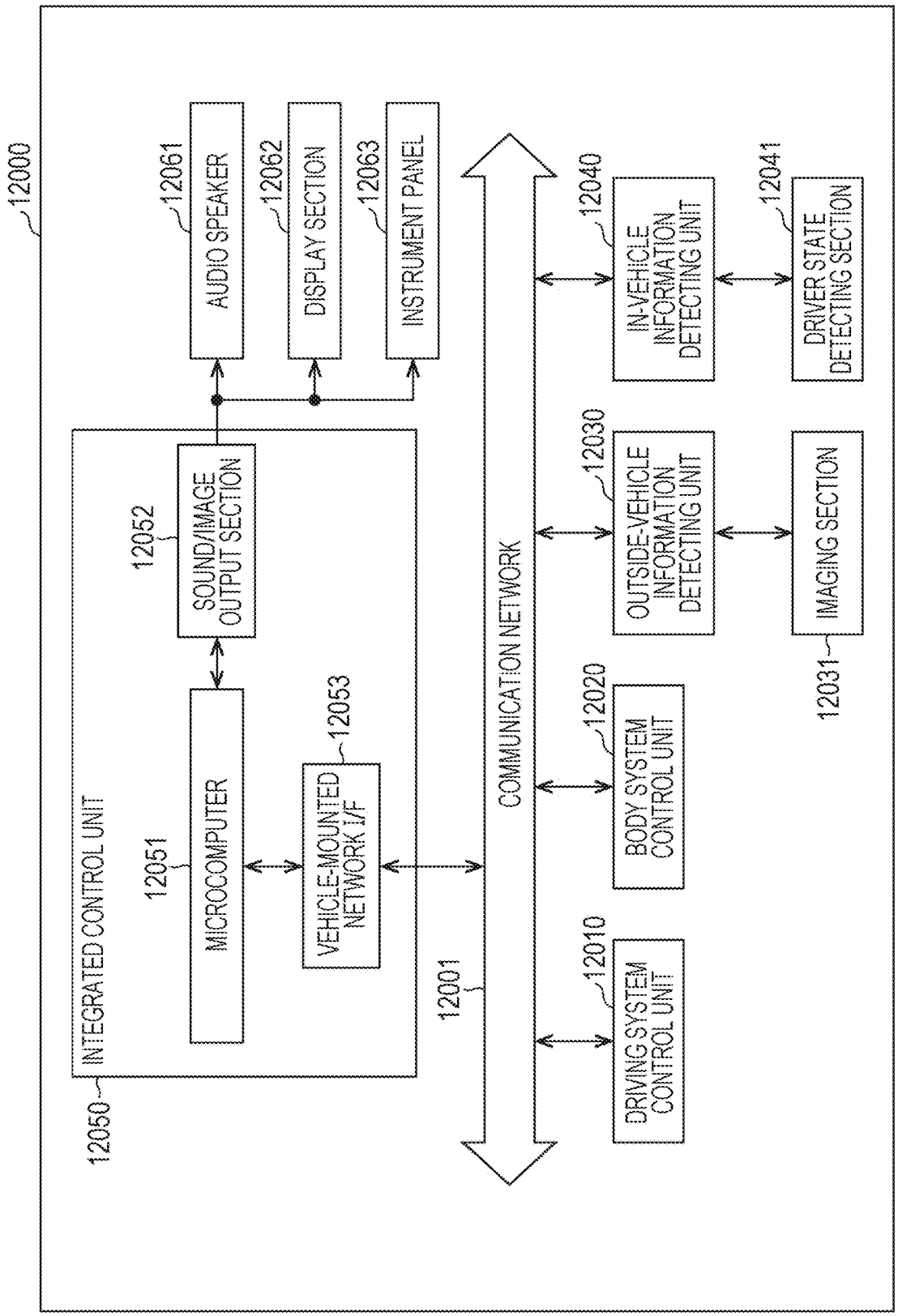
FIG. 39 is a block diagram illustrating a schematic configuration example of a vehicle control system.

FIG. 39 is a block diagram illustrating a schematic configuration example of a vehicle control system that is an example of a mobile object control system to which the technology according to the present disclosure is applied.

The vehicle control system 12000 includes a plurality of electronic control units connected to each other via a communication network 12001. In the example illustrated in FIG. 39, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

Furthermore, the microcomputer 12051 can output a control command to the body system control unit 12020 on the basis of the information about the outside of the vehicle, which is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 39, an audio speaker 12061, a display section 12062, and an instrument panel 12063 are exemplified as the output device. The display section 12062 may, for example, include at least one of an on-board display and a head-up display.

Figure 40:
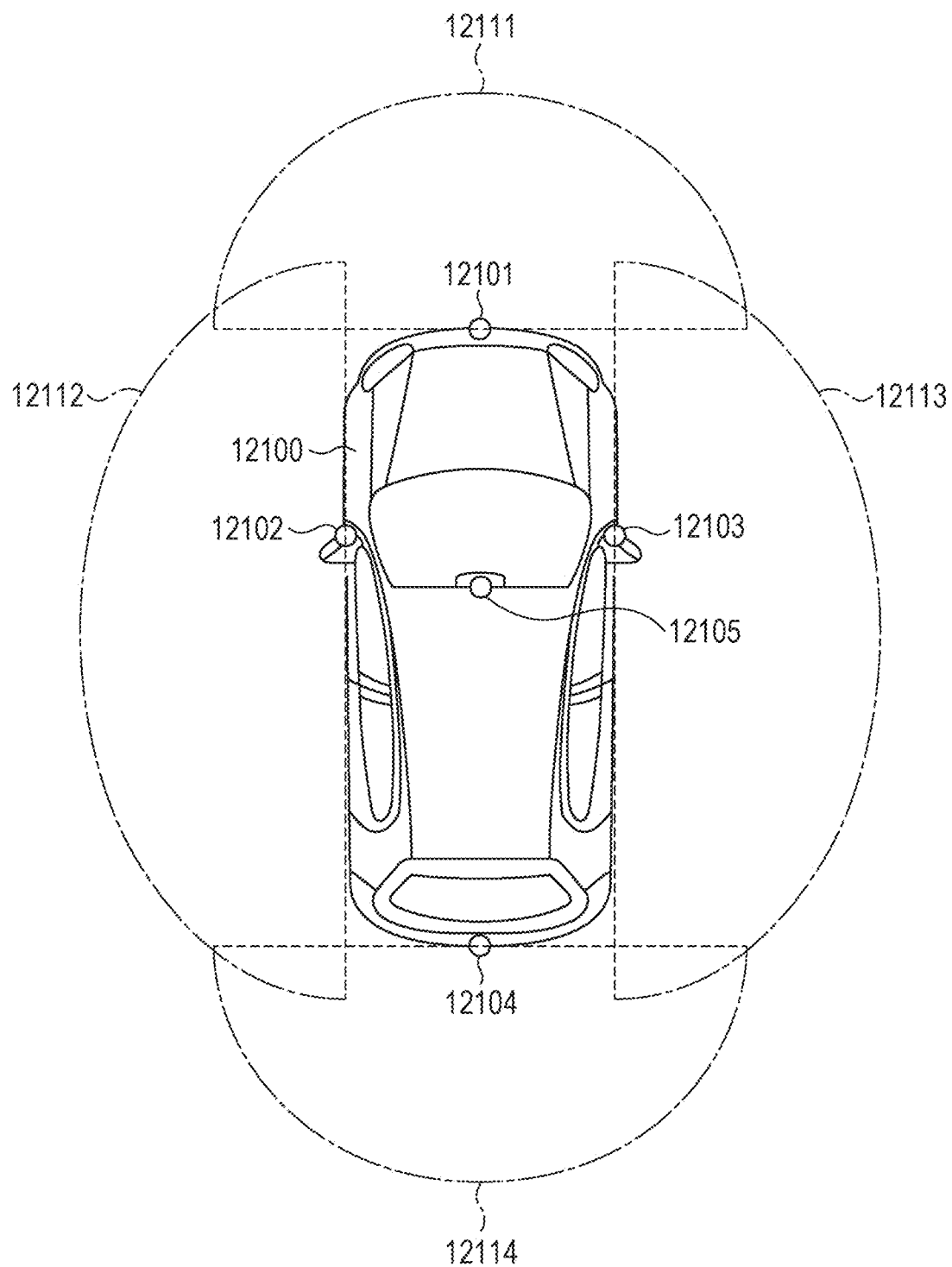
FIG. 40 is an explanatory diagram illustrating an example of an installation position of an imaging section.

FIG. 40 is a diagram illustrating an example of an installation position of the imaging section 12031.

In FIG. 40, the imaging section 12031 includes imaging sections 12101, 12102, 12103, 12104, and 12105.

The imaging sections 12101, 12102, 12103, 12104, and 12105 are, for example, provided at positions on a front nose, sideview mirrors, a rear bumper, and a back door of the vehicle 12100, and on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly images of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 40 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 among the configurations described above. Specifically, for example, the imaging device 100 of FIG. 1 can be applied to the imaging section 12031. By applying the technology according to the present disclosure to the imaging section 12031, the noise can be made inconspicuous, and a more easily viewable captured image can be obtained, so that driver's fatigue can be reduced.

Note that the above-described embodiments illustrate an example for embodying the present technology, and the matters in the embodiments and the invention-specifying matters in the claims have a correspondence relationship. Similarly, there is a correspondence relationship between the matters specifying the invention in claims and the matters in the embodiments of the present technology having the same names. However, the present technology is not limited to the embodiments, and can be embodied by making various modifications to the embodiments without departing from the gist thereof.

Note that the effects described in the present specification are merely illustrative and not restrictive, and further, may have additional effects.

Note that the present technology may also have a following configuration.

(1) A solid-state imaging element including:
a first pixel in which a first selection transistor that opens and closes a path between a first capacitive element holding a predetermined reset level and a predetermined node is arranged at a specific relative position, and a second selection transistor that opens and closes a path between a second capacitive element holding a signal level corresponding to an exposure amount and the node is arranged at a relative position different from the specific relative position; and
a second pixel in which a third selection transistor that opens and closes a path between a third capacitive element holding a predetermined reset level and a predetermined node is arranged at the specific relative position, and a fourth selection transistor that opens and closes a path between a fourth capacitive element holding a signal level corresponding to the exposure amount and the node is arranged at a relative position different from the specific relative position.

(2) The solid-state imaging element described in (1), in which the second pixel is adjacent to the first pixel.

(3) The solid-state imaging element described in (1), in which pixels in a pixel array unit including the first pixel and the second pixel are arranged in a Bayer array.

(4) The solid-state imaging element described in (3), in which the pixel array unit includes
a first area in which the four first pixels are arranged in 2 rows×2 columns, and
a second area which is adjacent to the first area and in which the four second pixels are arranged in 2 rows×2 columns.

(5) The solid-state imaging element described in (3), in which the pixel array unit includes
a first area in which the first pixel and the three second pixels are arranged in 2 rows×2 columns, and
a second area which is adjacent to the first area and in which the second pixel and the three first pixels are arranged in 2 rows×2 columns.

(6) The solid-state imaging element described in (1), in which pixels in a pixel array unit including the first pixel and the second pixel are arranged in a Quad Bayer array, and
the pixel array unit includes
a first area in which the first pixel and the three second pixels of the same color as the first pixel are arranged in 2 rows×2 columns, and
a second area which is adjacent to the first area and in which the second pixel and the three first pixels of the same color as the second pixel are arranged in 2 rows×2 columns.

(7) The solid-state imaging element described in any one of (1) to (6),
in which the node is a post-stage node, and
a pixel block in which the first pixel and the second pixel are arranged includes
a first pre-stage circuit that sequentially generates a first reset level and a first signal level, and causes the first and second capacitive elements to hold the first reset level and the first signal level,
a second pre-stage circuit sequentially generates a second reset level and a second signal level, and causes the third and fourth capacitive elements to hold the second reset level and the second signal level,
the first, second, third, and fourth capacitive elements,
a selection unit that includes a first selection circuit provided with the first and second selection transistors, and a second selection circuit provided with the third and fourth pre-stage selection transistors, and
a post-stage circuit that sequentially reads each of the first and second reset levels and the first and second signal levels through the post-stage node.

(8) The solid-state imaging element described in (7),
in which the first pre-stage circuit includes
a first photoelectric conversion element,
a first pre-stage transfer transistor that transfers a charge to a first floating diffusion layer from the first photoelectric conversion element,
a first reset transistor that initializes the first floating diffusion layer, and
a first pre-stage amplification transistor that amplifies a voltage of the first floating diffusion layer, and
the second pre-stage circuit includes
a second photoelectric conversion element,
a second pre-stage transfer transistor that transfers a charge to a second floating diffusion layer from the second photoelectric conversion element,
a second reset transistor that initializes the second floating diffusion layer, and
a second pre-stage amplification transistor that amplifies a voltage of the second floating diffusion layer.

(9) The solid-state imaging element described in (8),
in which the first pre-stage circuit further includes a first current source transistor connected to a first pre-stage node,
the second pre-stage circuit further includes a second current source transistor connected to a second pre-stage node,
the first pre-stage amplification transistor amplifies the voltage of the first floating diffusion layer, and outputs the amplified voltage to the first pre-stage node,
the second pre-stage amplification transistor amplifies the voltage of the second floating diffusion layer, and outputs the amplified voltage to the second pre-stage node,
one end of each of the first and second capacitive elements is commonly connected to the first pre-stage node, and the other end of each of the first and second capacitive elements is connected to the first selection circuit, and
one end of each of the third and fourth capacitive elements is commonly connected to the second pre-stage node, and the other end of each of the third and fourth capacitive elements is connected to the second selection circuit.

(10) The solid-state imaging element described in (8) or (9),
in which at a predetermined exposure start timing, the first and second pre-stage transfer transistors transfer the charges to the first and second floating diffusion layers, and the first and second reset transistors initialize the first and second floating diffusion layers and the first and second photoelectric conversion elements, and at a predetermined exposure end timing, the first and second pre-stage transfer transistors transfer the charges to the first and second floating diffusion layers.

(11) The solid-state imaging element described in any one of (8) to (10), in which the selection unit sequentially performs control to connect one of the first and second capacitive elements to the post-stage node, control to connect the other of the first and second capacitive elements to the post-stage node, control to connect one of the third and fourth capacitive elements to the post-stage node, and control to connect the other of the third and fourth capacitive elements to the post-stage node.

(12) The solid-state imaging element described in any one of (8) to (11), in which in a predetermined addition mode, the selection unit sequentially performs control to connect both one of the first and second capacitive elements and one of the third and fourth capacitive elements to the post-stage node and control to connect both the other of the first and second capacitive elements and the other of the third and fourth capacitive elements to the post-stage node.

(13) The solid-state imaging element described in (8), in which the first pre-stage circuit further includes a first pre-stage selection transistor that outputs a voltage amplified by the first pre-stage amplification transistor to a predetermined pre-stage node in accordance with a predetermined first selection signal, the second pre-stage circuit further includes a second pre-stage selection transistor that outputs a voltage amplified by the second pre-stage amplification transistor to the pre-stage node in accordance with a predetermined second selection signal, and a current source transistor connected to the pre-stage node, one end of each of the first and second capacitive elements is commonly connected to the pre-stage node, and the other end of each of the first and second capacitive elements is connected to the first selection circuit, and one end of each of the third and fourth capacitive elements is commonly connected to the pre-stage node, and the other end of each of the third and fourth capacitive elements is connected to the second selection circuit.

(14) The solid-state imaging element described in (13), in which the first and second pre-stage selection transistors sequentially shift to a closed state immediately before a predetermined exposure end timing and immediately after the exposure end timing, the first reset transistor initializes the first floating diffusion layer in a case where the first pre-stage selection transistor is in the closed state, the second reset transistor initializes the second floating diffusion layer in a case where the second pre-stage selection transistor is in the closed state, the first and second pre-stage selection transistors sequentially shift to the closed state immediately after the exposure end timing, and the first and second pre-stage transfer transistors transfer the charges at the predetermined exposure end timing.

(15) The solid-state imaging element described in (1), in which the node includes first and second post-stage nodes, and a pixel block in which four pixels including the first pixel and the second pixel are arranged includes a short-circuit transistor that opens and closes a path between the first post-stage node and the second post-stage node, the first, second, third, and fourth capacitive elements, third, fourth, fifth, and sixth capacitive elements, and a selection unit that includes a first selection circuit provided with the first and second selection transistors, a second selection circuit provided with the third and fourth pre-stage selection transistors, a third selection circuit that connects any of the fifth and sixth capacitive elements to the second post-stage node, and a fourth selection circuit that connects any of the seventh and eighth capacitive elements to the second post-stage node.

(16) The solid-state imaging element described in (15), in which in a predetermined non-addition mode, the short-circuit transistor is in an open state, and in the non-addition mode, the selection unit sequentially performs control to sequentially connect each of the first and second capacitive elements to the first post-stage node, control to sequentially connect each of the third and fourth capacitive elements to the first post-stage node, control to sequentially connect each of the fifth and sixth capacitive elements to the second post-stage node, and control to sequentially connect each of the seventh and eighth capacitive elements to the second post-stage node.

(17) The solid-state imaging element described in (15) or (16), in which in a predetermined addition mode, the short-circuit transistor is in a closed state, and in the addition mode, the selection unit sequentially performs control to connect one of the fifth and sixth capacitive elements and one of the seventh and eighth capacitive elements to the second post-stage node while connecting one of the first and second capacitive elements and one of the third and fourth capacitive elements to the first post-stage node, and control to connect the other of the fifth and sixth capacitive elements and the other of the seventh and eighth capacitive elements to the second post-stage node while connecting the other of the first and second capacitive elements and the other of the third and fourth capacitive elements to the first post-stage node.

(18) An imaging device including:

a first pixel in which a first selection transistor that opens and closes a path between a first capacitive element holding a predetermined reset level and a predetermined node is arranged at a specific relative position, and a second selection transistor that opens and closes a path between a second capacitive element holding a signal level corresponding to an exposure amount and the node is arranged at a relative position different from the specific relative position;

a second pixel in which a third selection transistor that opens and closes a path between a third capacitive element holding a predetermined reset level and a predetermined node is arranged at the specific relative position, and a fourth selection transistor that opens and closes a path between a fourth capacitive element holding a signal level corresponding to the exposure amount and the node is arranged at a relative position different from the specific relative position; and a signal processing circuit that sequentially converts the reset level and the signal level into a digital signal.

REFERENCE SIGNS LIST

100 Imaging device
110 Imaging lens
120 Recording unit
130 Imaging control unit
200 Solid-state imaging element
201 Upper pixel chip
202 Lower pixel chip
203 Circuit chip
211 Vertical scanning circuit
212 Timing control circuit
213 DAC
220 Pixel array unit
221 Upper pixel array unit
222 Lower pixel array unit
250 Load MOS circuit block
251 Load MOS transistor
260 Column signal processing circuit
261 ADC
262 Digital signal processing unit
300 Pixel block
301 to 304 Pixel
305 Pre-stage circuit block
310, 320, 410, 420 Pre-stage circuit
311, 321, 411, 421, 511 to 513 Photoelectric conversion element
312, 322, 412, 422, 514 to 516 Transfer transistor
313, 323, 413, 423 FD reset transistor
314, 324, 414, 424 FD
315, 325, 415, 425 Pre-stage amplification transistor
316, 326, 416, 426 Current source transistor
317, 327 Pre-stage selection transistor
331, 332, 336, 337, 431, 432, 436, 437, 531 to 533 Capacitive element
340 Selection unit
350, 355, 450, 455 Selection circuit
351, 352, 356, 357, 451, 452, 456, 457, 551 to 553 Selection transistor
361, 366, 461 Post-stage reset transistor
370, 380, 470 Post-stage circuit
371, 381, 471 Post-stage amplification transistor
372, 382, 472 Post-stage selection transistor
480 Short-circuit transistor
12031 Imaging section

The invention claimed is:

1. A solid-state imaging element comprising:
a first pixel in which a first selection transistor that opens and closes a path between a first capacitive element holding a predetermined reset level and a predetermined node is arranged at a specific relative position, and a second selection transistor that opens and closes a path between a second capacitive element holding a signal level corresponding to an exposure amount and the node is arranged at a relative position different from the specific relative position; and
a second pixel in which a third selection transistor that opens and closes a path between a third capacitive element holding a predetermined reset level and a predetermined node is arranged at the specific relative position, and a fourth selection transistor that opens and closes a path between a fourth capacitive element holding a signal level corresponding to the exposure amount and the node is arranged at a relative position different from the specific relative position.

2. The solid-state imaging element according to claim 1, wherein the second pixel is adjacent to the first pixel.

3. The solid-state imaging element according to claim 1, wherein pixels in a pixel array unit including the first pixel and the second pixel are arranged in a Bayer array.

4. The solid-state imaging element according to claim 3, wherein the pixel array unit includes
a first area in which the four first pixels are arranged in 2 rows×2 columns, and
a second area which is adjacent to the first area and in which the four second pixels are arranged in 2 rows×2 columns.

5. The solid-state imaging element according to claim 3, wherein the pixel array unit includes
a first area in which the first pixel and the three second pixels are arranged in 2 rows×2 columns, and
a second area which is adjacent to the first area and in which the second pixel and the three first pixels are arranged in 2 rows×2 columns.

6. The solid-state imaging element according to claim 1, wherein pixels in a pixel array unit including the first pixel and the second pixel are arranged in a Quad Bayer array, and
the pixel array unit includes
a first area in which the first pixel and the three second pixels of the same color as the first pixel are arranged in 2 rows×2 columns, and
a second area which is adjacent to the first area and in which the second pixel and the three first pixels of the same color as the second pixel are arranged in 2 rows×2 columns.

7. The solid-state imaging element according to claim 1, wherein the node is a post-stage node, and
a pixel block in which the first pixel and the second pixel are arranged includes
a first pre-stage circuit that sequentially generates a first reset level and a first signal level, and causes the first and second capacitive elements to hold the first reset level and the first signal level,
a second pre-stage circuit sequentially generates a second reset level and a second signal level, and causes the third and fourth capacitive elements to hold the second reset level and the second signal level,
the first, second, third, and fourth capacitive elements,
a selection unit that includes a first selection circuit provided with the first and second selection transistors, and a second selection circuit provided with the third and fourth pre-stage selection transistors, and
a post-stage circuit that sequentially reads each of the first and second reset levels and the first and second signal levels through the post-stage node.

8. The solid-state imaging element according to claim 7, wherein the first pre-stage circuit includes
a first photoelectric conversion element,
a first pre-stage transfer transistor that transfers a charge to a first floating diffusion layer from the first photoelectric conversion element,
a first reset transistor that initializes the first floating diffusion layer, and
a first pre-stage amplification transistor that amplifies a voltage of the first floating diffusion layer, and
the second pre-stage circuit includes
a second photoelectric conversion element,
a second pre-stage transfer transistor that transfers a charge to a second floating diffusion layer from the second photoelectric conversion element,
a second reset transistor that initializes the second floating diffusion layer, and a second pre-stage amplification transistor that amplifies a voltage of the second floating diffusion layer.

9. The solid-state imaging element according to claim 8, wherein the first pre-stage circuit further includes a first current source transistor connected to a first pre-stage node, the second pre-stage circuit further includes a second current source transistor connected to a second pre-stage node, the first pre-stage amplification transistor amplifies the voltage of the first floating diffusion layer, and outputs the amplified voltage to the first pre-stage node, the second pre-stage amplification transistor amplifies the voltage of the second floating diffusion layer, and outputs the amplified voltage to the second pre-stage node, one end of each of the first and second capacitive elements is commonly connected to the first pre-stage node, and the other end of each of the first and second capacitive elements is connected to the first selection circuit, and one end of each of the third and fourth capacitive elements is commonly connected to the second pre-stage node, and the other end of each of the third and fourth capacitive elements is connected to the second selection circuit.

10. The solid-state imaging element according to claim 8, wherein at a predetermined exposure start timing, the first and second pre-stage transfer transistors transfer the charges to the first and second floating diffusion layers, and the first and second reset transistors initialize the first and second floating diffusion layers and the first and second photoelectric conversion elements, and at a predetermined exposure end timing, the first and second pre-stage transfer transistors transfer the charges to the first and second floating diffusion layers.

11. The solid-state imaging element according to claim 7, wherein the selection unit sequentially performs control to connect one of the first and second capacitive elements to the post-stage node, control to connect the other of the first and second capacitive elements to the post-stage node, control to connect one of the third and fourth capacitive elements to the post-stage node, and control to connect the other of the third and fourth capacitive elements to the post-stage node.

12. The solid-state imaging element according to claim 7, wherein in a predetermined addition mode, the selection unit sequentially performs control to connect both one of the first and second capacitive elements and one of the third and fourth capacitive elements to the post-stage node and control to connect both the other of the first and second capacitive elements and the other of the third and fourth capacitive elements to the post-stage node.

13. The solid-state imaging element according to claim 8, wherein the first pre-stage circuit further includes a first pre-stage selection transistor that outputs a voltage amplified by the first pre-stage amplification transistor to a predetermined pre-stage node in accordance with a predetermined first selection signal, the second pre-stage circuit further includes a second pre-stage selection transistor that outputs a voltage amplified by the second pre-stage amplification transistor to the pre-stage node in accordance with a predetermined second selection signal, and a current source transistor connected to the pre-stage node, one end of each of the first and second capacitive elements is commonly connected to the pre-stage node, and the other end of each of the first and second capacitive elements is connected to the first selection circuit, and one end of each of the third and fourth capacitive elements is commonly connected to the pre-stage node, and the other end of each of the third and fourth capacitive elements is connected to the second selection circuit.

14. The solid-state imaging element according to claim 13, wherein the first and second pre-stage selection transistors sequentially shift to a closed state immediately before a predetermined exposure end timing and immediately after the exposure end timing, the first reset transistor initializes the first floating diffusion layer in a case where the first pre-stage selection transistor is in the closed state, the second reset transistor initializes the second floating diffusion layer in a case where the second pre-stage selection transistor is in the closed state, the first and second pre-stage selection transistors sequentially shift to the closed state immediately after the exposure end timing, and the first and second pre-stage transfer transistors transfer the charges at the predetermined exposure end timing.

15. The solid-state imaging element according to claim 1, wherein the node includes first and second post-stage nodes, and a pixel block in which four pixels including the first pixel and the second pixel are arranged includes a short-circuit transistor that opens and closes a path between the first post-stage node and the second post-stage node, the first, second, third, and fourth capacitive elements, third, fourth, fifth, and sixth capacitive elements, and a selection unit that includes a first selection circuit provided with the first and second selection transistors, a second selection circuit provided with the third and fourth pre-stage selection transistors, a third selection circuit that connects any of the fifth and sixth capacitive elements to the second post-stage node, and a fourth selection circuit that connects any of the seventh and eighth capacitive elements to the second post-stage node.

16. The solid-state imaging element according to claim 15, wherein in a predetermined non-addition mode, the short-circuit transistor is in an open state, and in the non-addition mode, the selection unit sequentially performs control to sequentially connect each of the first and second capacitive elements to the first post-stage node, control to sequentially connect each of the third and fourth capacitive elements to the first post-stage node, control to sequentially connect each of the fifth and sixth capacitive elements to the second post-stage node, and control to sequentially connect each of the seventh and eighth capacitive elements to the second post-stage node.

17. The solid-state imaging element according to claim 15, wherein in a predetermined addition mode, the short-circuit transistor is in a closed state, and in the addition mode, the selection unit sequentially performs control to connect one of the fifth and sixth capacitive elements and one of the seventh and eighth capacitive elements to the second post-stage node while connecting one of the first and second capacitive elements and one of the third and fourth capacitive elements to the first post-stage node, and control to connect the other of the fifth and sixth capacitive elements and the other of the seventh and eighth capacitive elements to the second post-stage node while connecting the other of the first and second capacitive elements and the other of the third and fourth capacitive elements to the first post-stage node.

18. An imaging device comprising:

a first pixel in which a first selection transistor that opens and closes a path between a first capacitive element holding a predetermined reset level and a predetermined node is arranged at a specific relative position, and a second selection transistor that opens and closes a path between a second capacitive element holding a signal level corresponding to an exposure amount and the node is arranged at a relative position different from the specific relative position;

a second pixel in which a third selection transistor that opens and closes a path between a third capacitive element holding a predetermined reset level and a predetermined node is arranged at the specific relative position, and a fourth selection transistor that opens and closes a path between a fourth capacitive element holding a signal level corresponding to the exposure amount and the node is arranged at a relative position different from the specific relative position; and a signal processing circuit that sequentially converts the reset level and the signal level into a digital signal.

* * * * *